(12) United States Patent
Kuma et al.

(10) Patent No.: US 11,508,096 B2
(45) Date of Patent: Nov. 22, 2022

(54) INFORMATION PROCESSING APPARATUS AND METHOD

(71) Applicant: SONY CORPORATION, Tokyo (JP)

(72) Inventors: Satoru Kuma, Tokyo (JP); Ohji Nakagami, Tokyo (JP); Koji Yano, Tokyo (JP); Tsuyoshi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 387 days.

(21) Appl. No.: 16/628,556

(22) PCT Filed: Jun. 26, 2018

(86) PCT No.: PCT/JP2018/024080
§ 371 (c)(1),
(2) Date: Jan. 3, 2020

(87) PCT Pub. No.: WO2019/012975
PCT Pub. Date: Jan. 17, 2019

(65) Prior Publication Data
US 2020/0175726 A1     Jun. 4, 2020

(30) Foreign Application Priority Data

Jul. 10, 2017   (JP) .............................. JP2017-134534

(51) Int. Cl.
*G06K 9/36*     (2006.01)
*G06K 9/46*     (2006.01)
(Continued)

(52) U.S. Cl.
CPC ................ *G06T 9/40* (2013.01); *G06T 9/001* (2013.01); *H04N 19/124* (2014.11); *H04N 19/167* (2014.11); *H04N 19/96* (2014.11)

(58) Field of Classification Search
None
See application file for complete search history.

(56) References Cited

U.S. PATENT DOCUMENTS

| 7,176,918 B2* | 2/2007 | Anderson ............... G06T 17/00 |
| | | 345/426 |
| 7,538,764 B2* | 5/2009 | Salomie .................. G06T 17/20 |
| | | 380/232 |

(Continued)

FOREIGN PATENT DOCUMENTS

| EP | 2261859 A1 | 12/2010 |
| WO | WO 2013/078958 A1 | 6/2013 |

(Continued)

OTHER PUBLICATIONS

Hornung et al., "OctoMap: An efficient probabilistic 3D mapping framework based on octrees." Autonomous robots 34, No. 3 (2013): 189-206. (Year: 2013).*

(Continued)

*Primary Examiner* — Feng Niu
(74) *Attorney, Agent, or Firm* — Paratus Law Group, PLLC

(57) ABSTRACT

The present disclosure relates to information processing apparatus and method that makes it possible to suppress a reduction in encoding efficiency. Information relating to quantization of a three-dimensional position of an encoding target is generated. For example, the information relating to the quantization includes information relating to a coordinate system to be subjected to the quantization, information relating to a bounding box for normalization of position information of the encoding target, or information relating to a voxel for quantization of position information of the encoding target. In addition, three-dimensional information of the encoding target is restored from a signal string on the basis of the information relating to the quantization of the three-dimensional position of the encoding target. The present disclosure is applicable to, for example, an information processing apparatus, an image processing apparatus, an (Continued)

electronic device, an information processing method, a program, or the like.

15 Claims, 34 Drawing Sheets

(51) Int. Cl.
*G06T 9/40* (2006.01)
*H04N 19/124* (2014.01)
*H04N 19/167* (2014.01)
*H04N 19/96* (2014.01)
*G06T 9/00* (2006.01)

(56) References Cited

U.S. PATENT DOCUMENTS

| | | | | |
|---|---|---|---|---|
| 8,217,938 | B2* | 7/2012 | Chen | G06T 7/73 |
| | | | | 345/419 |
| 8,265,407 | B2* | 9/2012 | Kim | G06T 17/20 |
| | | | | 382/240 |
| 8,406,286 | B2* | 3/2013 | Liu | H04N 19/176 |
| | | | | 375/240 |
| 9,159,162 | B2 | 10/2015 | Carbonera et al. | |
| 9,183,459 | B1* | 11/2015 | Zhang | G06V 10/255 |
| 9,245,355 | B2* | 1/2016 | Cai | G06T 9/004 |
| 9,635,366 | B2* | 4/2017 | Matsumura | H04N 19/147 |
| 10,181,216 | B2* | 1/2019 | Zeng | G06T 17/00 |
| 10,223,810 | B2* | 3/2019 | Chou | H03M 7/3066 |
| 10,678,217 | B2* | 6/2020 | Zeng | G06T 19/20 |
| 10,694,210 | B2* | 6/2020 | Chou | H04N 19/36 |
| 10,810,786 | B2* | 10/2020 | Matsunobu | G06T 15/08 |
| 11,127,169 | B2* | 9/2021 | Sugio | G06T 15/08 |
| 11,238,648 | B2* | 2/2022 | Koyama | G08G 1/16 |
| 2005/0179687 | A1* | 8/2005 | Anderson | G06T 15/60 |
| | | | | 345/424 |
| 2008/0297507 | A1 | 12/2008 | Chen et al. | |
| 2009/0202160 | A1 | 8/2009 | Kim et al. | |
| 2010/0290521 | A1* | 11/2010 | Liu | H04N 19/19 |
| | | | | 375/E7.243 |
| 2015/0063443 | A1* | 3/2015 | Matsumura | H04N 19/126 |
| | | | | 375/240.03 |
| 2015/0324658 | A1* | 11/2015 | Zhang | G06V 10/811 |
| | | | | 382/203 |
| 2016/0267705 | A1* | 9/2016 | O'Leary | G06T 17/00 |
| 2016/0328841 | A1* | 11/2016 | Lay | G06K 9/6218 |
| 2017/0347100 | A1* | 11/2017 | Chou | H03M 7/3059 |
| 2017/0347122 | A1* | 11/2017 | Chou | G06T 9/00 |
| 2017/0372513 | A1* | 12/2017 | Zeng | G06T 17/00 |
| 2018/0032060 | A1* | 2/2018 | Zeng | G06F 30/20 |
| 2018/0278956 | A1* | 9/2018 | Toma | G06T 9/001 |
| 2019/0108656 | A1* | 4/2019 | Sugio | G06T 15/08 |
| 2019/0164332 | A1* | 5/2019 | Matsunobu | G06T 7/50 |
| 2019/0204076 | A1* | 7/2019 | Nishi | G08G 1/166 |
| 2020/0258298 | A1* | 8/2020 | Koyama | G01C 21/3635 |
| 2020/0410745 | A1* | 12/2020 | Matsunobu | G06T 9/00 |
| 2021/0327100 | A1* | 10/2021 | Sugio | G06T 9/00 |

FOREIGN PATENT DOCUMENTS

| | | |
|---|---|---|
| WO | WO 2017/095514 A1 | 6/2017 |
| WO | WO 2017/104115 A1 | 6/2017 |

OTHER PUBLICATIONS

Choi et al., "Fast coding mode selection with rate-distortion optimization for MPEG-4 part-10 AVC/H. 264." IEEE Transactions on Circuits and Systems for Video Technology 16, No. 12 (2006): 1557-1561. (Year: 2006).*
Jun. 30, 2020, European Search Report issued for related EP application No. 18831404.1.
Ohji Nakagami et al., Point cloud compression technology proposal by Sony, International Organisation for Standardisation, Coding of Moving Pictures and Audio, ISO/IEC JTC1/SC29/WG11, MPEG2017/M41665, Oct. 2017, pp. 1-43, Macau, CN.
Ohji Nakagami, Study on MPEG PCC CfP anchor, International Organisation for Standardisation, Coding of Moving Pictures and Audio, ISO/IEC JTC1/SC29/WG11, MPEG2017/M41034, Jul. 2017, pp. 1-4, Torino, IT.
Mekuria et al., Design, Implementation and Evaluation of a Point Cloud Codec for Tele-Immersive Video, IEEE Transactions on Circuits and Systems for Video Technology, Mar. 16, 2016, pp. 1-14, vol. 27, Issue 4, IEEE.

* cited by examiner

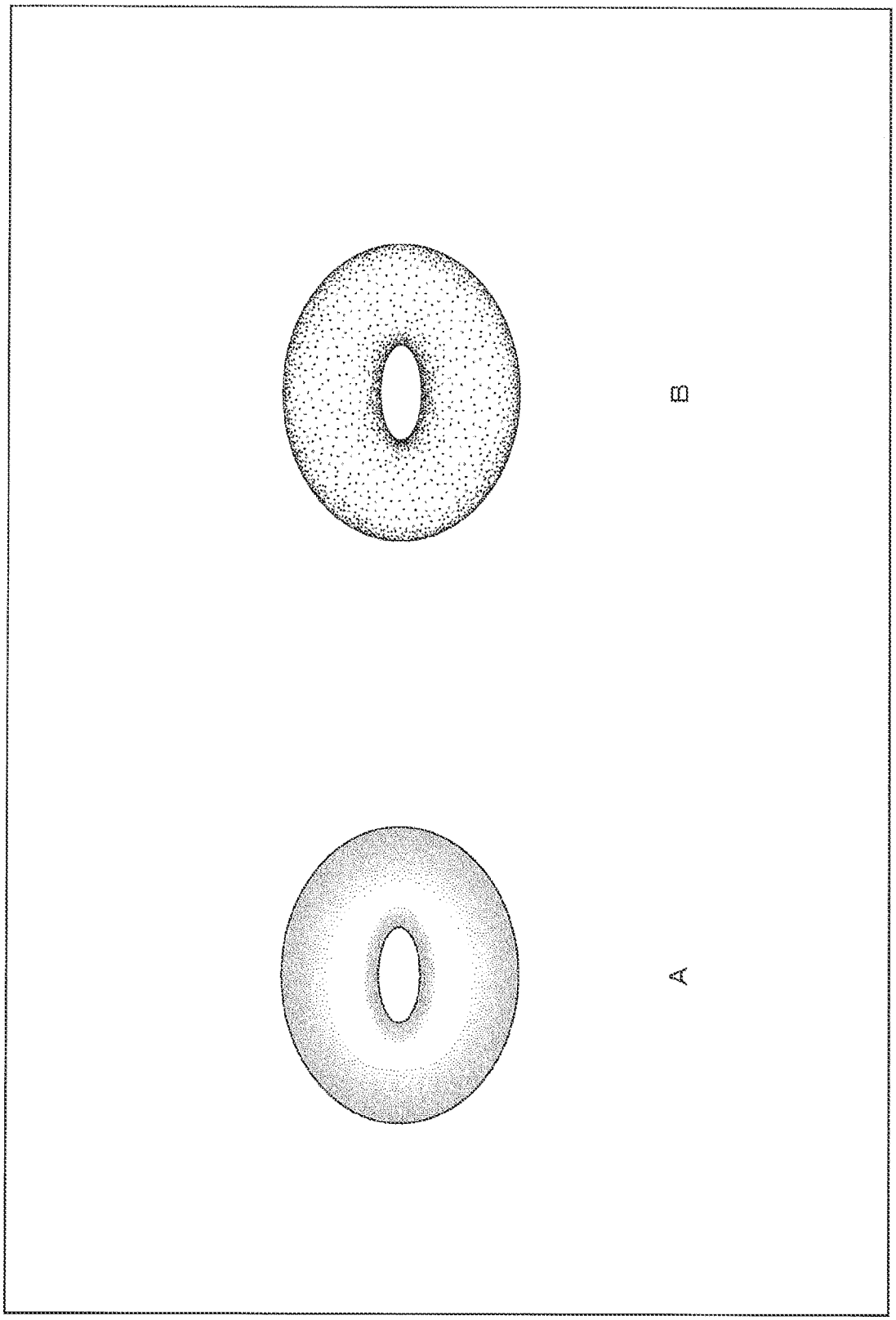
[FIG. 1]

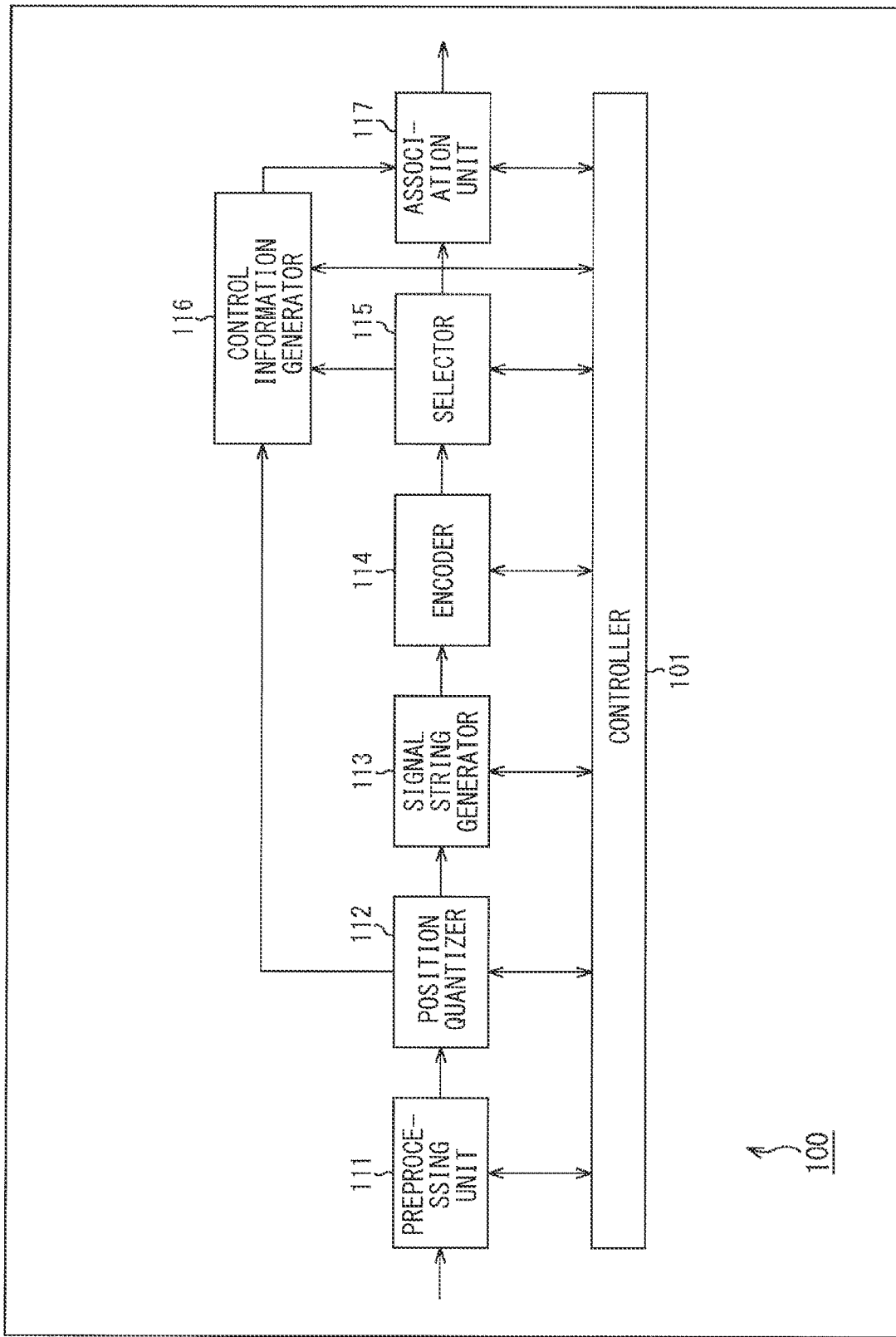
[FIG. 2]

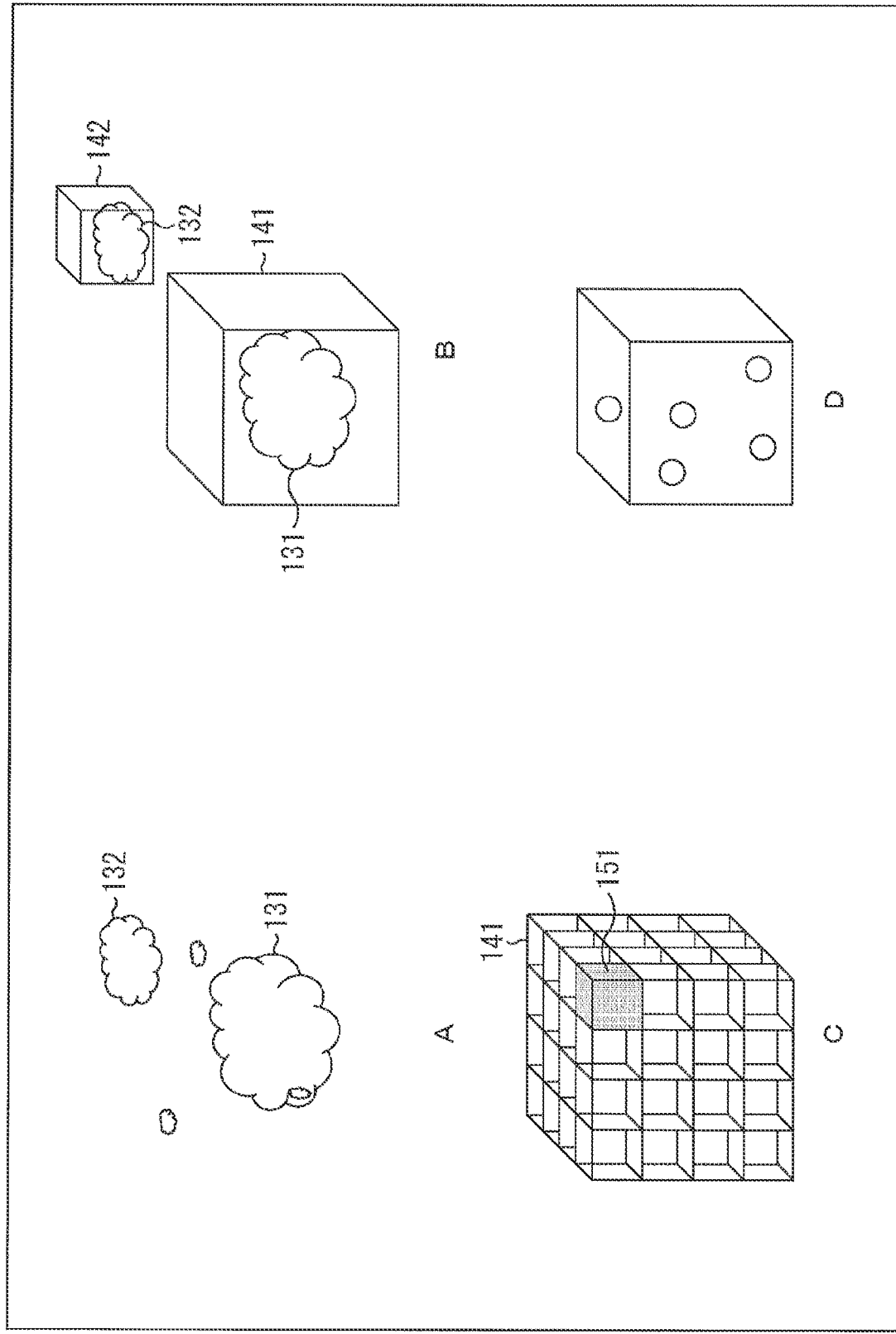

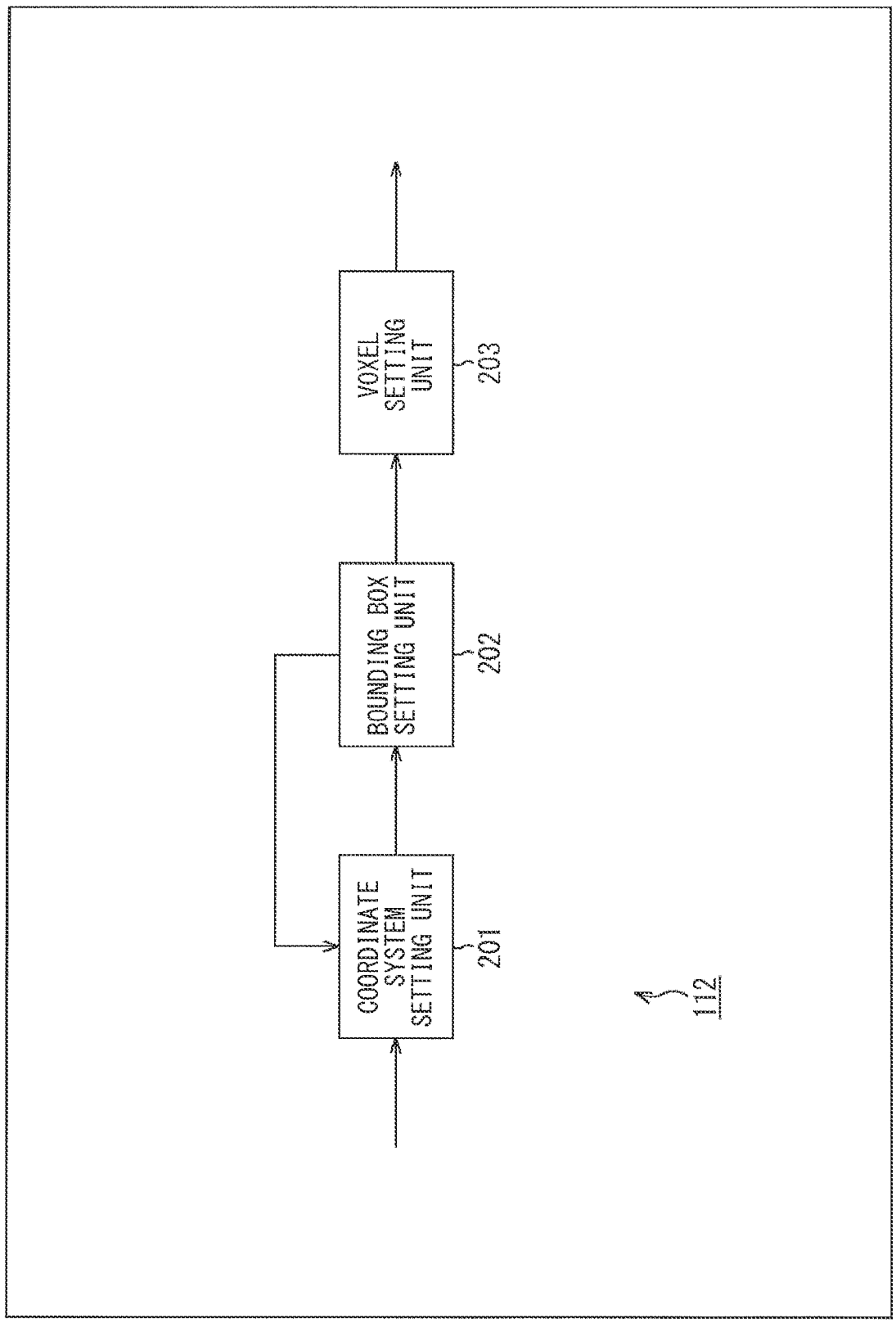

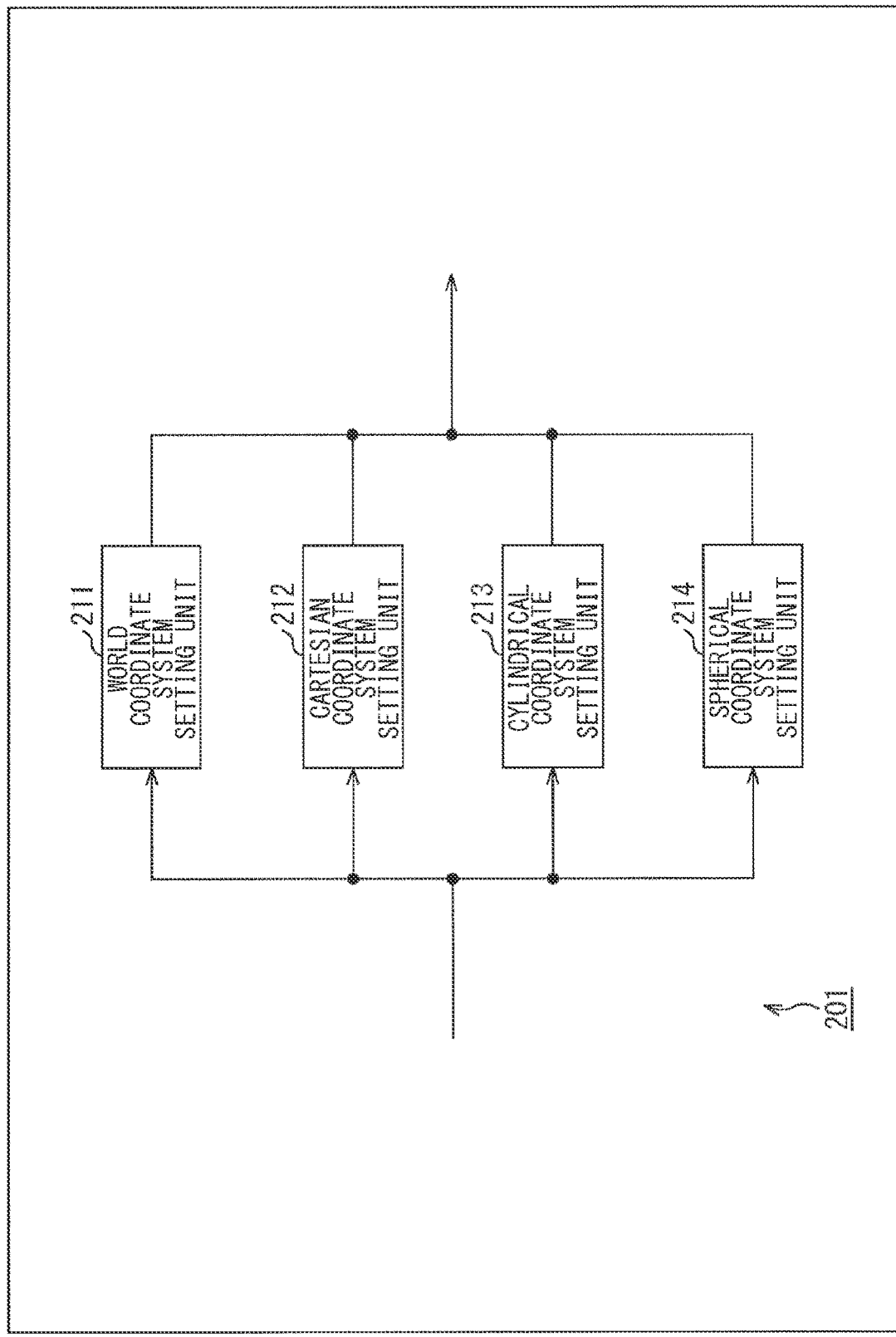
[FIG. 5]

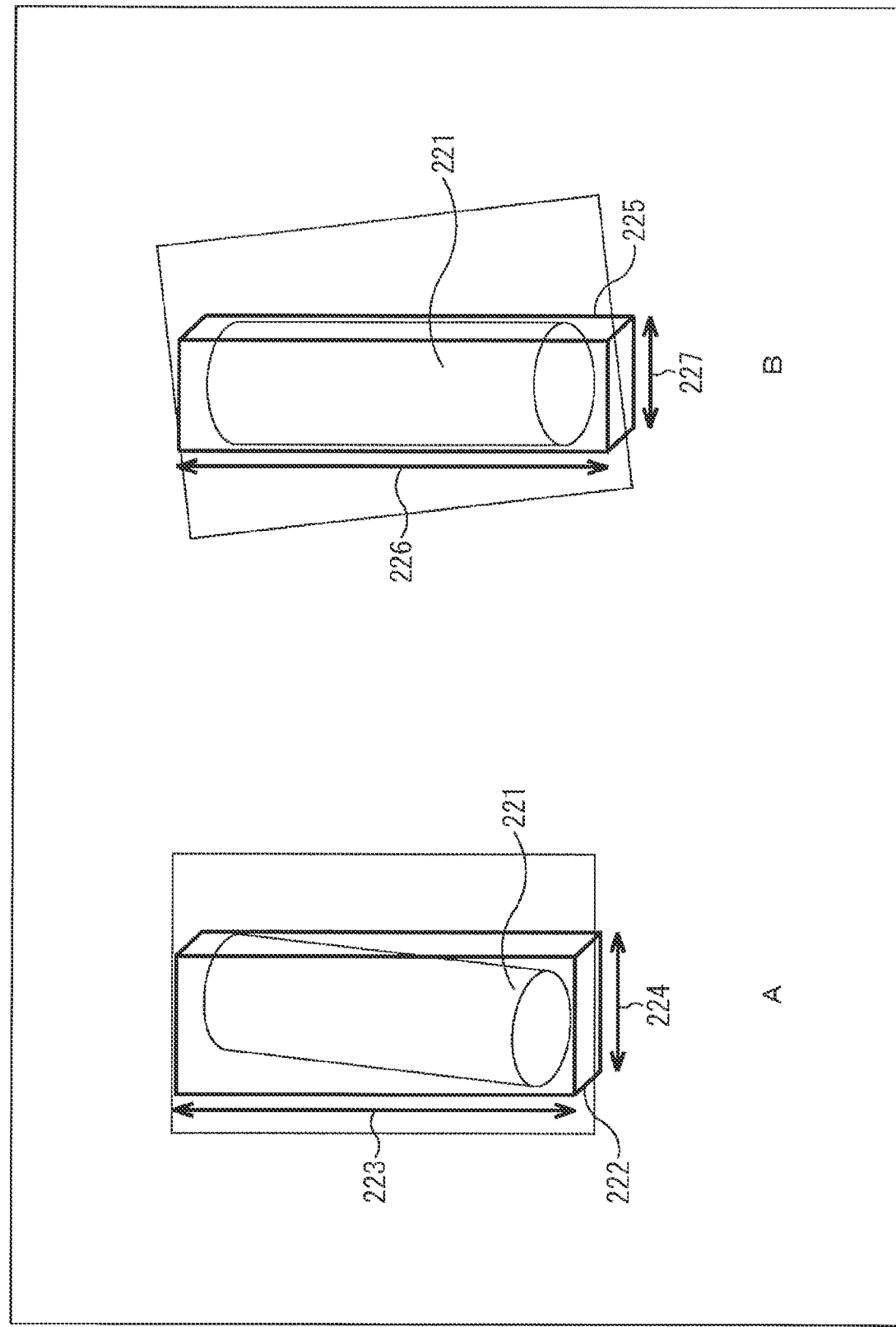
[FIG. 6]

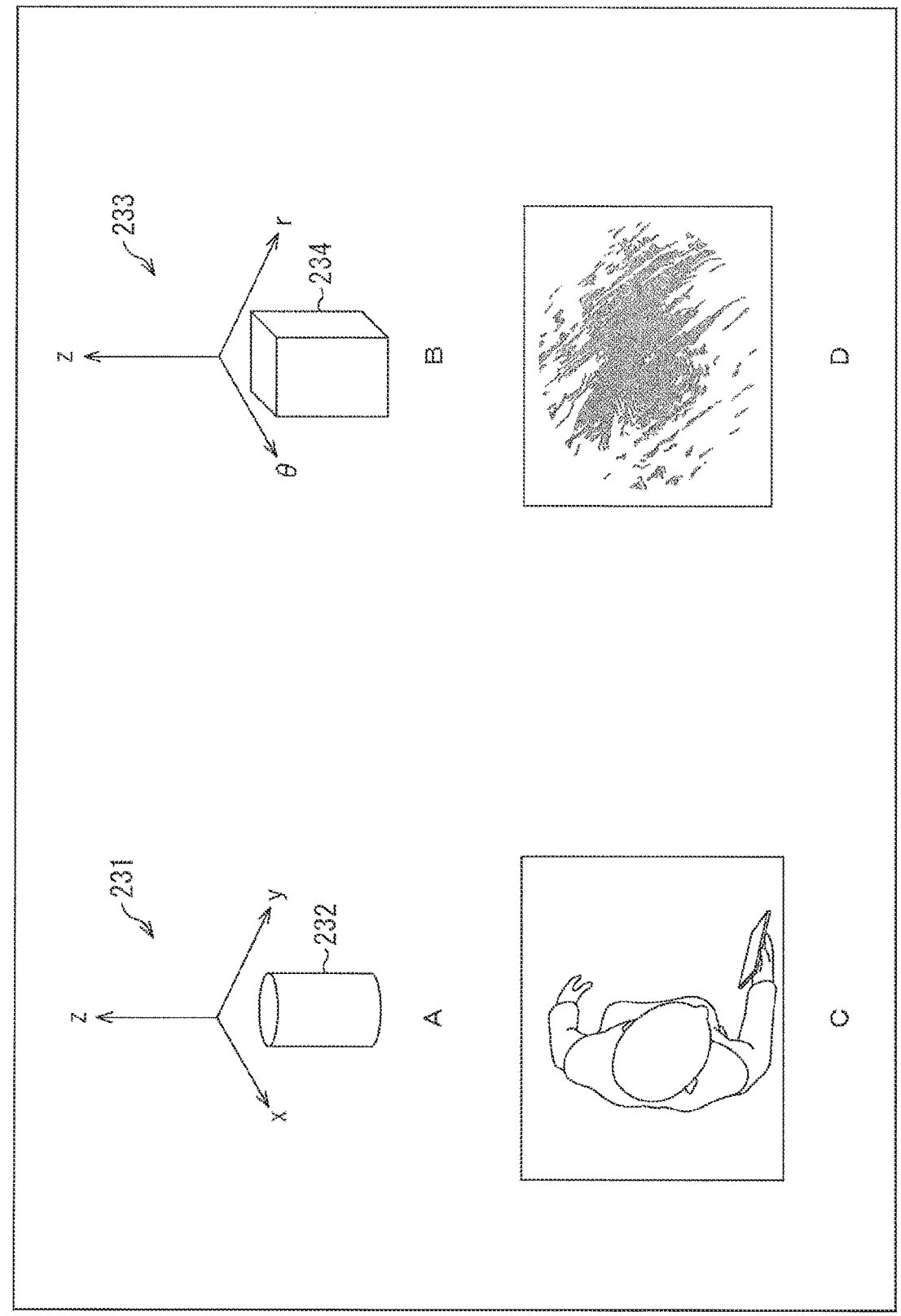

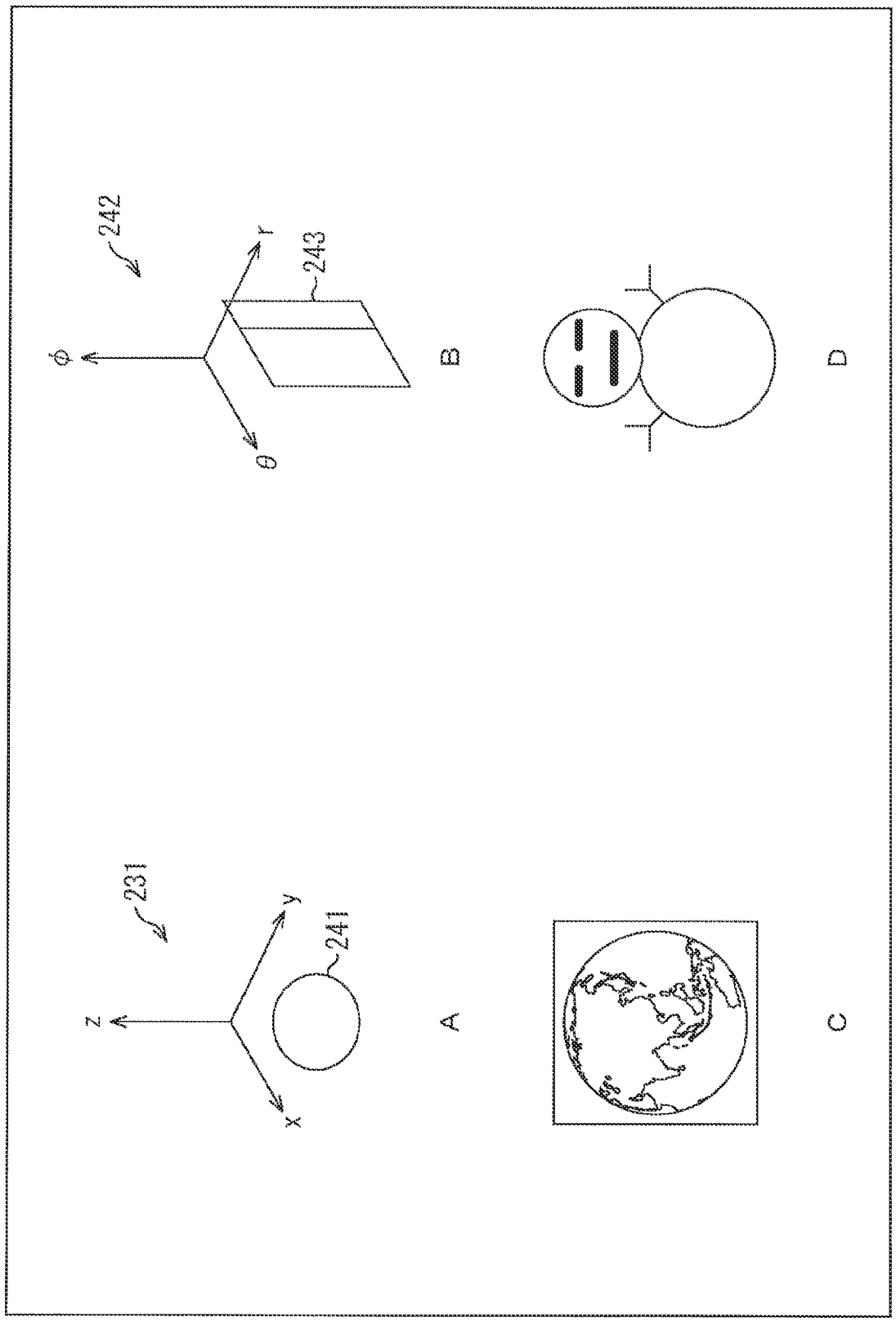

[FIG. 9]

| | RELATIONSHIP WITH WORLD COORDINATES | ADDITIONAL INFORMATION | EFFECTS |
|---|---|---|---|
| COORDINATES ARE NOT TRANSFORMED | NECESSARY | | |
| TRANSFORMED (CARTESIAN COORDINATES) | NECESSARY | SHIFT AMOUNT (x, y, z) AND ANGLES (ROLL, PITCH, AND YAW) | IMPROVEMENT IN COMPRESSION PERFORMANCE (DEPENDENT ON SEQUENCE) |
| TRANSFORMED (CYLINDRICAL COORDINATES) | NECESSARY | SHIFT AMOUNT (x, y, z), ANGLES (ROLL, PITCH, AND YAW), AND CORRESPONDENCE BETWEEN (x, y) AND (r, θ) | IMPROVEMENT IN COMPRESSION PERFORMANCE (DEPENDENT ON SEQUENCE) |
| TRANSFORMED (SPHERICAL COORDINATES) | NECESSARY | SHIFT AMOUNT (x, y, z), ANGLES (ROLL, PITCH, AND YAW), AND SIGNAL OF SPHERICAL COORDINATES: CORRESPONDENCE BETWEEN (x, y, z) and (r, θ, φ) | IMPROVEMENT IN COMPRESSION PERFORMANCE (DEPENDENT ON SEQUENCE) |

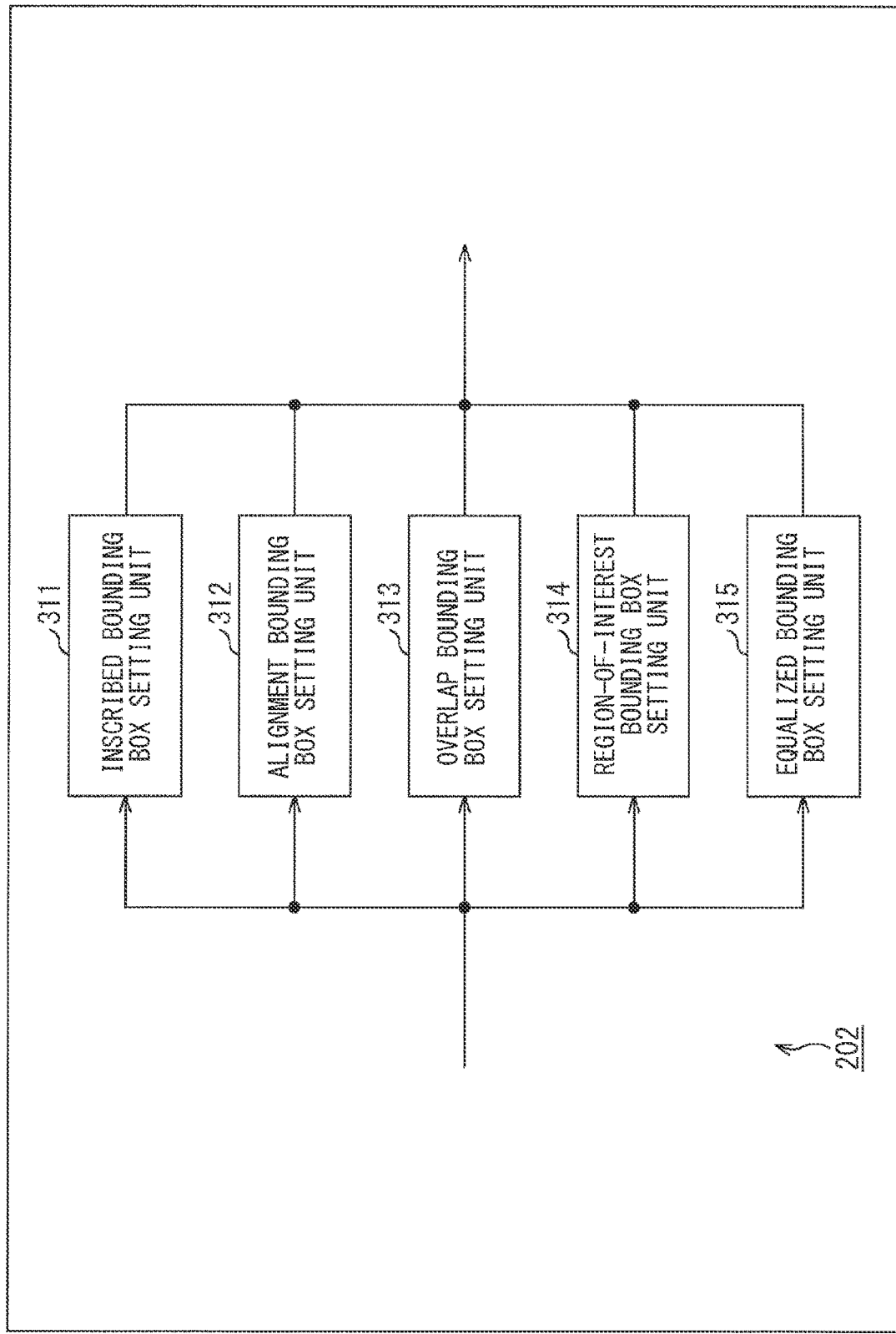
[FIG. 10]

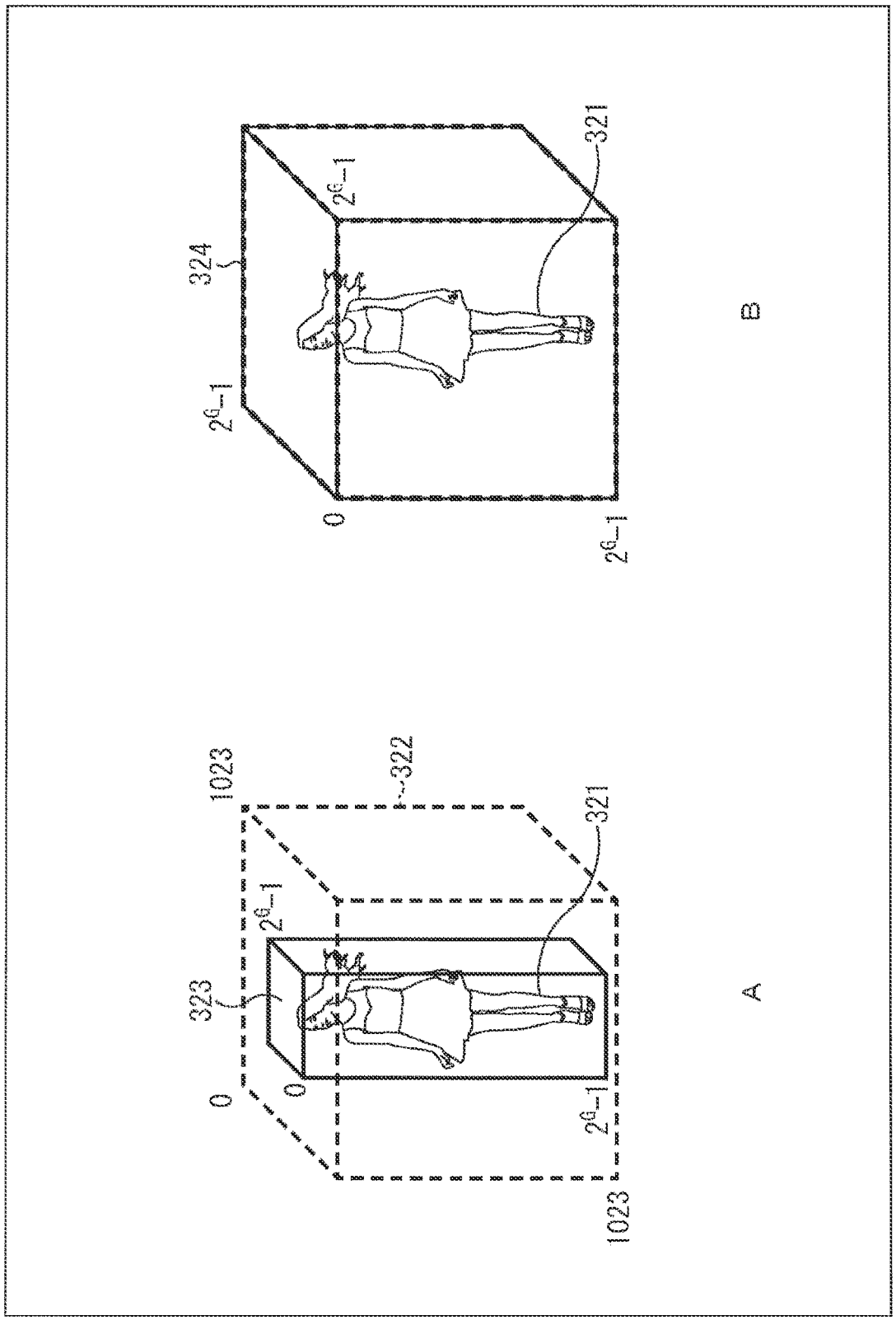

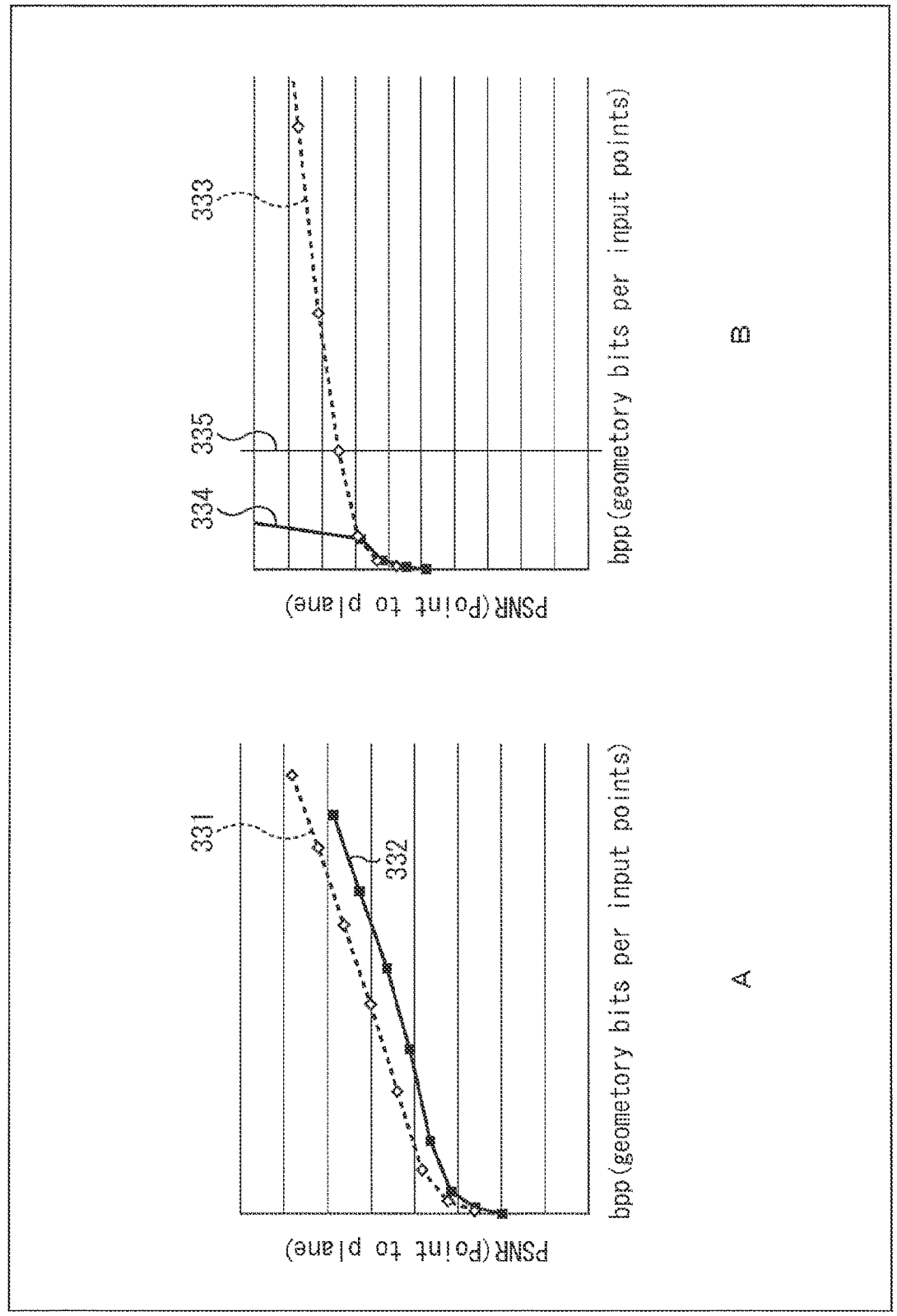
[FIG. 12]

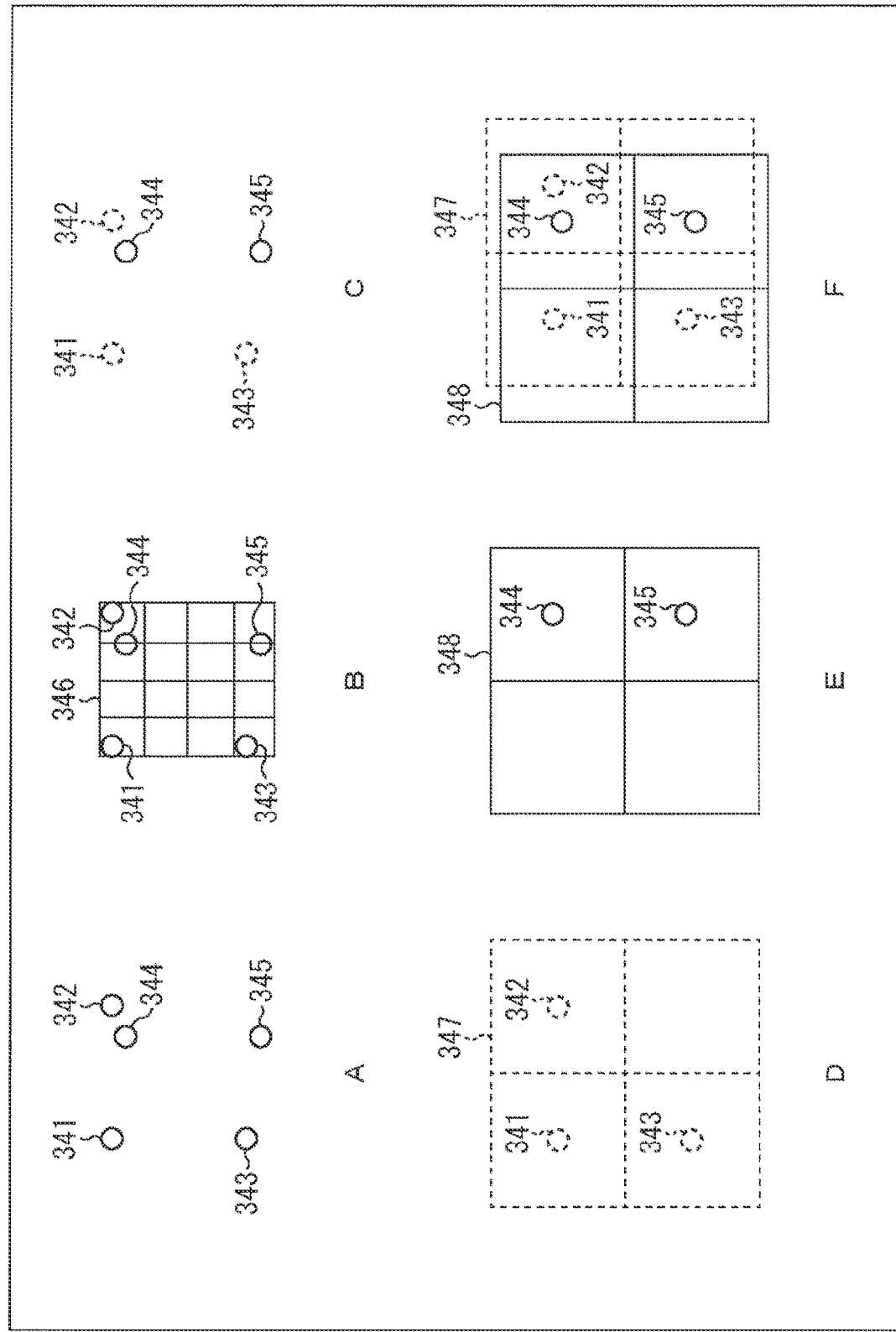

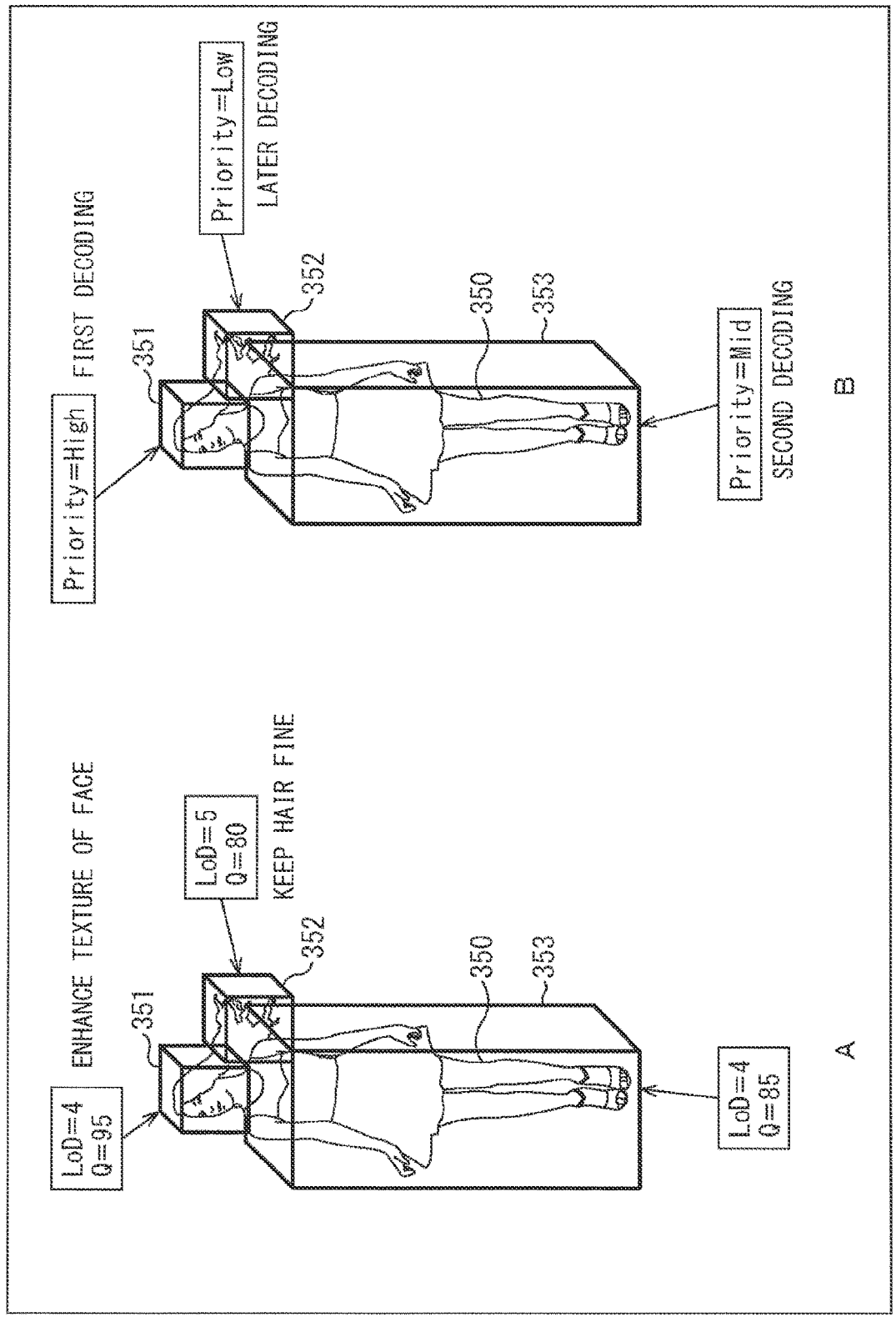

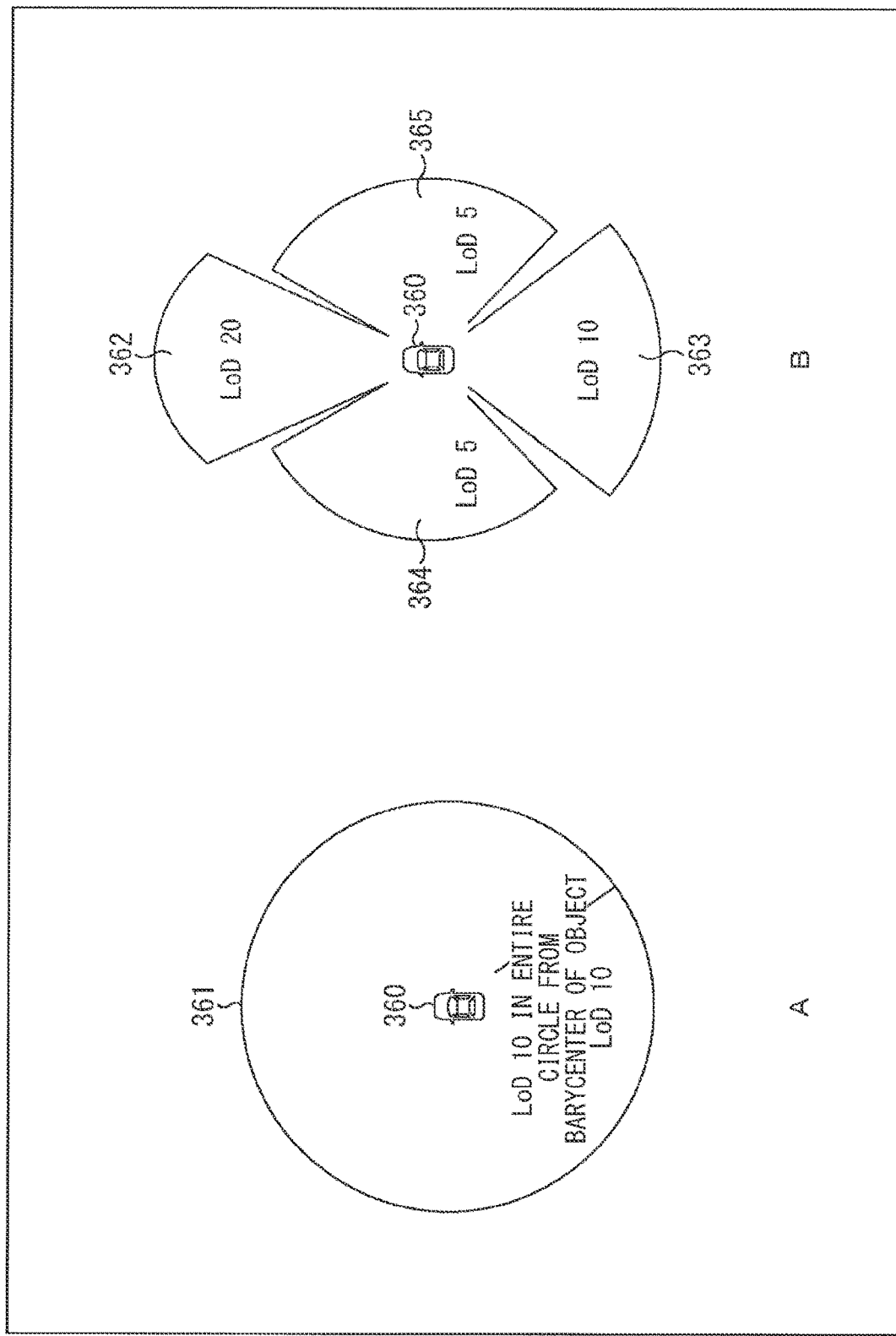

[FIG. 16]

| | ADDITION | n | EFFECTS |
|---|---|---|---|
| BB IN WHICH OBJECT IS INSCRIBED | | 1 | • HIGH PERFORMANCE IN NON-VOXELIZED SEQUENCE<br>• HIGH PERFORMANCE IN VOXELIZED SEQUENCE IN CASE WHERE QUANTIZATION IS COARSE |
| ALIGNING DISTRIBUTION OF POINTS WITH CENTER OF VOXEL | | 1 | • HIGH PERFORMANCE IN VOXELIZED SEQUENCE IN CASE WHERE QUANTIZATION IS FINE |
| COVERING CENTER OF VOXEL WITH A PLURALITY OF BB | | n > 1 | • IN CASE WHERE DIFFERENT VOXELIZED SEQUENCES ARE MIXED |
| DIVIDING BB IN ACCORDANCE WITH ROI | PRIORITY OF PROCESSING | n > 1 | • QUALITY IS DIFFERENT BETWEEN REGION OF INTEREST AND ANOTHER REGION<br>• EVEN IN CASE WHERE COMPUTATIONAL RESOURCE IS POOR, PROCESSING ON ESSENTIAL REGION IS INSURED. |
| DETERMINATION OF BB IN CONSIDERATION OF PROCESSING LOAD | | n > 1 | • PARALLELIZATION PROCESSING BY LIMITING DEPTH OF LOD AND EQUALIZING VOXEL NUMBER FOR EACH BB |

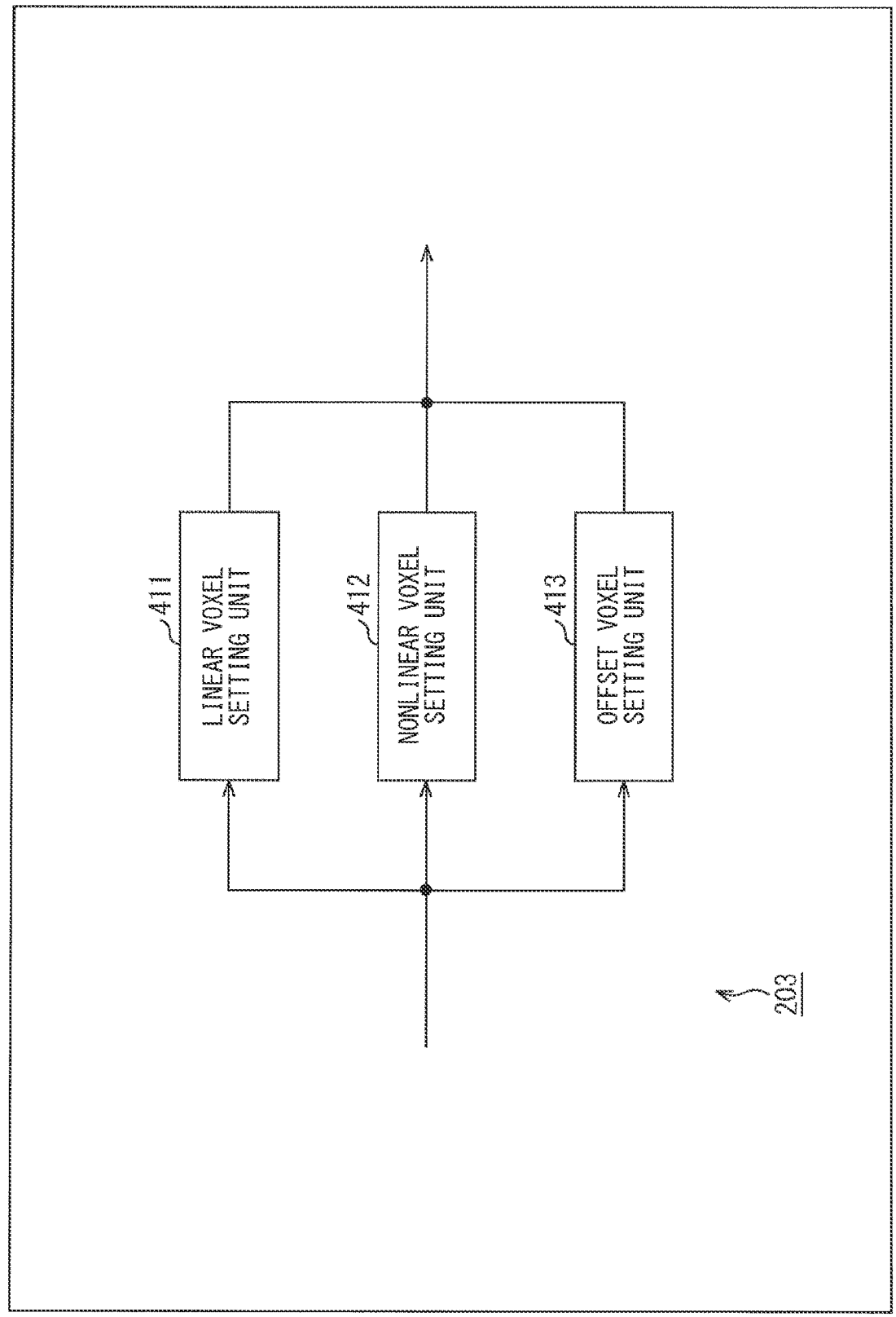

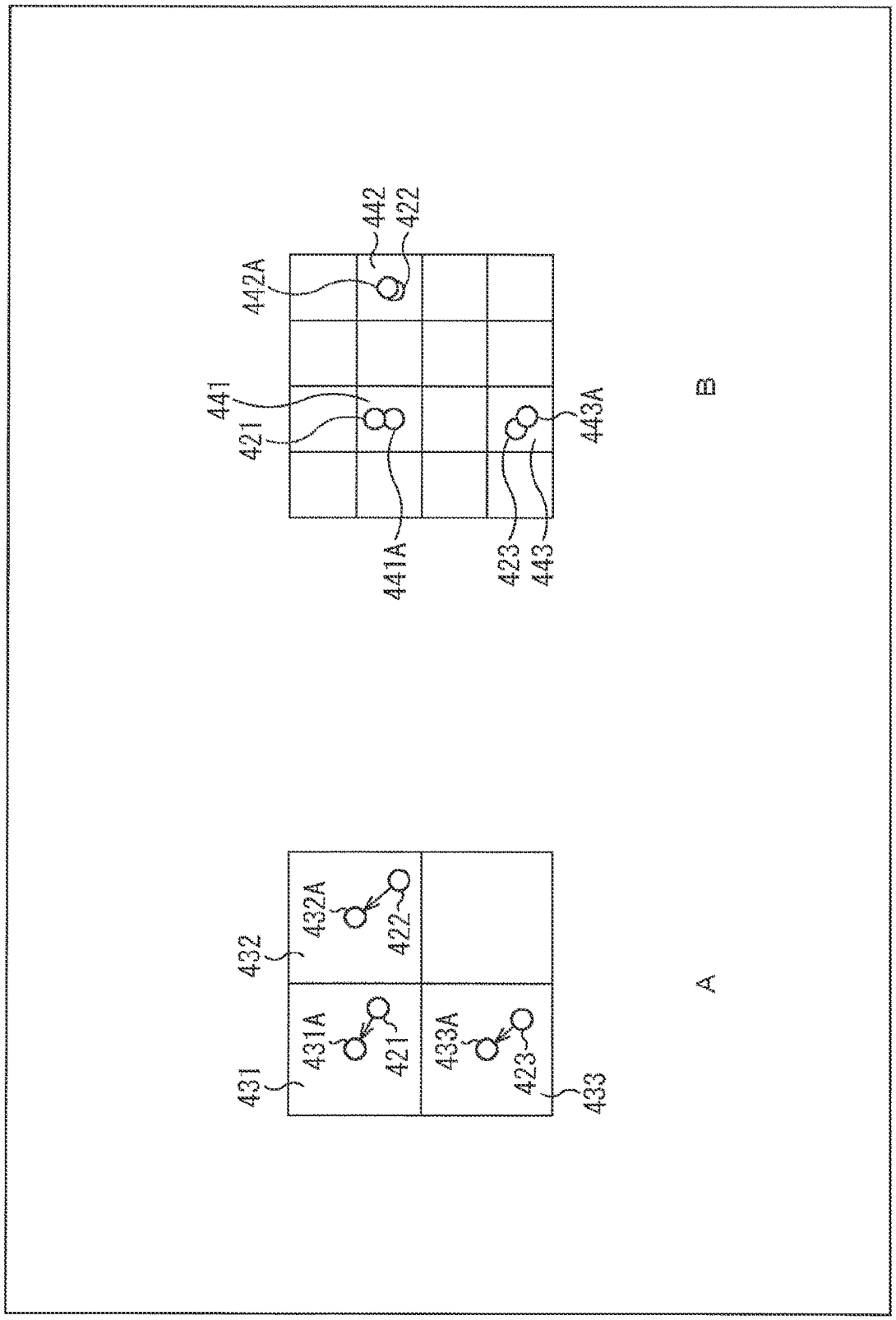

[FIG. 19]
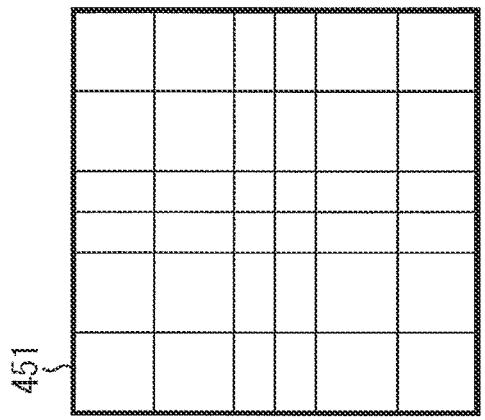

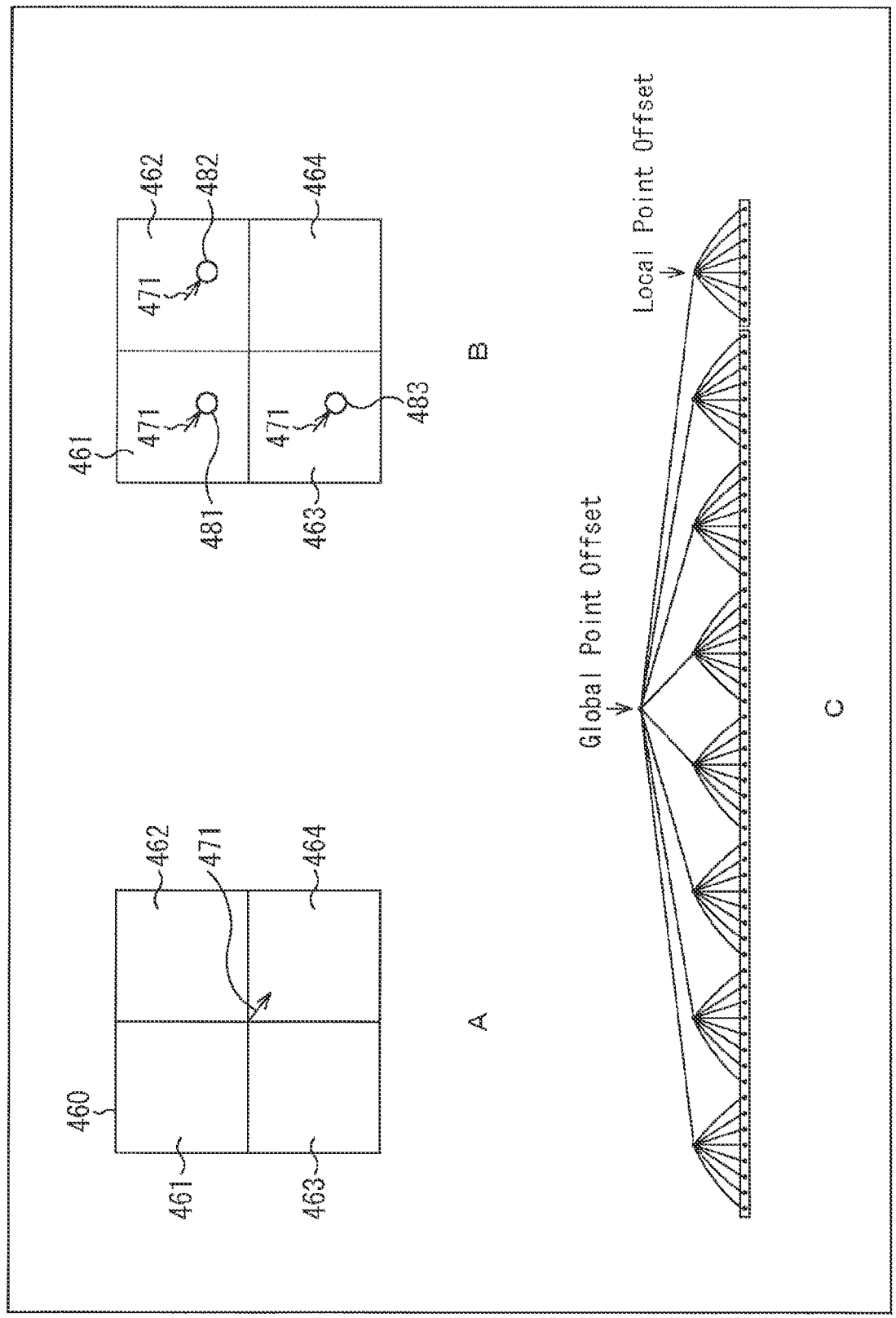
[FIG. 20]

[FIG. 21]

| CUTTING WAY OF C. VOXEL | ADDITION | EFFECTS |
|---|---|---|
| LINEAR | SAME AS IN EXISTING LINEAR VOXEL | SAME AS IN EXISTING LINEAR VOXEL |
| NONLINEAR | NONLINEAR PATTERN AND QUANTIZATION MAP INCLUDED IN SYNTAX | IMPROVEMENT IN GEOMETRY ACCURACY AT SAME LoD AS COMPARED WITH LINEAR EFFECTIVE IN CASE WHERE DESIRED ACCURACY DIFFERS DEPENDING ON POSITION |
| GLOBAL/LOCAL OFFSET | OFFSET VECTOR INCLUDED IN SYNTAX | IMPROVEMENT IN GEOMETRY ACCURACY AT SAME LoD AS COMPARED WITH LINEAR EFFECTIVE IN CASE WHERE POINT SET IS LOCALLY DEVIATED FROM CENTER OF VOXEL |

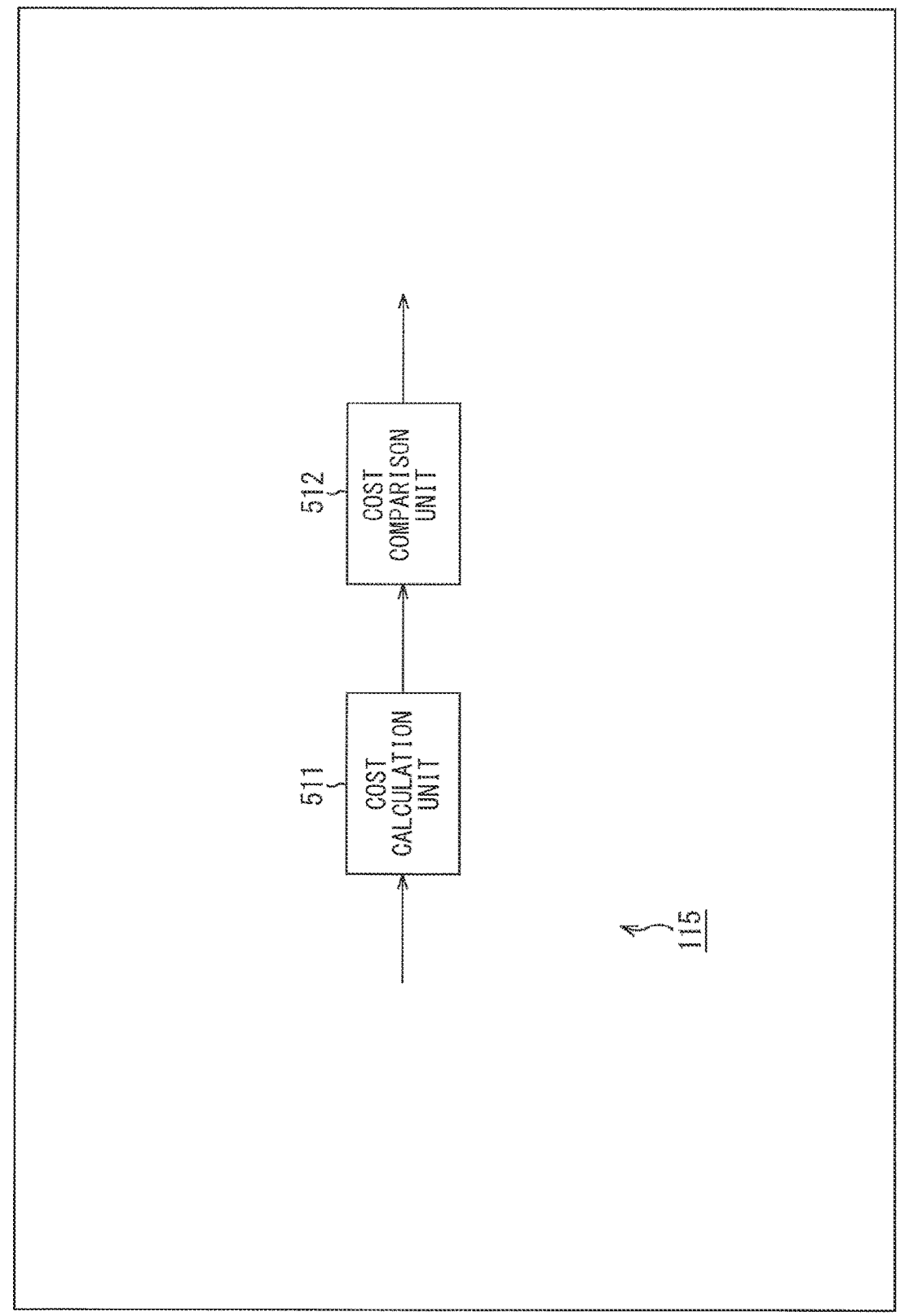

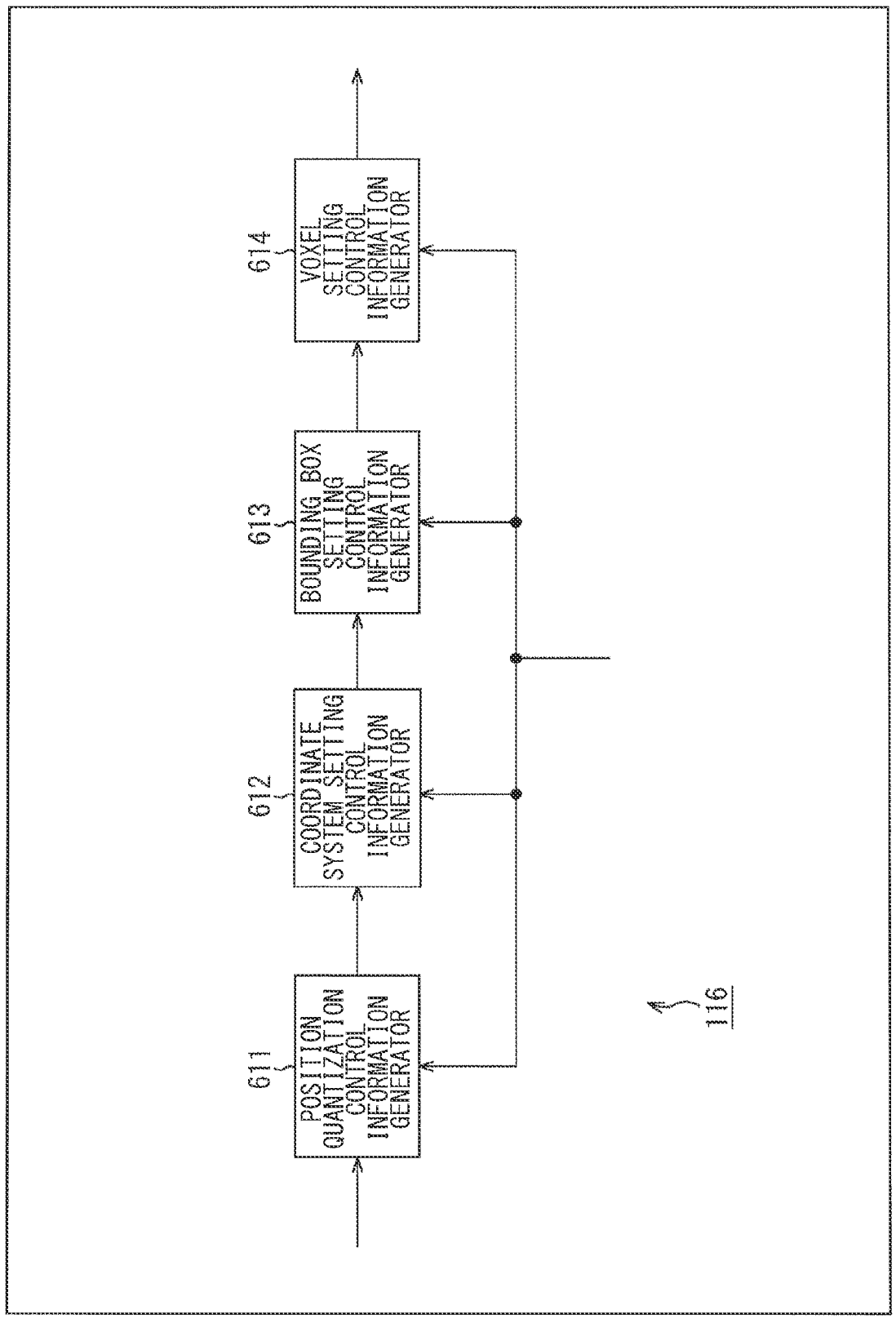
[ FIG. 23 ]

[ FIG. 24 ]
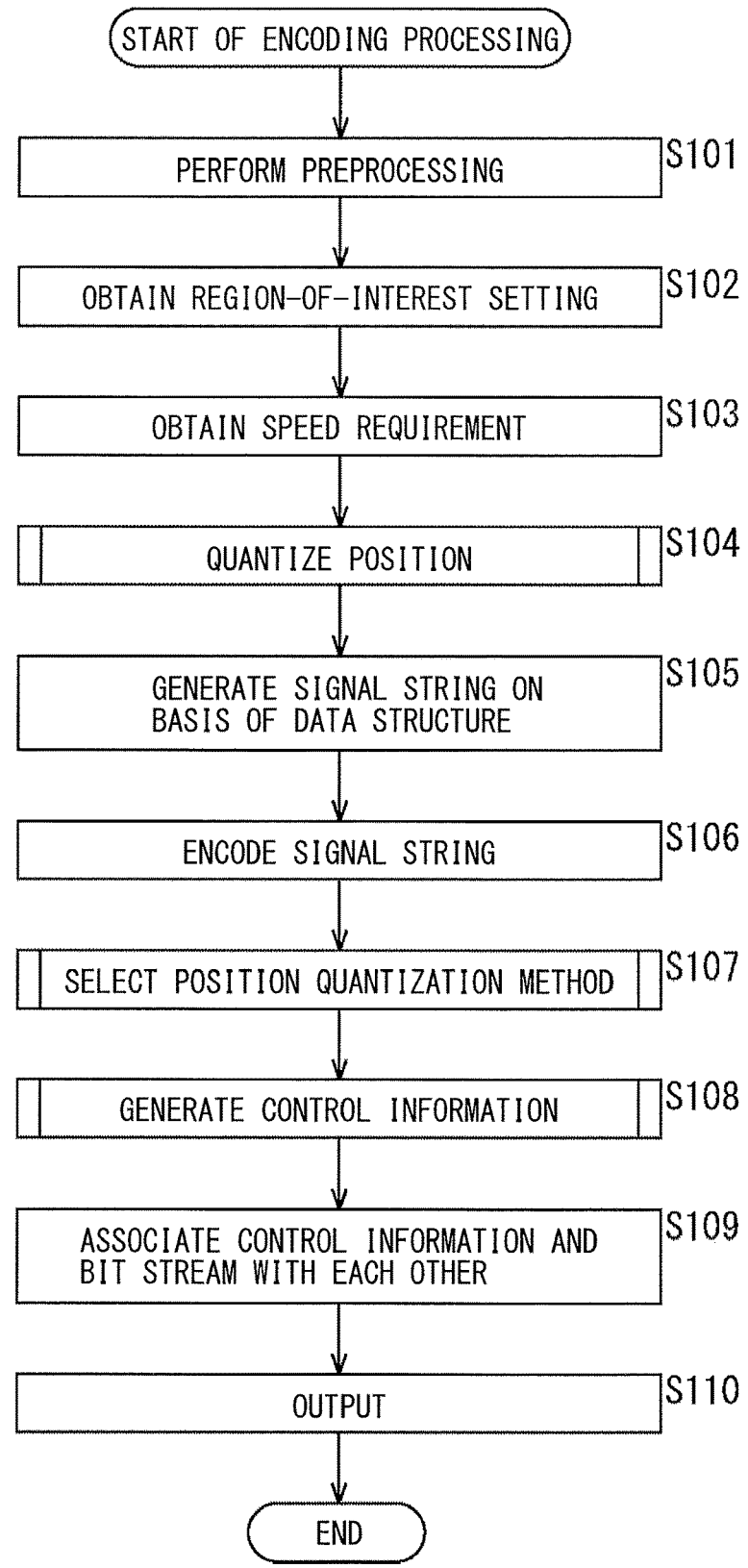

[ FIG. 25 ]
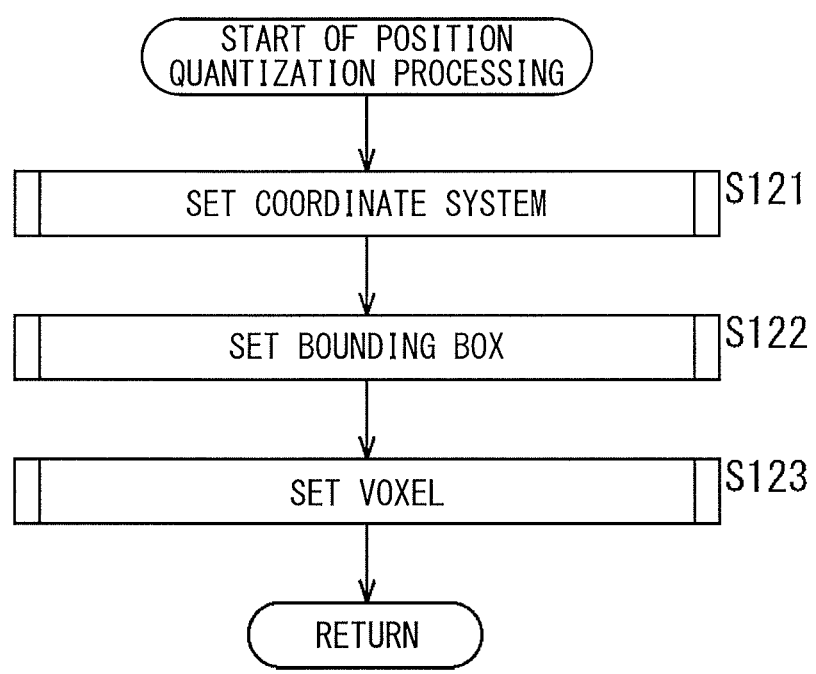

[ FIG. 26 ]
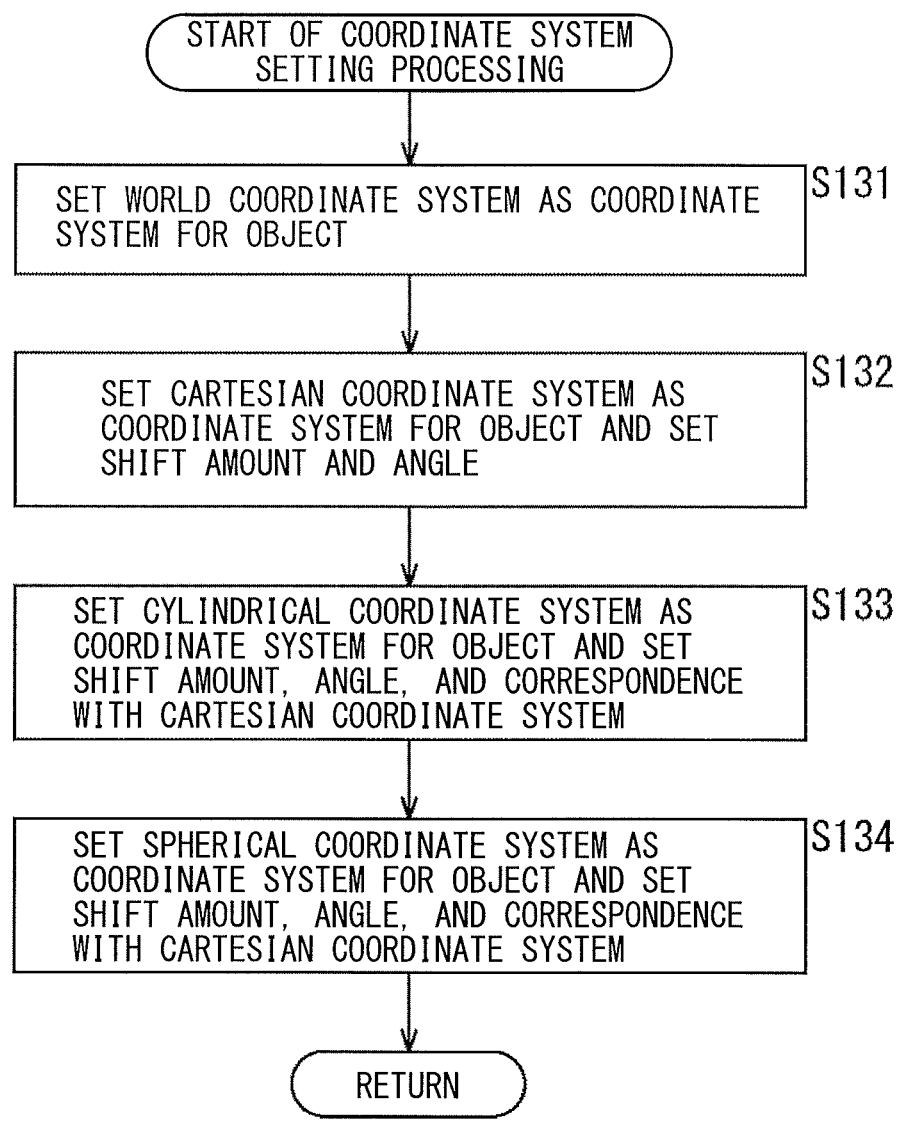

[ FIG. 27 ]
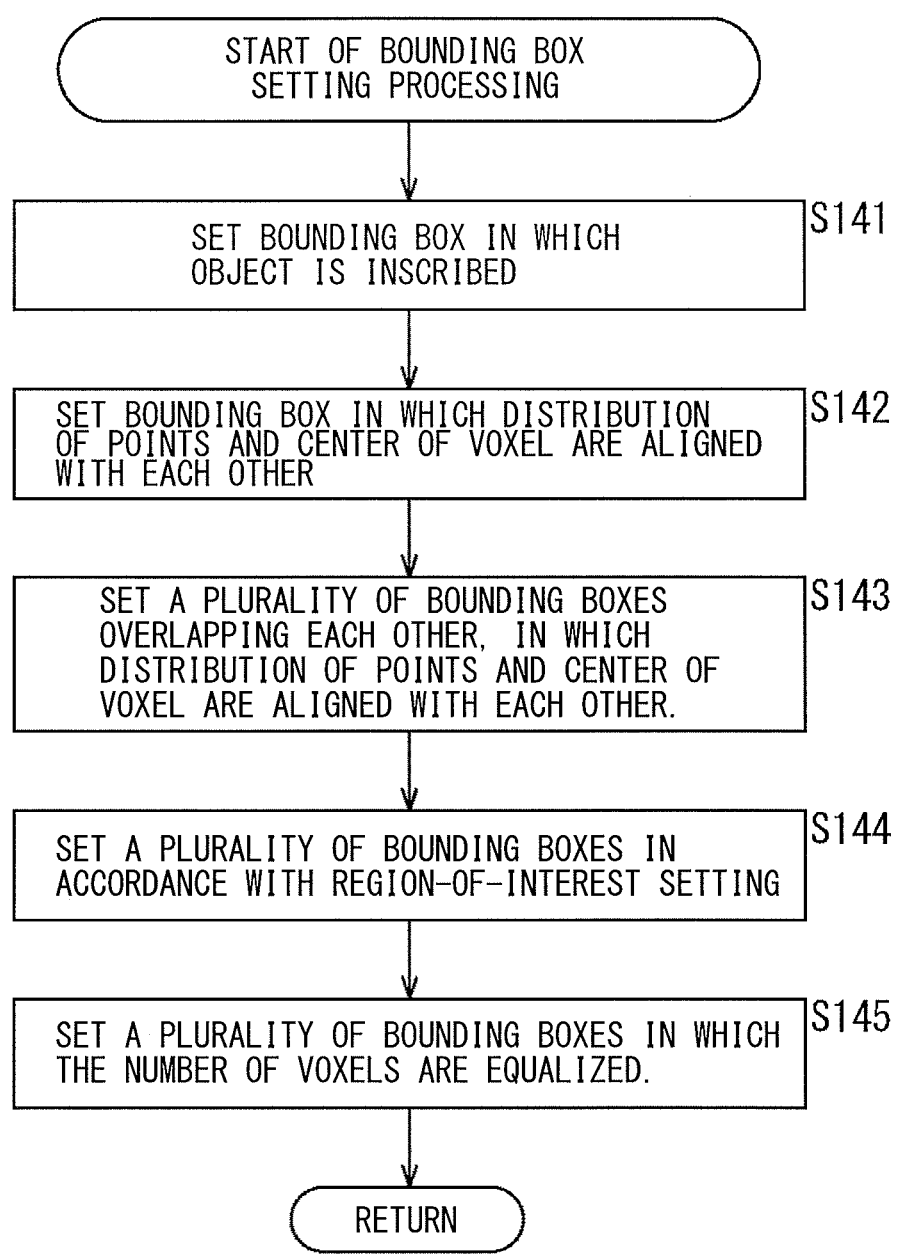

[ FIG. 28 ]
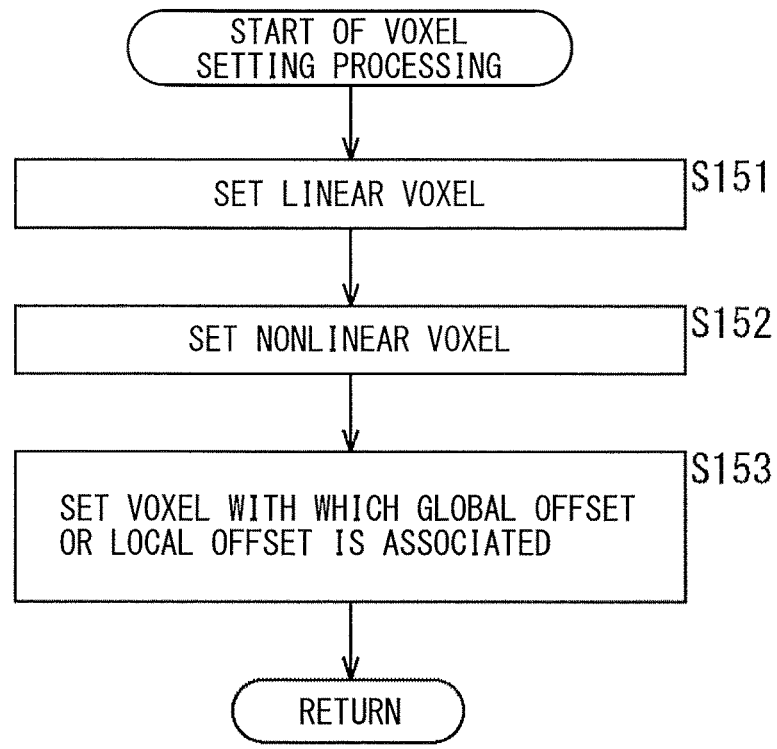
[ FIG. 29 ]
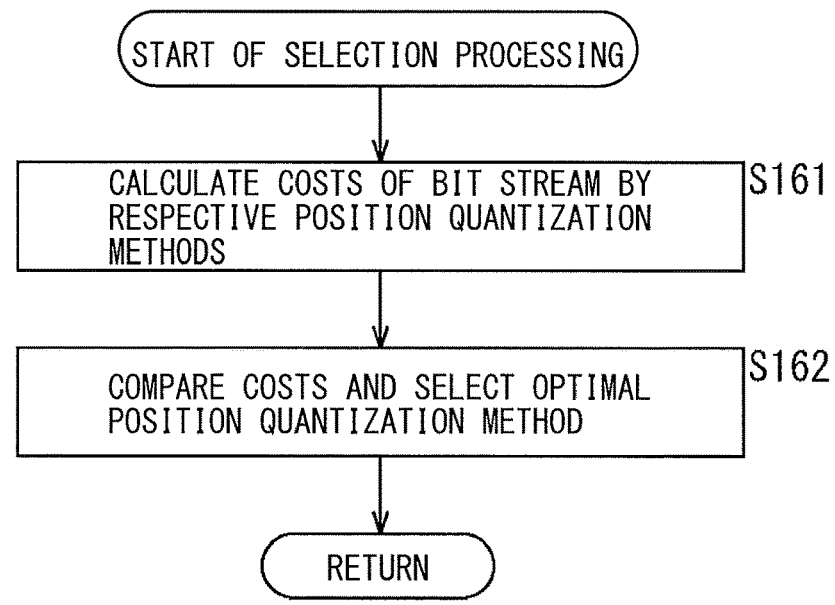

[ FIG. 30 ]
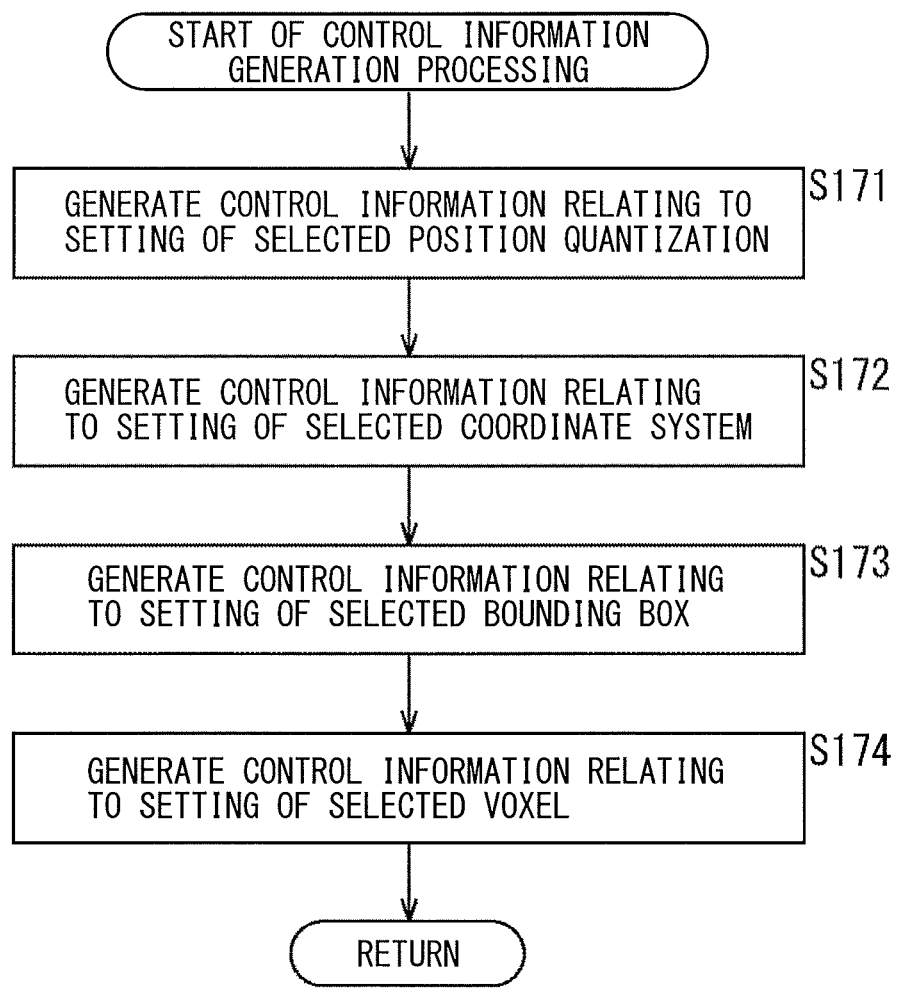

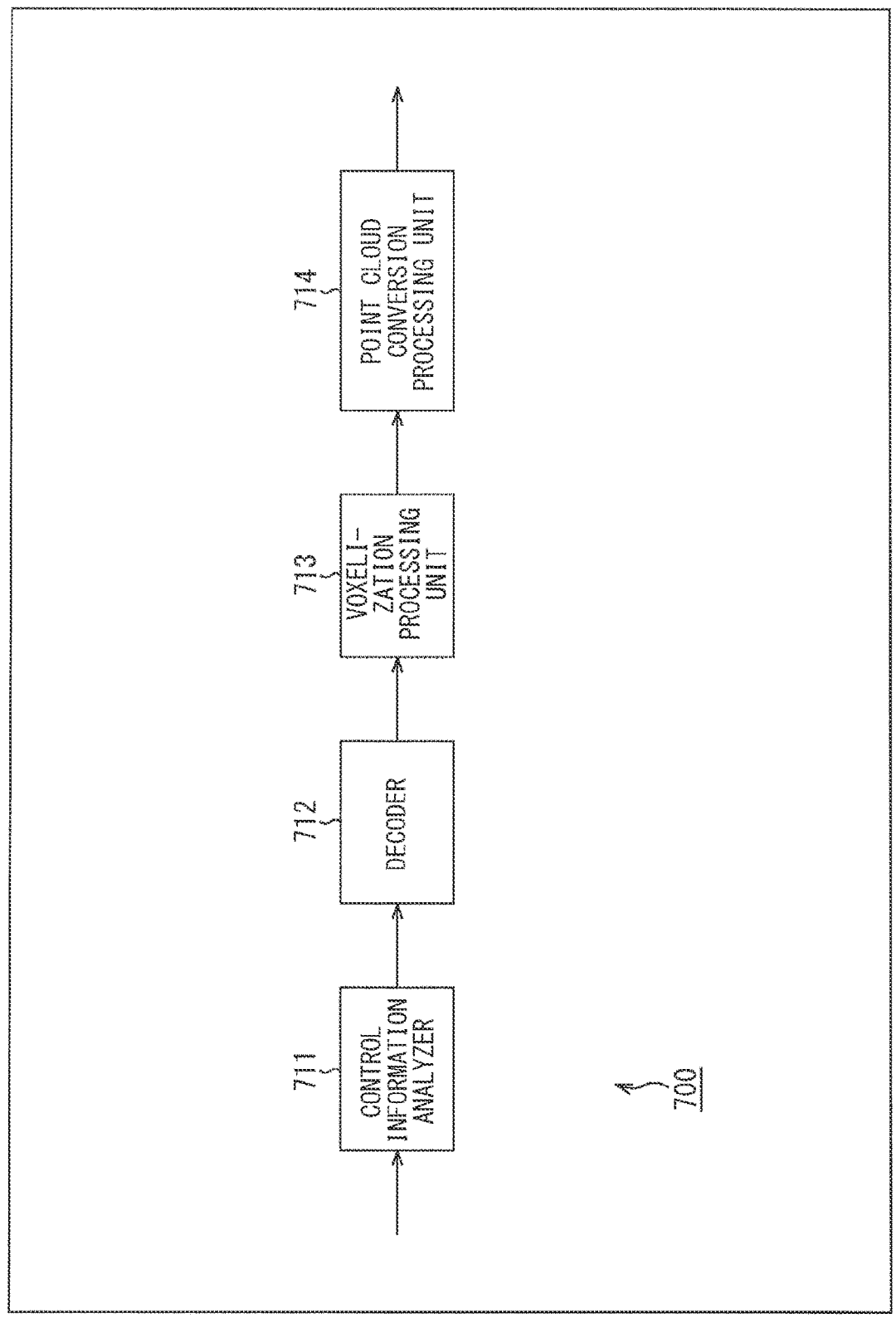

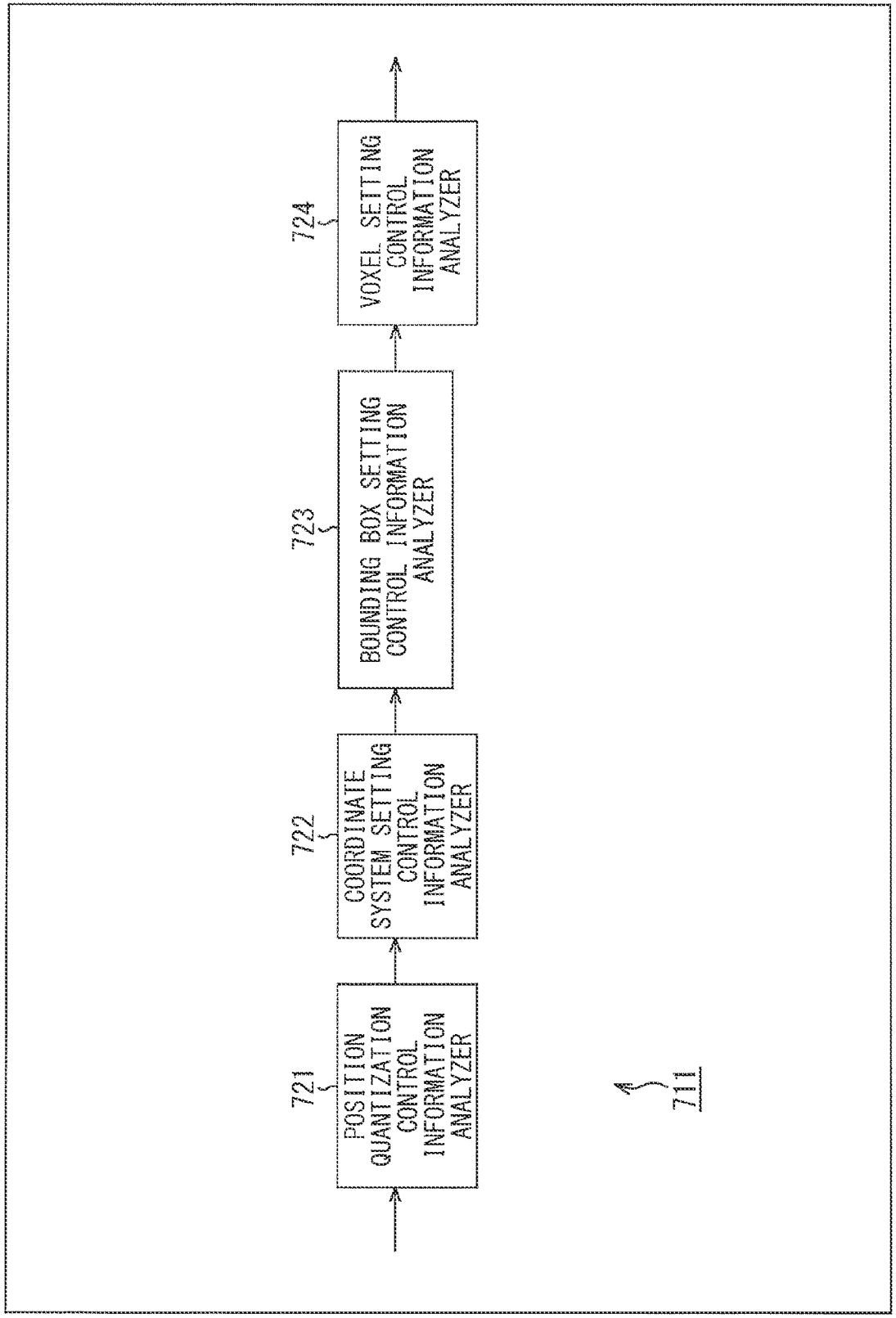
[FIG. 32]

[ FIG. 33 ]
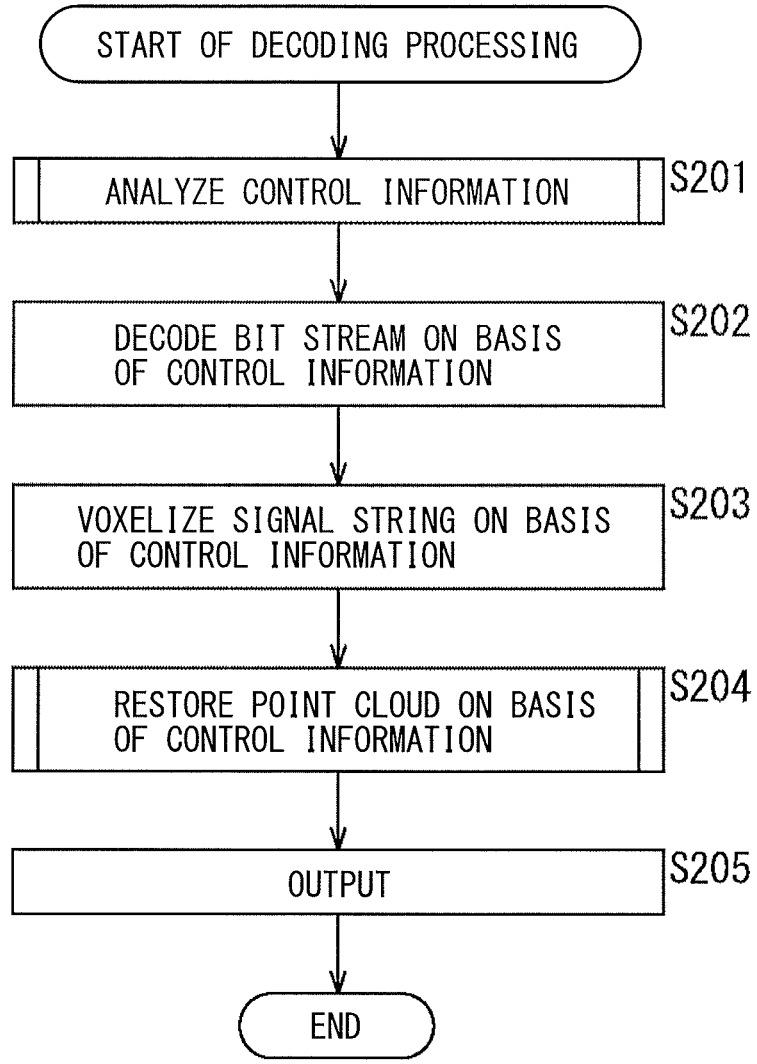

[ FIG. 34 ]
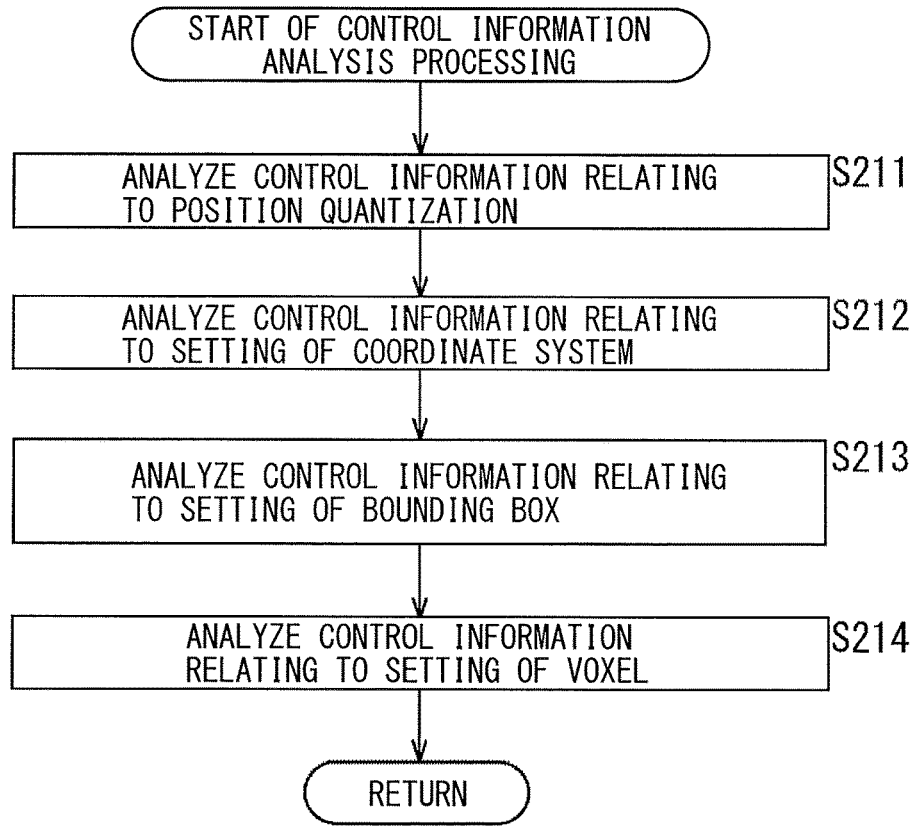
[ FIG. 35 ]
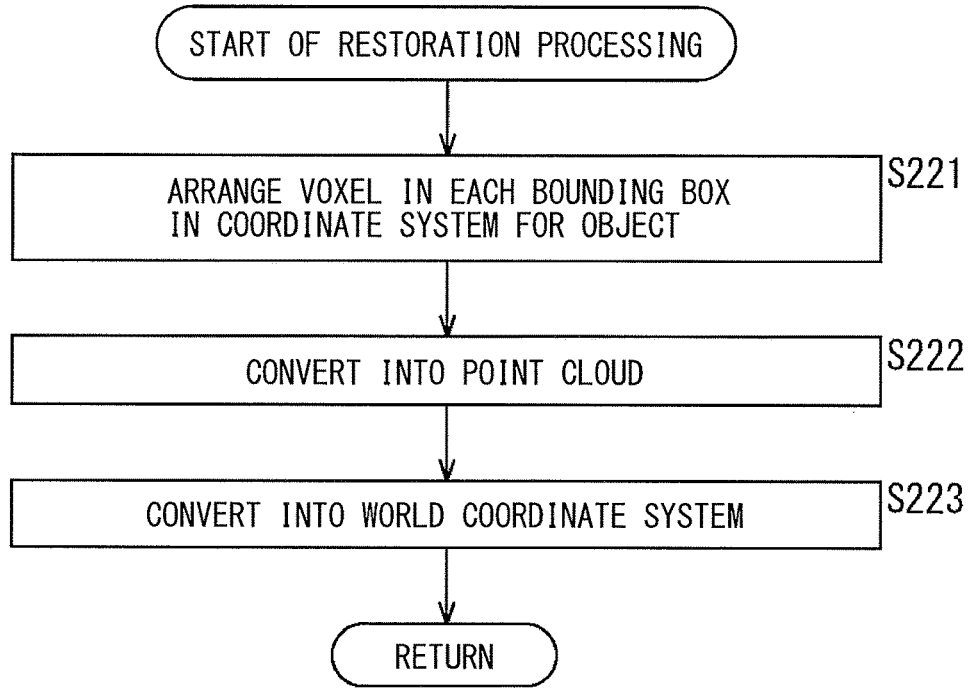

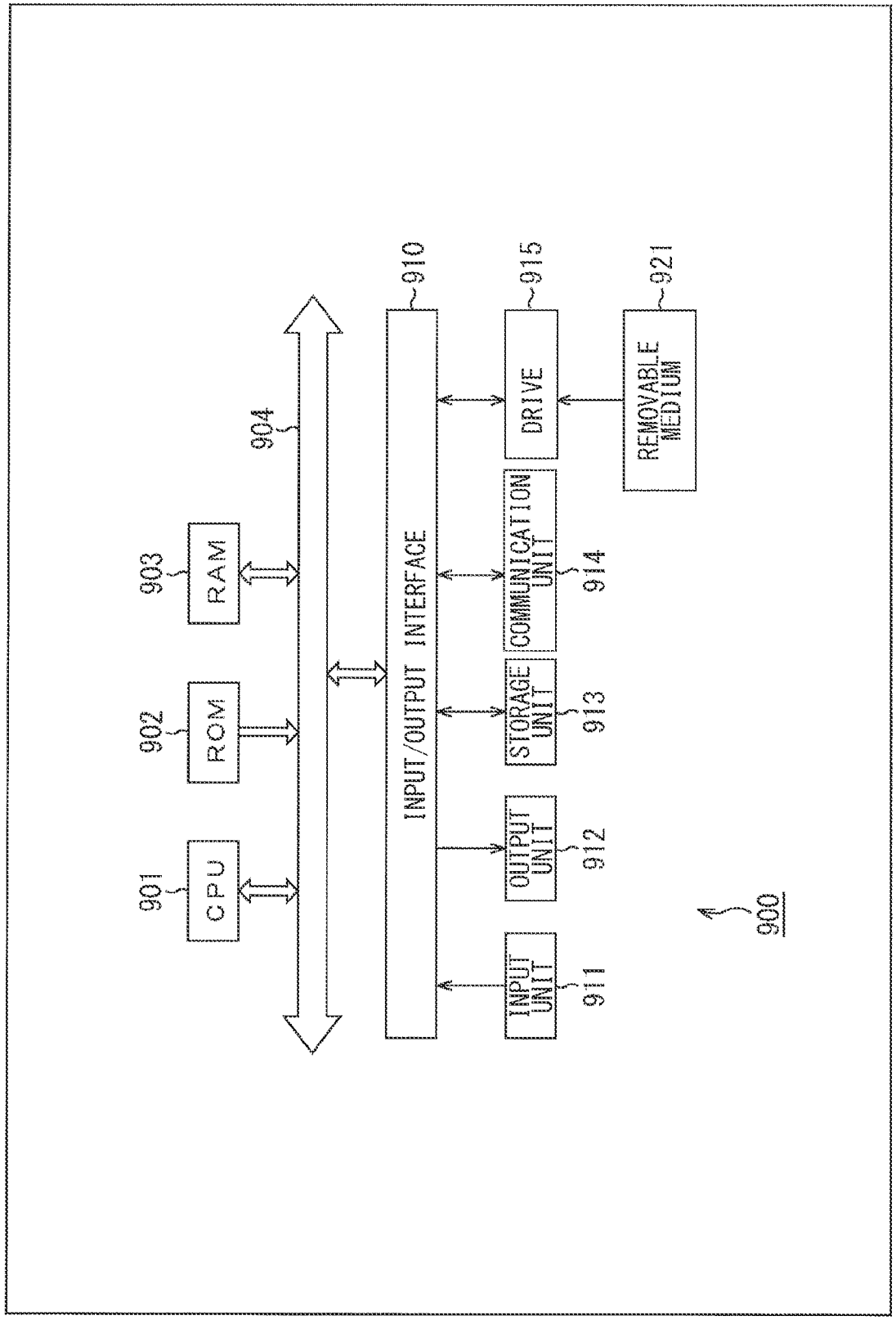
[FIG. 36]

INFORMATION PROCESSING APPARATUS AND METHOD

CROSS REFERENCE TO PRIOR APPLICATION

This application is a National Stage Patent Application of PCT International Patent Application No. PCT/JP2018/024080 (filed on Jun. 26, 2018) under 35 U.S.C. § 371, which claims priority to Japanese Patent Application No. 2017-134534 (filed on Jul. 10, 2017), which are all hereby incorporated by reference in their entirety.

TECHNICAL FIELD

The present disclosure relates to information processing apparatus and method, and specifically to information processing apparatus and method that make it possible to suppress a reduction in encoding efficiency.

BACKGROUND ART

For example, there has been encoding with use of a voxel such as Octree as an existing method of compressing vertex data of a point cloud or a mesh (see, for example, NPTL 1). The point cloud represents a three-dimensional structure by position information, attribute information, and the like of a point set, and the mesh includes vertexes, edges, and faces and defines a three-dimensional shape using a polygon representation.

In the encoding with use of the voxel, as a precondition, it is necessary to normalize position information of an encoding target; therefore, an operation of setting a solid, called a bounding box, including the encoding target is performed.

CITATION LIST

Non-Patent Literature

NPTL 1: R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf

SUMMARY OF THE INVENTION

Problems to be Solved by the Invention

However, in a case of encoding with use of the voxel, there is a possibility that encoding efficiency is reduced if this setting of the bounding box is not appropriate.

The present disclosure has been made in light of such circumstances, and makes it possible to suppress a reduction in encoding efficiency.

Means for Solving the Problems

An information processing apparatus according to one aspect of the present technology is an information processing apparatus including a generator that generates information relating to quantization of a three-dimensional position of an encoding target.

An information processing method according to one aspect of the present technology is an information processing method including generating information relating to quantization of a three-dimensional position of an encoding target.

An information processing apparatus according to another aspect of the present technology is an information processing apparatus including a restoring unit that restores three-dimensional information of an encoding target from a signal string on the basis of information relating to quantization of a three-dimensional position of the encoding target.

An information processing method according to another aspect of the present technology is an information processing method including restoring three-dimensional information of an encoding target from a signal string on the basis of information relating to quantization of a three-dimensional position of the encoding target.

In the information processing apparatus and the information processing method according to the one aspect of the present technology, the information relating to the quantization of the three-dimensional position of the encoding target is generated.

In the information processing apparatus and the information processing method according to the other aspect of the present technology, the three-dimensional information of the encoding target is restored from the signal string on the basis of the information relating to the quantization of the three-dimensional position of the encoding target.

Effects of the Invention

According to the present disclosure, it is possible to process information. In particular, it is possible to suppress a reduction in encoding efficiency.

BRIEF DESCRIPTION OF THE DRAWINGS

FIG. 1 is a diagram for describing an example of a point cloud.

FIG. 2 is a block diagram illustrating a main configuration example of an encoding device.

FIG. 3 is a diagram for describing an example of an outline of encoding.

FIG. 4 is a block diagram illustrating a main configuration example of a position quantizer.

FIG. 5 is a block diagram illustrating a main configuration example of a coordinate system setting unit.

FIG. 6 is a diagram for describing an example of a state of coordinate system setting.

FIG. 7 is a diagram for describing an example of a cylindrical coordinate system.

FIG. 8 is a diagram for describing an example of a spherical coordinate system.

FIG. 9 is a diagram for describing an example of control information relating to a coordinate system.

FIG. 10 is a block diagram illustrating a main configuration example of a bounding box setting unit.

FIG. 11 is a diagram for describing an example of a state of setting of a bounding box.

FIG. 12 is a diagram illustrating a comparative example of PSNR by a bounding box setting method.

FIG. 13 is a diagram for describing an example of a state of setting of overlapping bounding boxes.

FIG. 14 is a diagram for describing an example of a state of setting of a bounding box corresponding to a region of interest.

FIG. 15 is a diagram for describing an example of the state of setting of the bounding box corresponding to the region of interest.

FIG. 16 is a diagram for describing an example of control information relating to the bounding box.

FIG. 17 is a block diagram illustrating a main configuration example of a voxel setting unit.

FIG. 18 is a diagram for describing an example of a state of linear quantization.

FIG. 19 is a diagram for describing an example of a state of nonlinear quantization.

FIG. 20 is a diagram for describing an example of a state of offset setting.

FIG. 21 is a diagram for describing an example of control information relating to an offset.

FIG. 22 is a block diagram illustrating a main configuration example of a selector.

FIG. 23 is a block diagram illustrating a main configuration example of a control information generator.

FIG. 24 is a flow chart illustrating an example of a flow of encoding processing.

FIG. 25 is a flow chart describing an example of a flow of position quantization processing.

FIG. 26 is a flow chart describing an example of a flow of coordinate system setting processing.

FIG. 27 is a flow chart describing an example of a flow of bounding box setting processing.

FIG. 28 is a flow chart describing an example of a flow of voxel setting processing.

FIG. 29 is a flow chart describing an example of a flow of selection processing.

FIG. 30 is a flow chart describing an example of a flow of control information generation processing.

FIG. 31 is a block diagram illustrating a main configuration example of a decoding device.

FIG. 32 is a block diagram illustrating a main configuration example of a control information analyzer.

FIG. 33 is a flow chart describing an example of a flow of decoding processing.

FIG. 34 is a flow chart describing an example of a flow of control information analysis processing.

FIG. 35 is a flow chart describing an example of a flow of decoding processing.

FIG. 36 is a block diagram illustrating a main configuration example of a computer.

MODES FOR CARRYING OUT THE INVENTION

In the following, some modes for carrying out the present disclosure (hereinafter referred to as embodiments) are described with reference to the drawings. It is to be noted that description is given in the following order.

1. Quantization of Three-dimensional Position
2. First Embodiment (encoding device)
3. Second Embodiment (decoding device)
4. Others

1. Quantization of Three-Dimensional Position

<Point Cloud>

There has been existed data of a point cloud, a mesh, or the like. The point cloud represents a three-dimensional structure by position information, attribute information, and the like of a point set, and the mesh includes vertexes, edges, and faces and defines a three-dimensional shape using a polygon representation.

For example, in a case of the point cloud, a three-dimensional structure as illustrated in A of FIG. 1 is represented as a set of a large number of points (a point set) as illustrated in B of FIG. 1. That is, data of the point cloud includes position information and attribute information (for example, colors and the like) of the respective points of the point set. Accordingly, a data structure is relatively simple, and a sufficiently large number of points is used, which makes it possible to represent an optional three-dimensional structure with sufficient accuracy.

However, an amount of data such as a point cloud and a mesh is relatively large, and compression of the amount of data by encoding or the like is thereby demanded. For example, an encoding method with use of a voxel such as Octree and KDtree have been considered. The voxel is a data structure for quantization of position information of an encoding target.

In encoding with use of such a voxel, as a precondition, it is necessary to normalize the position information of the encoding target; therefore, an operation of setting a solid, called bounding box (Bounding box), including the encoding target is performed.

However, in a case of encoding with use of the voxel, there is a possibility that encoding efficiency is reduced if this setting of the bounding box is not appropriate.

<Quantization of Three-Dimensional Position of Encoding Target>

Accordingly, information relating to quantization of a three-dimensional position of the encoding target is generated. Generating the information relating to quantization of the three-dimensional position of the encoding target in such a manner makes it possible to appropriately restore data on the basis of the information on a decoding side. That is, it is possible to achieve encoding/decoding using quantization of the three-dimensional position of the encoding target, and to suppress a reduction in encoding efficiency.

In addition, the three-dimensional position of the encoding target is quantized. Doing so makes it possible to perform encoding using quantization of the three-dimensional position of the encoding target, and to suppress a reduction in encoding efficiency.

It is to be noted that although the present technology is described below with use of a point cloud as an example of data of the encoding target, the present technology is not limited to the point cloud, and is applicable to any encoding target as long as the encoding target represents a three-dimensional structure such as a mesh and is able to be subjected to encoding using the voxel. In addition, the encoding target may be a moving image or a still image.

2. First Embodiment

<Encoding Device>

FIG. 2 is a block diagram illustrating a main configuration example of an encoding device that is an embodiment of an information processing apparatus to which the present technology is applied. An encoding device 100 illustrated in FIG. 2 encodes data of a point cloud inputted as an encoding target with use of a voxel, and outputs the obtained encoded data or the like. At this time, the encoding device 100 performs such encoding by a method to which the present technology is applied, as described below.

As illustrated in FIG. 2, the encoding device 100 includes a controller 101, a preprocessing unit 111, a position quantizer 112, a signal string generator 113, an encoder 114, a selector 115, a control information generator 116, and an association unit 117.

The controller 101 performs processing relating to control of respective processing units in the encoding device 100. For example, the controller 101 controls execution or skipping (omission) of processing by the respective processing units. For example, the controller 101 performs such control on the basis of predetermined control information. Doing so makes it possible for the controller 101 to suppress execution of unnecessary processing and suppress an increase in load.

The controller 101 may have any configuration, and may include, for example, a CPU (Central Processing Unit), a ROM (Read Only Memory), a RAM (Random Access Memory), and the like, and the CPU may load a program and data stored in the ROM and the like into the RAM and execute the program and the data, thereby performing processing.

The preprocessing unit 111 is controlled by the controller 101 to perform predetermined processing as preprocessing on an encoding target (data of a point cloud) inputted to the encoding device 100 and supply the processed data to the position quantizer 112.

For example, the controller 101 causes the preprocessing unit 111 to execute the preprocessing in a case where execution of the preprocessing is permitted (not prohibited) in accordance with control information for permitting or prohibiting execution of the preprocessing. In addition, for example, in accordance with control information indicating a range of the encoding target to be permitted or prohibited to be subjected to execution of preprocessing, the controller 101 causes the preprocessing unit 111 to execute the preprocessing on the encoding target that is permitted (not prohibited) to be subjected to execution of the preprocessing. Further, for example, in accordance with control information specifying contents of processing of which execution is permitted or prohibited, the controller 101 causes the preprocessing unit 111 to execute processing of which execution is permitted (not prohibited). Doing so makes it possible to suppress execution of unnecessary preprocessing and to suppress an increase in load.

It is to be noted that contents of preprocessing are optional. For example, the preprocessing unit 111 may perform processing of reducing noises as preprocessing, or may perform processing of changing resolution (the number of points). Further, for example, arrangement of respective points may be updated to make density of the point set uniform to provide a desired bias. Further, for example, data that is not a point cloud, such as image information having depth information, may be inputted to the encoding device 100, and the preprocessing unit 111 may convert the inputted data into data of a point cloud as preprocessing.

The preprocessing unit 111 may have any configuration, and may include, for example, a CPU, a ROM, a RAM, and the like, and the CPU may load a program and data stored in the ROM and the like into the RAM and execute the program and the data, thereby performing preprocessing.

The position quantizer 112 is controlled by the controller 101 to perform processing relating to quantization of three-dimensional position data of respective points.

For example, the controller 101 causes the position quantizer 112 to quantize the three-dimensional position information in a case where quantization of the three-dimensional position information is permitted (not prohibited) in accordance with control information for permitting or prohibiting quantization of the three-dimensional position information. In addition, for example, in accordance with control information indicating a range of the encoding target to be permitted or prohibited to be subjected to quantization of the three-dimensional position information, the controller 101 causes the position quantizer 112 to quantize the three-dimensional position information of the encoding target that is permitted (not prohibited) to be subjected to quantization of three-dimensional position information. Further, for example, in accordance with control information specifying a parameter to be permitted or prohibited to be used, the controller 101 causes the position quantizer 112 to quantize three-dimensional position information with use of the parameter that is permitted (not prohibited) to be used. Doing so makes it possible to suppress execution of unnecessary quantization and use of an unnecessary parameter and to suppress an increase in load.

Contents of processing for quantization of the three-dimensional position data are optional. For example, processing such as setting of a coordinate system to be subjected to quantization, setting of a bounding box for normalization of position information of respective points, setting of a voxel for quantization of position information of each point, and the like may be performed as this processing.

For example, as illustrated in A of FIG. 3, in a case where an object 131 and an object 132 are represented by data of a point cloud, the position quantizer 112 sets a bounding box 141 and a bounding box 142 to include the object 131 and the object 132, respectively, as illustrated in B of FIG. 3. In addition, for example, as illustrated in C of FIG. 3, the position quantizer 112 divides the bounding box 141 to set a voxel 151. It is to be noted that, although not illustrated, the position quantizer 112 performs similar processing on the bounding box 142.

The position quantizer 112 supplies, to the signal string generator 113, information relating to a data structure for quantization of position information, such as a coordinate system, a bounding box and a voxel, and the data of the point cloud, which are set as described above. In addition, the position quantizer 112 supplies, to the control information generator 116, information relating to quantization of position information as described above. For example, the position quantizer 112 supplies, to the control information generator 116, information relating to various parameters used in quantization of position information, information used by the controller 101 for control of the position quantizer 112, and the like.

It is to be noted that the position quantizer 112 may have any configuration, and may include, for example, a CPU, a ROM, a RAM, and the like, and the CPU may load a program and data stored in the ROM and the like into the RAM and execute the program and the data, thereby performing processing relating to quantization of position information.

The signal string generator 113 is controlled by the controller 101 to perform processing relating to generation of a signal string.

For example, the controller 101 causes the signal string generator 113 to generate a signal string in a case where generation of the signal string is permitted (not prohibited) in accordance with control information for permitting or prohibiting generation of the signal string. In addition, for example, in accordance with control information indicating a range of the encoding target to be permitted or prohibited to be subjected to generation of a signal string, the controller 101 causes the signal string generator 113 to generate a signal string from the encoding target that is permitted (not prohibited) for generation of a signal string. Doing so makes it possible to suppress generation of an unnecessary signal string and to suppress an increase in load.

A method of generating a signal string is optional. For example, the signal string generator 113 may encode (compress) the data of the point cloud in accordance to a data structure for quantization of position information by any method such as Octree or KDtree to generate a signal string.

For example, the signal string generator 113 divides the bounding box in accordance with structures of set voxels, and assigns a point set to each of the voxels, as illustrated in D of FIG. 3. Assigning each point to a voxel causes position information of each point to be quantized to a center of a corresponding voxel.

For example, in an Octree method, the bounding box is divided into eight (8) sections (divided into two (2) sections in an x direction, a y direction, and a z direction) to be voxelized. Such division into eight sections is recursively repeated up to a predetermined hierarchy. In this case, only voxels including points are subjected to division into eight sections, and voxels not including the points are not subjected to division into eight sections. The voxels are layered in accordance with a distribution of the point set in such a manner, which makes it possible to reduce the number of unnecessary voxels and to suppress an unnecessary increase in an information amount.

The signal string generator 113 encodes the information of each point as described above to obtain information of each voxel, and then arranges the information of each voxel in predetermined order to generate a signal string. The signal string generator 113 supplies the generated signal string to the encoder 114.

It is to be noted that the signal string generator 113 may have any configuration, and may include, for example, a CPU, a ROM, a RAM, and the like, and the CPU may load a program or data stored in the ROM or the like into the RAM and execute the program or the data, thereby performing processing relating to generation of a signal string.

The encoder 114 is controlled by the controller 101 to perform processing relating to encoding of the supplied signal string (i.e., the encoding target of which the three-dimensional position is quantized).

For example, the controller 101 causes the encoder 114 to encode the signal string in a case where encoding of the signal string is permitted (not prohibited) in accordance with control information for permitting or prohibiting encoding of the signal string. In addition, for example, in accordance with control information indicating a range of the encoding target to be permitted or prohibited to be subjected to encoding of the signal string, the controller 101 causes the encoder 114 to encode a signal string for the encoding target that is permitted (not prohibited) to be subjected to encoding of the signal string. Doing so makes it possible to suppress encoding of an unnecessary signal string and to suppress an increase in load.

A method of encoding the signal string is optional. For example, the encoder 114 may encode a signal string by variable length coding (VLC (Variable Length Code)). The encoder 114 supplies, to the selector 115, encoded data (a bit stream) obtained by such encoding.

The encoder 114 may have any configuration, and may include, for example, a CPU, a ROM, a RAM, and the like, and the CPU may load a program or data stored in the ROM or the like into the RAM and execute the program and the data, thereby performing processing relating to encoding.

It is possible for the position quantizer 112 described above to perform processing relating to quantization of the three-dimensional position information by a plurality of methods, for example. The signal string generator 113 and the encoder 114 perform the above-described processing on data structures for quantization of position information obtained by the respective methods. That is, encoded data is obtained in each of quantization methods of the three-dimensional position information that have been performed by the position quantizer 112.

The selector 115 is controlled by the controller 101 to perform processing relating to selection of the quantization methods of the three-dimensional position of the encoding target. For example, the selector 115 selects a desired encoding result from a plurality of encoding results (encoded data) obtained as described above, thereby selecting a quantization method of the position information corresponding to the encoding result.

For example, the controller 101 causes the selector 115 to select a quantization method in a case where selection of a quantization method is permitted (not prohibited) in accordance with control information for permitting or prohibiting selection of the quantization method. In addition, for example, in accordance with control information indicating a scope of the encoding target to be permitted or prohibited to be subjected to selection of the quantization method, the controller 101 causes the selector 115 to select a quantization method for the encoding target that is permitted (not prohibited) for selection of the quantization method. Doing so makes it possible to suppress unnecessary selection of the quantization method and to suppress an increase in load.

This method of selecting the quantization method is optional. For example, the selector 115 may calculate a RD (Rate Distortion) cost of the encoding result, and select an optimal quantization method on the basis of a value of the calculated RD (Rate Distortion) cost.

The selector 115 supplies the selected encoded data to the association unit 117. In addition, the selector 115 supplies, to the control information generator 116, information indicating the selected quantization method (information indicating a selection result).

The selector 115 may have any configuration, and may include, for example, a CPU, a ROM, a RAM, and the like, and the CPU may load a program or data stored in the ROM or the like into the RAM and execute the program or data, thereby performing processing relating to selection.

The control information generator 116 is controlled by the controller 101 to perform processing relating to generation of information relating to quantization of three-dimensional position information.

For example, the controller 101 causes the control information generator 116 to generate information relating to quantization of three-dimensional position information in a case where generation of information relating to quantization of three-dimensional position information is permitted (not prohibited) in accordance with control information for permitting or prohibiting the generation of information relating to quantization of three-dimensional position information. In addition, for example, in accordance with control information indicating a range of the encoding target to be permitted or prohibited to be subjected to generation of information relating to quantization of three-dimensional position information, the controller 101 causes the control information generator 116 to generate information relating to quantization of three-dimensional position information for the encoding target that is permitted (not prohibited) for generation of information relating to quantization of three-dimensional position information. Doing so makes it possible to suppress unnecessary generation of information relating to quantization of three-dimensional position information and to suppress an increase in load.

For example, the control information generator 116 generates information relating to quantization of position information (also referred to as control information) with use of information relating to quantization of position information corresponding to the quantization method selected by the selector 115. The control information generator 116 supplies the generated control information to the association unit 117.

The control information generator 116 may have any configuration, and may include, for example, a CPU, a ROM, a RAM, and the like, and the CPU may load a program and data stored in the ROM and the like into the RAM and execute the program and the data, thereby performing processing relating to generation of the control information.

The association unit 117 is controlled by the controller 101 to perform processing relating to association between encoded data and the control information.

For example, the controller 101 causes the association unit 117 to associate encoded data and the control information with each other in a case where association is permitted (not prohibited) in accordance with the control information for permitting or prohibiting the association. In addition, for example, in accordance with control information indicating a range of the encoding target to be permitted or prohibited to be subjected to association between encoded data and the control information, the controller 101 causes the association unit 117 to associate the encoded data and the control information for the encoding target that is permitted to be subjected to association between the encoded data and the control information. Doing so makes it possible to suppress unnecessary association and to suppress an increase in load.

For example, the association unit 117 associates the control information supplied from the control information generator 116 with the encoded data supplied from the selector 115.

It is to be noted that the term "associate" here means, for example, that in a case where one piece of data is processed, another piece of data is made usable (made linkable). That is, pieces of data associated with each other may be brought together as one piece of data, or may be individual pieces of data. For example, the control information associated with the encoded data may be transmitted through a transmission path other than a transmission path of the encoded data. In addition, for example, the control information associated with the encoded data may be recorded in a recording medium different from a recording medium in which the encoded data is recorded (or in a different recording region of the same recording medium). It is to be noted that the "association" may be performed on a portion of data instead of the entirety of the data. For example, data may be associated with each other in any unit such as a plurality of frames, one frame, or a portion in a frame.

The association unit 117 outputs these data associated with each other to outside of the encoding device 100. The data (the encoded data and the control information) outputted from the encoding device 100 may be decoded by an unillustrated processing unit in a subsequent stage, for example, to restore the data of the point cloud, may be sent by an unillustrated communication unit to be transmitted to another device such as a decoding device through a predetermined transmission path, or may be recorded in an unillustrated recording medium. It is to be noted that the association unit 117 may output the encoded data and the control information without associating the encoded data and the control information with each other.

<Position Quantizer>

FIG. 4 is a block diagram illustrating a main configuration example of the position quantizer 112 illustrated in FIG. 2. As illustrated in FIG. 4, the position quantizer 112 includes a coordinate system setting unit 201, a bounding box setting unit 202, and a voxel setting unit 203.

The coordinate system setting unit 201 is controlled by the controller 101 to perform processing relating to setting of a coordinate system to be subjected to quantization of three-dimensional position information.

For example, the controller 101 causes the coordinate system setting unit 201 to set a coordinate system in a case where setting of the coordinate system is permitted (not prohibited) in accordance with control information for permitting or prohibiting setting of the coordinate system to be subjected to quantization of three-dimensional position information. In addition, for example, in accordance with control information indicating a range of the encoding target to be permitted or prohibited to be subjected to setting of the coordinate system to be subjected to quantization of three-dimensional position information, the controller 101 causes the coordinate system setting unit 201 to set the coordinate system for the encoding target that is permitted (not prohibited) to be subjected to setting of the coordinate system. Doing so makes it possible to suppress setting of an unnecessary coordinate system and to suppress an increase in load.

Further, for example, in accordance with control information relating to permission or prohibition of a parameter to be used for setting of the coordinate system to be subjected to quantization of three-dimensional position information, the controller 101 causes the coordinate system setting unit 201 to set a coordinate system to be subjected to quantization of three-dimensional position information with use of the parameter that is permitted (not prohibited) to be used. For example, a settable coordinate system, a relative attitude (a shift amount and an angle) with respect to a settable world coordinate system, or the like may be specified by the control information. Doing so makes it possible to suppress use of an unnecessary parameter and to suppress an increase in load.

For example, the coordinate system setting unit 201 sets a coordinate system to be subjected to quantization of three-dimensional position information of each point of the data of the point cloud supplied from the preprocessing unit 111. It is possible for the coordinate system setting unit 201 to set any coordinate system as a coordinate system to be subjected to quantization. For example, it is possible for the coordinate system setting unit 201 to set a coordinate system such as a world coordinate system, a Cartesian coordinate system, a cylindrical coordinate system, and a spherical coordinate system as a coordinate system to be subjected to quantization. Needless to say, a coordinate system other than these examples is settable. It is possible for the coordinate system setting unit 201 to set any number of coordinate systems. For example, the number may be one or plural.

The coordinate system setting unit 201 supplies information relating to the set coordinate system to the bounding box setting unit 202. The coordinate system setting unit 201 also supplies the information relating to the set coordinate system to the control information generator 116.

It is to be noted that the coordinate system setting unit 201 may have any configuration, and may include, for example, a CPU, a ROM, a RAM, and the like, and the CPU may load a program and data stored in the ROM and the like into the RAM and execute the program and the data, thereby performing processing relating to the setting of the coordinate system.

The coordinate system setting unit 201 sets, for example, a coordinate system more suitable for an object of the encoding target as a coordinate system to be subjected to quantization of the three-dimensional position information of each point of the data of the point cloud, which makes it possible to perform setting of a bounding box more appropriately. In addition, it is possible to further reduce an information amount of the quantized signal string. Accordingly, it is possible to suppress a reduction in encoding efficiency.

The bounding box setting unit 202 is controlled by the controller 101 to perform processing relating to setting of a bounding box for normalization of position information of the encoding target.

For example, the controller 101 causes the bounding box setting unit 202 to set a bounding box in a case where setting of the bounding box is permitted (not prohibited) in accordance with control information for permitting or prohibiting setting of the bounding box. In addition, for example, in accordance with control information indicating a range of the encoding target to be permitted or prohibited to be subjected to setting of the bounding box, the controller 101 causes the bounding box setting unit 202 to set a bounding box for the encoding target that is permitted (not prohibited) to be subjected to setting of the bounding box. Further, for example, in accordance with control information relating to permission or prohibition of a parameter to be used for setting of the bounding box, the controller 101 causes the bounding box setting unit 202 to set the bounding box with use of the parameter that is permitted (not prohibited) to be used. Doing so makes it possible to suppress setting of an unnecessary bounding box and use of an unnecessary parameter and to suppress an increase in load.

For example, the bounding box setting unit 202 sets the bounding box for each object of the encoding target with use of the coordinate system set by the coordinate system setting unit 201. It is to be noted that in a case where a plurality of bounding boxes is set, it is possible for the bounding box setting unit 202 to return processing to the coordinate system setting unit 201 to set a coordinate system for each of the bounding boxes. In other words, it is possible for the coordinate system setting unit 201 to set a coordinate system for each of the bounding boxes. In this case, the bounding box setting unit 202 sets each of the bounding boxes with use of a coordinate system assigned to each of the bounding boxes.

In a case where the bounding box is set, the bounding box setting unit 202 supplies information relating to the bounding box to the voxel setting unit 203. The bounding box setting unit 202 also supplies the information relating to the set bounding box to the control information generator 116.

It is to be noted that the bounding box setting unit 202 may have any configuration, and may include, for example, a CPU, a ROM, a RAM, and the like, and the CPU may load a program and data stored in the ROM and the like into the RAM and execute the program and the data, thereby performing processing relating to setting of the bounding box.

The bounding box setting unit 202 sets, for example, a bounding box more suitable for the object of the encoding target, which makes it possible to further reduce the information amount of the quantized signal string and to suppress a reduction in encoding efficiency.

The voxel setting unit 203 is controlled by the controller 101 to perform processing relating to setting of a voxel for quantization of position information of the encoding target.

For example, the controller 101 causes the voxel setting unit 203 to set a voxel in a case where setting of the voxel is permitted (not prohibited) in accordance with control information for permitting or prohibiting setting of the voxel. In addition, for example, in accordance with control information indicating a range of the encoding target to be permitted or prohibited to be subjected to setting of a voxel, the controller 101 causes the voxel setting unit 203 to set a voxel for the encoding target that is permitted (not prohibited) to be subjected to setting of the voxel. Further, for example, in accordance with control information relating to permission or prohibition of a parameter to be used for setting of the voxel, the controller 101 causes the voxel setting unit 203 to set the voxel with use of the parameter that is permitted (not prohibited) to be used. Doing so makes it possible to suppress setting of an unnecessary voxel and use of an unnecessary parameter and to suppress an increase in load.

For example, the voxel setting unit 203 sets a voxel in the bounding box set by the bounding box setting unit 202. It is to be noted that in a case where there is a plurality of bounding boxes, the voxel setting unit 203 sets voxels for the respective bounding boxes. In a case where the voxel is set, the voxel setting unit 203 supplies information relating to the voxel to the signal string generator 113. The voxel setting unit 203 also supplies the information relating to the set voxel to the control information generator 116.

It is to be noted that the voxel setting unit 203 may have any configuration, and may include, for example, a CPU, a ROM, a RAM, and the like, and the CPU may load a program and data stored in the ROM and the like into the RAM and execute the program and the data, thereby performing processing relating to setting of the voxel.

The voxel setting unit 203 sets, for example, a voxel more suitable for the object of the encoding target in the bounding box, which makes it possible to further reduce the information amount of the quantized signal string and to suppress a reduction in the encoding efficiency.

<Coordinate System Setting Unit>

FIG. 5 is a block diagram illustrating a main configuration example of the coordinate system setting unit 201. As illustrated in FIG. 5, the coordinate system setting unit 201 includes a world coordinate system setting unit 211, a Cartesian coordinate system setting unit 212, a cylindrical coordinate system setting unit 213, and a spherical coordinate system setting unit 214.

<World Coordinate System Setting Unit>

The world coordinate system setting unit 211 is controlled by the controller 101 to set a world coordinate system as a coordinate system to be subjected to quantization. For example, the controller 101 causes the world coordinate system setting unit 211 to set a world coordinate system in a case where setting of the world coordinate system is permitted (not prohibited) in accordance with control information for permitting or prohibiting setting of the world coordinate system. Doing so makes it possible to suppress setting of an unnecessary coordinate system and to suppress an increase in load. The world coordinate system setting unit 211 supplies identification information indicating the world coordinate system together with the data of the point cloud to the bounding box setting unit 202.

It is to be noted that the world coordinate system setting unit 211 may have any configuration, and may include, for example, a CPU, a ROM, a RAM, and the like, and the CPU may load a program and data stored in the ROM and the like into the RAM and execute the program and the data, thereby performing processing relating to setting of the world coordinate system.

<Cartesian Coordinate System Setting Unit>

The Cartesian coordinate system setting unit 212 is controlled by the controller 101 to set, as a coordinate system to be subjected to quantization, a predetermined Cartesian coordinate system (a rectangular coordinate system) different from the world coordinate system. The Cartesian coordinate system is a coordinate system that has been shifted (moved) or/and inclined (rotated) with respect to the world coordinate system.

For example, in a case in A of FIG. 6, an object 221 as a cylindrical encoding target is inclined with respect to a bounding box 222 that is set to include the object 221. In contrast, in a case in B of FIG. 6, the object 221 is not inclined with respect to a bounding box 225 that is set to include the object 221.

Accordingly, a height (a double-headed arrow 226) of the bounding box 225 is smaller than a height (a double-headed arrow 223) of the bounding box 222. In addition, a width (a double-headed arrow 227) of the bounding box 225 is shorter than a width (a double-headed arrow 224) of the bounding box 222.

As described above, setting the bounding box in accordance with a shape, an attitude, and the like of an included object makes it possible to further reduce a volume of the bounding box. In general, the smaller the bounding box is set, the smaller a region to be normalized becomes; therefore, it is possible to make the voxel smaller. That is, it is possible to suppress an increase in error due to quantization and to suppress a reduction in encoding efficiency. In addition, it is possible to reduce an amount of voxels including no object (no point), which makes it possible to further suppress a reduction in encoding efficiency.

Incidentally, in a rectangular bounding box as illustrated in FIG. 6, in a case where the rectangular bounding box is not inclined with respect to the coordinate system, setting is easier, which makes it possible to make an information amount for the setting relatively small. For example, in a case where four sides of a rectangle illustrated in A of FIG. 6 and B of FIG. 6 are parallel to an axial direction of the world coordinate system, it is possible to easily set the bounding box 222 in the world coordinate system; however, the bounding box 225 is inclined with respect to the world coordinate system, which makes setting of the bounding box 225 difficult as compared with setting of the bounding box 222.

Note that it is also possible to easily set the bounding box 225 in a coordinate system not inclined with respect to the bounding box 225 (a coordinate system having an axis parallel to each side of the bounding box 225). That is, setting the bounding box 225 in another coordinate system inclined with respect to the world coordinate system makes it possible to easily set the bounding box 225 similarly to the bounding box 222 in the world coordinate system, and to suppress an increase in the information amount.

The Cartesian coordinate system setting unit 212 sets, as a coordinate system to be subjected to quantization, such a Cartesian coordinate system different from such a world coordinate system. More specifically, the Cartesian coordinate system setting unit 212 sets identification information indicating the Cartesian coordinate system, and further determines a relative attitude of the Cartesian coordinate system with respect to the world coordinate system to cause the Cartesian coordinate system to be more appropriately positioned and angled with respect to an object in accordance with a shape and an attitude of the object, and sets the information indicating the relative attitude. For example, the Cartesian coordinate system setting unit 212 defines the relative attitude by a shift amount (x, y, z) and angles (a roll, a pitch, and a yaw), and sets the shift amount and the angles as information indicating the relative attitude. The Cartesian coordinate system setting unit 212 supplies, as information of a coordinate system to be subjected to quantization, the set information together with the data of the point cloud to the bounding box setting unit 202.

It is to be noted that, for example, the controller 101 causes the Cartesian coordinate system setting unit 212 to set a Cartesian coordinate system in a case where setting of the Cartesian coordinate system is permitted (not prohibited) in accordance with control information for permitting or prohibiting setting of the Cartesian coordinate system. In addition, in accordance with control information specifying a parameter to be permitted or prohibited to be used, the controller 101 causes the Cartesian coordinate system setting unit 212 to set a Cartesian coordinate system by a relative attitude (the shift amount and the angles) permitted (not prohibited) with respect to the world coordinate system. Doing so makes it possible to suppress setting of an unnecessary coordinate system and to suppress an increase in load.

It is to be noted that the Cartesian coordinate system setting unit 212 may have any configuration, and may include, for example, a CPU, a ROM, a RAM, and the like, and the CPU may load a program and data stored in the ROM and the like into the RAM and execute the program and the data, thereby performing processing relating to setting of the Cartesian coordinate system.

<Cylindrical Coordinate System Setting Unit>

The cylindrical coordinate system setting unit 213 is controlled by the controller 101 to set, as a coordinate system to be subjected to quantization, a predetermined cylindrical coordinate system different from the world coordinate system. The cylindrical coordinate system is a three-dimensional coordinate system with a height z, a radius r, and a rotational angle θ of a cylinder as three axes. For example, as illustrated in A of FIG. 7, an object 232 represented in a cylindrical shape in a Cartesian coordinate system 231 is represented in a rectangular parallelepiped shape like an object 234 in a cylindrical coordinate system 233, as illustrated in B of FIG. 7.

That is, in the cylindrical coordinate system, a cylindrical bounding box is set more easily than in a case of the Cartesian coordinate system. In other words, in a case where an object of the encoding target has a cylindrical shape, it is possible to more easily set a bounding box more suitable for the object. For example, in a case where the object is a person, as illustrated in C of FIG. 7, in general, it is possible to set a cylindrical bounding box smaller than a rectangular bounding box. In addition, for example, even in a case where an image of a radar detection result in all directions as illustrated in D of FIG. 7 is used as an object, in general, it is possible to set a cylindrical bounding box smaller than the rectangular bounding box.

Needless to say, it is also possible to shift (move) or/and incline (rotate) the cylindrical coordinate system with respect to the world coordinate system, as in the Cartesian coordinate system described above.

The cylindrical coordinate system setting unit 213 sets, as a coordinate system to be subjected to quantization, such a cylindrical coordinate system different from such a world coordinate system. More specifically, the cylindrical coordinate system setting unit 213 sets identification information indicating the cylindrical coordinate system, and further determines a relative attitude of the cylindrical coordinate system with respect to the world coordinate system to cause the cylindrical coordinate system to be more appropriately positioned and angled with respect to an object in accordance with a shape and an attitude of the object, and sets information indicating the relative attitude. For example, the cylindrical coordinate system setting unit 213 defines the relative attitude by a shift amount (x, y, z) and angles (a roll, a pitch, and a yaw), and sets the shift amount and the angles as information indicating the relative attitude. It is to be noted that the cylindrical coordinate system setting unit 213 also sets information indicating a correspondence relationship between an x-coordinate and a y-coordinate of the world coordinate system and an r-coordinate and a θ-coordinate of the cylindrical coordinate system (a correspondence relationship between the coordinate axes of the coordinate systems). The cylindrical coordinate system setting unit 213 supplies, as information of a coordinate system to be subjected to quantization, the set information together with the data of the point cloud to the bounding box setting unit 202.

It is to be noted that, for example, the controller 101 causes the cylindrical coordinate system setting unit 213 to set a cylindrical coordinate system in a case where setting of the cylindrical coordinate system is permitted (not prohibited) in accordance with control information for permitting or prohibiting setting of the cylindrical coordinate system. In addition, in accordance with control information specifying a parameter to be permitted or prohibited to be used, the controller 101 causes the cylindrical coordinate system setting unit 213 to set a cylindrical coordinate system by a relative attitude (the shift amount and the angles) permitted (not prohibited) with respect to the world coordinate system. Doing so makes it possible to suppress setting of an unnecessary coordinate system and to suppress an increase in load.

It is to be noted that the cylindrical coordinate system setting unit 213 may have any configuration, and may include, for example, a CPU, a ROM, a RAM, and the like, and the CPU may load a program and data stored in the ROM and the like into the RAM and execute the program and the data, thereby performing processing relating to setting of the cylindrical coordinate system.

<Spherical Coordinate System Setting Unit>

The spherical coordinate system setting unit 214 is controlled by the controller 101 to set, as a coordinate system to be subjected to quantization, a predetermined spherical coordinate system different from the world coordinate system. The spherical coordinate system is a three-dimensional coordinate system with a radius r, a rotational angle θ, and an elevation angle φ of a sphere as three axes. For example, as illustrated in A of FIG. 8, an object 241 represented in a spherical shape in the Cartesian coordinate system 231 is represented in a planar shape like an object 243 in a spherical coordinate system 242, as illustrated in B of FIG. 8.

That is, in the spherical coordinate system, a spherical bounding box is set more easily than in the case of the Cartesian coordinate system. In other words, in a case where an object of the encoding target has a spherical shape, it is possible to more easily set a bounding box more suitable for the object. For example, in a case where the object is the Earth, as illustrated in C of FIG. 8, in general, it is possible to set a spherical bounding box smaller than a rectangular bounding box. In addition, for example, even in a case where a snowman (an object including a plurality of spheres) as illustrated in D of FIG. 8 is used as an object, in general, it is possible to set a spherical bounding box smaller than the rectangular bounding box.

Needless to say, it is also possible to shift (move) or/and incline (rotate) the spherical coordinate system with respect to the world coordinate system, as in the Cartesian coordinate system described above.

The spherical coordinate system setting unit 214 sets, as a coordinate system to be subjected to quantization, such a spherical coordinate system different from the world coordinate system. More specifically, the spherical coordinate system setting unit 214 sets identification information indicating the spherical coordinate system, and further determines a relative attitude of the spherical coordinate system with respect to the world coordinate system to cause the spherical coordinate system to be more appropriately positioned and angled with respect to an object in accordance with a shape and an attitude of the object, and sets the information indicating the relative attitude. For example, the spherical coordinate system setting unit 214 defines the relative attitude by a shift amount (x, y, z) and angles (a roll, a pitch, and a yaw), and sets the shift amount and the angles as information indicating the relative attitude. It is to be noted that the spherical coordinate system setting unit 214 also sets information indicating a correspondence relationship between the x-coordinate, the y-coordinate, and a z-coordinate of the world coordinate system and the r-coordinate, the θ-coordinate, and a φ-coordinate of the spherical coordinate system (a correspondence relationship between the coordinate axes of the coordinate systems). The spherical coordinate system setting unit 214 supplies, as information of a coordinate system to be subjected to quantization, the set information together with the data of the point cloud to the bounding box setting unit 202.

It is to be noted that, for example, the controller 101 causes the spherical coordinate system setting unit 214 to set a spherical coordinate system in a case where setting of the spherical coordinate system is permitted (not prohibited) in accordance with control information for permitting or prohibiting setting of the spherical coordinate system. In addition, in accordance with control information specifying a parameter to be permitted or prohibited to be used, the controller 101 causes the spherical coordinate system setting unit 214 to set a spherical coordinate system by a relative attitude (the shift amount and the angles) permitted (not prohibited) with respect to the world coordinate system. Doing so makes it possible to suppress setting of an unnecessary coordinate system and to suppress an increase in load.

It is to be noted that the spherical coordinate system setting unit 214 may have any configuration, and may include, for example, a CPU, a ROM, a RAM, and the like, and the CPU may load a program and data stored in the ROM and the like into the RAM and execute the program and the data, thereby performing processing relating to setting of the spherical coordinate system.

<Comparison of Output Information and Effects>

Coordinate systems set by the coordinate system setting unit 201 in FIG. 5, information to be outputted, and effects are summarized in a table in FIG. 9. As described above, the coordinate system setting unit 201 sets the world coordinate system, the Cartesian coordinate system, the cylindrical coordinate system, and the spherical coordinate system as coordinate systems to be subjected to quantization. In a case of the world coordinate system, coordinate transformation is not necessary, which makes it possible to set the coordinate system more easily.

Further, in a case of the Cartesian coordinate system, it is possible to set an attitude (a shift amount, angles, and the like) of a coordinate system in accordance with a shape and an attitude of an object, which makes it possible to more easily set a bounding box more suitable for the object. Accordingly, it is possible to suppress an increase in an information amount necessary to define a bounding box and a voxel and to suppress a reduction in encoding efficiency.

In addition, in a case of the cylindrical coordinate system, it is possible to more easily set a bounding box more suitable for a cylindrical object. Accordingly, it is possible to suppress an increase in an information amount that is necessary to define a bounding box and a voxel and to suppress a reduction in encoding efficiency. Further, it is possible to set an attitude (a shift amount, angles, and the like) of a coordinate system in accordance with a shape and an attitude of the object, which makes it possible to more easily set a bounding box more suitable for the object. Accordingly, it is possible to further suppress an increase in the information amount necessary to define the bounding box and the voxel and to further suppress a reduction in encoding efficiency.

In addition, in a case of the spherical coordinate system, it is possible to more easily set a bounding box more suitable for a spherical object. Accordingly, it is possible to suppress an increase in an information amount that is necessary to define a bounding box and a voxel and to suppress a decrease in encoding efficiency. Further, it is possible to set an attitude (a shift amount, angles, and the like) of a coordinate system in accordance with a shape and an attitude of the object, which makes it possible to more easily set a bounding box more suitable for the object. Accordingly, it is possible to further suppress an increase in the information amount that is necessary to define the bounding box and the voxel and to further suppress a reduction in encoding efficiency.

In addition, as will be described later, one of these coordinate systems is selected by the selector 115. Accordingly, it is possible for the coordinate system setting unit 201 to set a coordinate system suitable for a shape, an attitude, and the like of an object. The bounding box setting unit 202 and the voxel setting unit 203 set a bounding box and a voxel in the coordinate system set by the coordinate system setting unit 201. Accordingly, it is possible to set a bounding box and a voxel suitable for the shape, the attitude, and the like of the object, and it is possible to further suppress a reduction in encoding efficiency.

It is to be noted that the coordinate systems set by the coordinate system setting unit 201 are optional and are not limited to the examples described above. In a case where a coordinate system other than those described above is set, the coordinate system setting unit 201 may have a processing unit that performs setting of the coordinate system. In addition, the number of coordinate systems set by the coordinate system setting unit 201 is optional and is not limited to the examples described above.

<Bounding Box Setting Unit>

FIG. 10 is a block diagram illustrating a main configuration example of the bounding box setting unit 202. As illustrated in FIG. 10, the bounding box setting unit 202 includes an inscribed bounding box setting unit 311, an alignment bounding box setting unit 312, an overlap bounding box setting unit 313, a region-of-interest bounding box setting unit 314, and an equalized bounding box setting unit 315.

<Inscribed Bounding Box Setting Unit>

The bed bounding box setting unit 311 is controlled by the controller 101 to perform processing relating to setting of an inscribed bounding box. The inscribed bounding box is a bounding box including an object inscribed in the bounding box. That is, for example, the inscribed bounding box setting unit 311 sets a bounding box to cause an object to be inscribed in the bounding box.

For example, in A of FIG. 11, it is assumed that an object 321 including a point cloud (a point set) that is distributed in a cube 322 at density of 1024 points in a direction of each side. The inscribed bounding box setting unit 311 sets an inscribed bounding box 323 to cause the object 321 to be inscribed in the inscribed bounding box 323 independently of such density of the point cloud.

More specifically, the inscribed bounding box setting unit 311 sets identification information indicating an inscribing bounding box, and further sets information indicating the number of inscribing bounding boxes (information indicating that the number is one) and information relating to a coordinate system of the inscribing bounding box (information of a coordinate system to be subjected to quantization). The inscribed bounding box setting unit 311 supplies, as information relating to the bounding box, the set information together with the data of the point cloud to the voxel setting unit 203.

It is to be noted that, for example, the controller 101 causes the inscribed bounding box setting unit 311 to set an inscribing bounding box in a case where setting of the inscribing bounding box is permitted (not prohibited) in accordance with control information for permitting or prohibiting setting of the inscribing bounding box.

It is to be noted that the inscribed bounding box setting unit 311 may have any configuration, and may include, for example, a CPU, a ROM, a RAM, and the like, and the CPU may load a program and data stored in the ROM or the like into the RAM and execute the program and the data, thereby performing processing relating to setting of the inscribed bounding box.

<Alignment bounding Box Setting Unit>

The alignment bounding box setting unit 312 is controlled by the controller 101 to perform processing relating to setting of an alignment bounding box. The alignment bounding box is a bounding box in which a distribution of points of an included object and a center of a voxel are set to be aligned with each other (alignment is performed). That is, the alignment bounding box setting unit 312 sets an alignment bounding box to align the distribution (position) of each point of the included object with a central position of the voxel.

For example, as illustrated in B of FIG. 11, the alignment bounding box setting unit 312 sets an alignment bounding box 324 of which a size and a position are coincident with a size and a position of the cube 322. More specifically, the alignment bounding box setting unit 312 sets identification information indicating an alignment bounding box, and further sets information indicating the number of alignment bounding boxes (information indicating that the number is one) and information relating to a coordinate system of the alignment bounding box (information of a coordinate system to be subjected to quantization). The alignment bounding box setting unit 312 supplies, as information relating to the bounding box, the set information together with the data of the point cloud to the voxel setting unit 203.

It is to be noted that, for example, the controller 101 causes the alignment bounding box setting unit 312 to set an alignment bounding box in a case where setting of the alignment bounding box is permitted (not prohibited) in accordance with control information for permitting or prohibiting setting of the alignment bounding box.

It is to be noted that the alignment bounding box setting unit 312 may have any configuration, and may include, for example, a CPU, a ROM, a RAM, and the like, and the CPU may load a program and data stored in the ROM and the like into the RAM and execute the program and the data, thereby performing processing relating to setting of the alignment bounding box.

For example, the inscribed bounding box or the aligned bounding box makes it possible to suppress a reduction in encoding efficiency more, which depends on the encoding target (an image). For example, A of FIG. 12 illustrates a relationship between bpp (geometory bits input points) and a peak signal-to-noise ratio (PSNR (Peak Signal-to-Noise Ratio) in a case where a predetermined image A is an encoding target. In A of FIG. 12, a curve 331 indicates a correspondence relationship between the bpp and the PSNR in a case where the inscribed bounding box is used. A curve 332 indicates a correspondence relationship between the bpp and the PSNR in a case where the alignment bounding box is used. As illustrated in A of FIG. 12, in this case, the PSNR is higher and image quality is higher in the case where the inscribed bounding box is used. That is, in a case of this image, it is possible to suppress a reduction in encoding efficiency more in the case where the inscribed bounding box is used.

In addition, B of FIG. 12 illustrates a correspondence relationship between the bpp and the PSNR in a case where a predetermined image B (an image (an image different from the image A)) is an encoding target. In B of FIG. 12, a curve 333 indicates a correspondence relationship between the bpp and the PSNR in the case where the inscribed curve bounding box is used. A curve 334 indicates a correspondence relationship between the bpp and the PSNR in the case where the alignment bounding box is used. As illustrated in B of FIG. 12, in this case, if the bpp becomes larger to some extent, the PSNR becomes higher and image quality becomes higher overwhelmingly in the case where the positional alignment bounding box is used. That is, in a case where the bpp is larger than predetermined magnitude (for example, in a range larger than a predetermined straight line 335), it is possible to suppress a reduction in encoding efficiency more by using the alignment bounding box than by using the inscribed bounding box.

<Overlap Bounding Box Setting Unit>

In addition, the number of bounding boxes to be set is optional, and may be plural, for example. The overlap bounding box setting unit 313 is controlled by the controller 101 to perform processing relating to setting of overlap bounding boxes. The overlap bounding boxes are a plurality of bounding boxes that overlap each other in accordance with a distribution of points of an object of the encoding target. That is, the overlap bounding box setting unit 313 sets a plurality of bounding boxes overlapping each other in accordance with a distribution of points of the encoding target, for example.

For example, it is assumed that points 341 to 345 are distributed as the data of the point cloud as illustrated in A of FIG. 13. For example, if a single bounding box is set on a set of these points and voxels are set (linearly), as illustrated in B of FIG. 13, distances between positions of the points and a central position of the voxel are long, and there is a point where an error due to voxelization (quantization) becomes large (exceeds an allowable range), which causes a possibility that encoding efficiency is reduced. For example, in B of FIG. 13, the points 344 and 345 extend over a plurality of voxels and are far from centers of the voxels.

For this reason, the overlap bounding box setting unit 313 groups these points into a group of the points 341, 342, and 343 and a group of the points 344 and 345, as illustrated in C of FIG. 13, and assigns the points of the respective group to voxels (bounding boxes) different from each other, as illustrated in D to E of FIG. 13. That is, as illustrated in D of FIG. 13, a bounding box 347 is set for the group of the points 341 to 343, and as illustrated in E of FIG. 13, a bounding box 348 is set for the group of the points 344 and 345. That is, as illustrated in F of FIG. 13, a plurality of bounding boxes (the bounding box 347 and the bounding box 348) overlapping each other (laying on top of each other) are set. Doing so makes it possible to suppress an increase in the error due to voxelization (quantization) and possible to suppress a reduction in encoding efficiency.

More specifically, the overlap bounding box setting unit 313 sets identification information indicating the overlap bounding boxes, and further sets information indicating the number of the bounding boxes, and information relating to a coordinate system of each of the bounding boxes (information of a coordinate system to be subjected to quantization). The overlap bounding box setting unit 313 supplies, as information relating to the bounding boxes, the set information together with the data of the point cloud to the voxel setting unit 203.

It is to be noted that, for example, the controller 101 causes the overlap bounding box setting unit 313 to set overlap bounding boxes in a case where setting of the overlap bounding boxes is permitted (not prohibited) in accordance with control information for permitting or prohibiting setting of the overlap bounding boxes.

It is to be noted that the overlap bounding box setting unit 313 may have any configuration, and may include, for example, a CPU, a ROM, a RAM, and the like, and the CPU may load a program and data stored in the ROM and the like into the RAM and execute the program and the data, thereby performing processing relating to setting of overlap bounding boxes.

<Region-of-Interest Bounding Box Setting Unit>

In addition, a plurality of bounding boxes may be set in accordance with a shape of an object. Alternatively, bounding boxes may be set separately for a region of interest and another region. Further, an encoding method may not be the same for all bounding boxes. For example, the encoding method may be set independently for each bounding box. In addition, for example, the encoding method for a bounding box in the region of interest and the encoding method for a bounding box in another region may be different from each other. For example, this encoding method may be setting of image quality, decoding order, or both, or may be setting other than these settings. The setting of image quality may be, for example, setting of a depth limit (LoD (Level Of Detail)) of hierarchies of voxels, or setting of quality (Q) of color compression.

The region-of-interest bounding box setting unit 314 is controlled by the controller 101 to perform processing relating to setting of a region-of-interest bounding box. The region-of-interest bounding box is a bounding box that is set in accordance with setting of a region of interest of an object of the encoding target. The region-of-interest bounding box setting unit 314 sets, for example, a bounding box including the region of interest of the object of the encoding target and one or a plurality of bounding boxes including a portion other than the region of interest of the object (i.e., a plurality of bounding boxes is set).

For example, it is assumed that a face portion and a hair portion are set as regions of interest in a human-shaped object 350 as illustrated in A of FIG. 14. On the basis of such setting, the region-of-interest bounding box setting unit 314 sets a bounding box 351 including the face portion and a bounding box 352 including the hair portion. The region-of-interest bounding box setting unit 314 further sets a bounding box 353 including another portion of the object 350.

The region-of-interest bounding box setting unit 314 sets image quality for each of the bounding boxes. For example, in a case in FIG. 14, for the bounding box 353 that is not the region of interest, a limit of the number of hierarchies of voxels is set to 4 (LoD=4), and quality of color compression is set to 85 (Q=85). In addition, for the bounding box 351 that is a region of interest in which enhancement of texture of a face is desired, the quality of color compression is set to 95 (Q=95). In addition, for the bounding box 352 that is a region of interest in which fine expression of hair is desired, the limit of the number of hierarchies of voxels is set to 5 (LoD=5).

Doing so makes it possible to achieve more efficient encoding such as, for example, improving image quality of an important region and reducing image quality of a less important region, and to improve subjective image quality of a decoded image.

In addition, as illustrated in B of FIG. 14, the region-of-interest bounding box setting unit 314 may set decoding order for each of the bounding boxes. In an example in B of FIG. 14, the bounding box 351 is set to be decoded first (Priority=High), then the bounding box 353 is set to be decoded (Priority=Mid), and lastly the bounding box 352 is set to be decoded (Priority=Low).

That is, decoding is performed preferentially from the bounding box having a higher Priority. Doing so makes it possible to manage to perform processing on an important region (a region of interest) even in a case where a computational resource of a decoder is poor.

Further, for example, assuming that images captured by imaging surroundings by a vehicle-mounted camera are set as encoding targets, in a case where a plurality of bounding boxes is not set, one bounding box 361 is set for all directions from a vehicle 360, as a center, where imaging is performed, as illustrated in A of FIG. 15, and all the images are encoded with equal image quality. However, in such images, in general, importance of an image on a lateral side of the vehicle 360 is low, and importance of an image on a front side is the highest. Accordingly, as illustrated in B of FIG. 15, the bounding box may be divided for each of the directions. For example, a bounding box 362, a bounding box 363, a bounding box 364, and a bounding box 365 may be respectively set for the front of the vehicle 360, the rear of the vehicle 360, the left of the vehicle 360, and the right of the vehicle 360 to set image quality (for example, LoD) independently of each other.

Doing so makes it possible to achieve more efficient encoding such as, for example, improving image quality in an important direction and reducing image quality in a less important direction, and to improve subjective image quality of a decoded image.

More specifically, the region-of-interest bounding box setting unit 314 sets identification information indicating a region-of-interest bounding box, and further sets information indicating the number of bounding boxes, information relating to a coordinate system of each of the bounding boxes (information relating to a coordinate system to be subjected to quantization), and information relating to setting of each of the bounding boxes (information specifying image quality, decoding order, and the like). The region-of-interest bounding box setting unit 314 supplies, as information relating to the bounding boxes, the set information together with the data of the point cloud to the voxel setting unit 203.

It is to be noted that, for example, the controller 101 causes the region-of-interest bounding box setting unit 314 to set a region-of-interest bounding box in a case where setting of the region-of-interest bounding box is permitted (not prohibited) in accordance with control information for permitting or prohibiting setting of the region-of-interest bounding box.

The region-of-interest bounding box setting unit 314 may have any configuration, and may include, for example, a CPU, a ROM, a RAM, and the like, and the CPU may load a program and data stored in the ROM and the like into the RAM and execute the program and the data, thereby performing processing relating to setting of the region-of-interest bounding box.

<Equalized Bounding Box Setting Unit>

In addition, a plurality of bounding boxes may be set to equalize the number of voxels. For example, the number of voxels may be equalized by limiting the depth limit of voxels in each bounding box.

Doing so makes it possible to equalize load of decoding processing for each bounding box. For example, in a case where decoding processing for each bounding box is performed as parallel processing, it is possible to suppress deviation of load of each processing.

The equalized bounding box setting unit 315 is controlled by the controller 101 to perform processing relating to setting of equalized bounding boxes. The equalized bounding boxes are a plurality of bounding boxes, for an object of the encoding target, set to equalize the number of voxels in the respective bounding boxes. That is, for example, the equalized bounding box setting unit 315 sets a plurality of bounding boxes for the object of the encoding target to equalize the number of voxels in the respective bounding boxes.

More specifically, the equalized bounding box setting unit 315 sets identification information indicating equalized bounding boxes, and further sets the information indicating the number of bounding boxes, information relating to a coordinate system of each of the bounding boxes (information relating to a coordinate system to be subjected to quantization), and information relating to setting of equalization of the number of voxels of each of the bounding boxes (for example, information specifying a depth limit (LoD) of voxels in each of the bounding boxes). The equalized bounding box setting unit 315 supplies, as information relating to the bounding boxes, the set information together with the data of the point cloud to the voxel setting unit 203.

It is to be noted that, for example, the controller 101 causes the equalized bounding box setting unit 315 to set equalized bounding boxes in a case where setting of the equalized bounding boxes is permitted (not prohibited) in accordance with control information for permitting or prohibiting setting of the equalized bounding boxes.

The equalized bounding box setting unit 315 may have any configuration, and may include, for example, a CPU, a ROM, a RAM, and the like, and the CPU may load a program and data stored in the ROM and the like into the RAM and execute the program and the data, thereby performing processing relating to setting of the equalized bounding box.

<Comparison of Output Information and Effects>

Bounding boxes set by the bounding box setting unit 202 in FIG. 10, information to be outputted, and effects are summarized in a table in FIG. 16. As described above, the bounding box setting unit 202 sets, as bounding boxes, the inscribed bounding box, the alignment bounding box, the overlap bounding box, the region-of-interest bounding box, and the equalized bounding box.

The inscribed bounding box is applied specifically in a case where a point set having uniform density (a point set having uniform intervals between points) (also referred to as a Voxelized sequence) is encoded and quantization by voxelization is relatively coarse (a voxel size is relatively large), which makes it possible to further reduce a reduction in encoding efficiency. In addition, the inscribed bounding box is applied even in a case where a point set having nonuniform density (a point set having nonuniform intervals between points) (also referred to as a non-Voxelized sequence) is encoded, which makes it possible to further suppress a reduction in encoding efficiency.

The bounding box is applied specifically in a case where a Voxelized sequence is encoded and quantization by voxelization is relatively fine (the voxel size is relatively small), which makes it possible to further suppress a reduction in encoding efficiency.

The overlap bounding box is applied specifically in a case where Voxelized sequences that are different in density of the point set (intervals between points) from each other are mixed, which makes it possible to further suppress a reduction in encoding efficiency.

Applying the region-of-interest bounding box makes it possible to make quality different between a region of interest and another region. It is also possible to make priority different for each bounding box. Thus, for example, even in a case where a computational resource of a decoder is poor (performance is not sufficient for a request), it is possible to insure processing on an essential region.

Applying the equalized bounding box makes it possible to suppress variations in load of parallelization processing.

It is to be noted that the bounding boxes set by the bounding box setting unit 202 are optional and are not limited to the examples described above. In a case where a bounding box other than those described above is set, the bounding box setting unit 202 may have a processing unit that performs setting of the bounding box. In addition, the number of bounding boxes set by the bounding box setting unit 202 is optional and is not limited to the examples described above.

<Voxel Setting Unit>

FIG. 17 is a block diagram illustrating a main configuration example of the voxel setting unit 203. As illustrated in FIG. 17, the voxel setting unit 203 includes a linear voxel setting unit 411, a nonlinear voxel setting unit 412, and an offset voxel setting unit 413.

<Linear Voxel Setting Unit>

The linear voxel setting unit 411 is controlled by the controller 101 to perform processing relating to setting of a linear voxel. The linear voxel is a method of constantly equally dividing a region to be processed (a bounding box or a voxel) in forming a voxel for quantization of position information of the encoding target. Assigning each point of a point set to a voxel causes three-dimensional position information of each point to be quantized. Accordingly, quantization of three-dimensional position information by the linear voxel is also referred to as linear quantization. In other words, the linear voxel is a method of setting a voxel to linearly quantize position information of the encoding target.

For example, A of FIG. 18 is a schematic diagram illustrating voxels expressed in two dimensions. In A of FIG. 18, a voxel 431, a voxel 32, and a voxel 33 are respectively assigned to a point 421, a point 422, and a point 423.

Position information of each point is quantized to a center of each voxel. For example, in a case in A of FIG. 18, a position of the point 421 is quantized to a central point 431A of the voxel 431. That is, a distance between the point 421 and the central point 431A is an error due to this quantization. In addition, a position of the point 422 is also quantized to a central point 432A of the voxel 432. That is, a distance between the point 422 and the central point 432A is an error due to this quantization. Further, a position of the point 423 is also quantized to a central point 433A of the voxel 433. That is, a distance between the point 423 and the central point 433A is an error due to this quantization.

At this time, if the voxel size is relatively large (not sufficiently small), an error due to quantization of a voxel is also relatively large. In order to further reduce the error due to this quantization, it is sufficient if the voxel is further divided as illustrated in B of FIG. 18. In an example in B of FIG. 18, the point 421 is quantized to a central point 441A of a voxel 441. Accordingly, an error due to this quantization is smaller than that in a case in A of FIG. 18. In addition, the point 422 is also quantized to a central point 442A of a voxel 442. Accordingly, an error due to this quantization is smaller than that in the case in A of FIG. 18. In addition, the point 423 is quantized to a central point 443A of a voxel 443. Accordingly, an error due to this quantization is smaller than that in the case in A of FIG. 18.

That is, in a case of the linear voxel, increasing the number of hierarchies of voxels makes it possible to improve accuracy of quantization. In other words, in the case of the linear voxel, the number of hierarchies of voxels may be set to obtain sufficient accuracy. However, if the number of hierarchies of voxels is increased, the number of voxels is also increased, which may cause an increase in the information amount. Accordingly, encoding efficiency may be reduced, or processing time may be increased.

More specifically, the linear voxel setting unit 411 sets identification information indicating the linear voxel. The linear voxel setting unit 411 supplies, as information relating to the linear voxel, the set information together with information such as the data of the point cloud supplied from the bounding box setting unit 202 to the signal string generator 113.

It is to be noted that, for example, the controller 101 causes the linear voxel setting unit 411 to set the linear voxel in a case where setting of the linear voxel is permitted (not prohibited) in accordance with control information for permitting or prohibiting setting of the linear voxel.

It is to be noted that the linear voxel setting unit 411 may have any configuration, and may include, for example, a CPU, a ROM, a RAM, and the like, and the CPU may load a program or data stored in the ROM and the like into the RAM and execute the program or the data, thereby performing processing relating to setting of a linear voxel.

<Nonlinear Voxel Setting Unit>

The nonlinear voxel setting unit 412 is controlled by the controller 101 to perform processing relating to setting of a nonlinear voxel. The nonlinear voxel is a method of unequally dividing a region to be processed (a bounding box or a voxel) in forming a voxel for quantization of position information of the encoding target. Assigning each point of a point set to a voxel causes three-dimensional position information of each point to be quantized. Accordingly, quantization of three-dimensional position information by the nonlinear voxel is also referred to as nonlinear quantization. In other words, the nonlinear voxel is a method of setting a voxel to nonlinearly quantize position information of the encoding target.

For example, FIG. 19 is a schematic diagram illustrating voxels expressed in two dimensions. As illustrated in FIG. 19, it is possible to unequally dividing a region to be processed in this case, which makes it possible to form a box having a size or a shape different from a voxel 451 even in the same hierarchy. That is, the nonlinear voxel makes it possible to increase small voxels without increasing the number of hierarchies. This makes it possible to improve accuracy of quantization of a more important region.

That is, in a case of the nonlinear voxel, it is possible to improve accuracy of quantization without increasing the number of hierarchies of voxels. That is, it is possible to improve accuracy of quantization while suppressing a reduction in encoding efficiency and an increase in processing time.

More specifically, the nonlinear voxel setting unit 412 sets identification information indicating the nonlinear voxel, and further sets map information of the set voxel. The nonlinear voxel setting unit 412 supplies, as information relating to the nonlinear voxel, the set information together with information such as the data of the point cloud supplied from the bounding box setting unit 202 to the signal string generator 113.

It is to be noted that, for example, the controller 101 causes the nonlinear voxel setting unit 412 to set the nonlinear voxel in a case where setting of the nonlinear voxel is permitted (not prohibited) in accordance with control information for permitting or prohibiting setting of the nonlinear voxel.

It is to be noted that the nonlinear voxel setting unit 412 may have any configuration, and may include, for example, a CPU, a ROM, a RAM, and the like, and the CPU may load a program and data stored in the ROM and the like into the RAM and execute the program and the data, thereby performing processing relating to setting of a nonlinear voxel.

It is to be noted that, for example, the nonlinear voxel setting unit 412 may set voxels in a hierarchy of the voxel to form smaller voxels toward an inside of a bounding box and form larger voxels toward an outside of the bounding box. In addition, for example, the nonlinear voxel setting unit 412 may set voxels in the hierarchy of the voxel to form a small voxel in a region of interest and a large voxel in a region other than the region of interest. Needless to say, voxels may be set by any method other than these methods.

<Offset Voxel Setting Unit>

The offset voxel setting unit 413 is controlled by the controller 101 to perform processing relating to setting of an offset voxel. The offset voxel is a method that makes it possible to reduce an error due to quantization for a voxel by assigning an offset to a position of the voxel to which an offset is assigned.

This offset corresponds not only to a voxel to which the offset is assigned, but also to a voxel in a lower hierarchy belonging to the voxel. For example, as illustrated in A of FIG. 20, in a case where an offset 471 is assigned to a voxel 460 in one hierarchy, the offset 471 is also applied to voxels 461 to 464 belonging to the voxel 460.

Thus, as illustrated in B of FIG. 20, a center of the voxel 461 moves by the offset 471. This makes it possible to reduce an error of quantization of position information of a point 481 by the voxel 461. Similarly, as illustrated in B of FIG. 20, a center of the voxel 462 moves by the offset 471. This makes it possible to reduce an error of quantization of position information of a point 482 by the voxel 462. Similarly, as illustrated in B of FIG. 20, a center of the voxel 463 moves by the offset 471. This makes it possible to reduce an error of quantization of position information of a point 483 by the voxel 463.

It is to be noted that this offset includes a local offset (Local Point Offset) corresponding to some of voxels and a global offset (Global Point Offset) that is an offset corresponding to all voxels to which the local offset does not correspond. That is, the global offset is assigned to a voxel in the highest hierarchy, as illustrated in C of FIG. 20. In contrast, the local offset is assigned to a hierarchy other than the highest hierarchy, as illustrated in C of FIG. 20. In a case where there are both the global offset and the local offset, the local offset is assigned to a voxel to which the local offset is assigned and a voxel in a lower hierarchy belonging to the voxel, as illustrated in C of FIG. 20. In addition, the global offset is assigned to other voxels not corresponding to the local offset.

It is to be noted that it is possible to assign the local offset to any hierarchy other than the highest hierarchy. The local offset may be assigned to a plurality of hierarchies.

More specifically, the offset voxel setting unit 413 sets identification information indicating the offset voxel, and further sets a vector of the offset voxel. The offset voxel setting unit 413 supplies, as information relating to the offset voxel, the set information together with information such as the data of the point cloud supplied from the bounding box setting unit 202 to the signal string generator 113.

It is to be noted that, for example, the controller 101 causes the offset voxel setting unit 413 to set the nonlinear voxel in a case where setting of the offset voxel is permitted (not prohibited) in accordance with control information for permitting or prohibiting setting of the offset voxel.

It is to be noted that the offset voxel setting unit 413 may have any configuration, and may include, for example, a CPU, a ROM, a RAM, and the like, and the CPU may load a program and data stored in the ROM and the like into the RAM and execute the program and the data, thereby performing processing relating to setting of an offset voxel.

<Comparison of Output Information and Effects>

Voxels set by the voxel setting unit 203 in FIG. 17, information to be outputted, and effects are summarized in a table in FIG. 21. As described above, the voxel setting unit 203 sets, as voxels, the linear voxel, the nonlinear voxel, and the offset voxel.

Applying the nonlinear voxel makes it possible to improve geometry accuracy (Geometry) at the same hierarchy limit (LoD) as compared with a case where the linear voxel is applied. In addition, for example, applying the nonlinear voxel in a case where desired accuracy differs depending on a position makes it possible to further suppress a reduction in encoding efficiency.

Further, applying the offset voxel makes it possible to improve geometry accuracy (Geometry) in the same hierarchy limit (LoD) as compared with a case where the offset voxel is applied. In addition, for example, applying the nonlinear voxel in a case where a point is locally deviated from a center of a Voxel makes it possible to further suppress a reduction in encoding efficiency.

<Selector>

FIG. 22 is a block diagram illustrating a main configuration example of the selector 115 in FIG. 2. As illustrated in FIG. 22, the selector 115 includes a cost calculation unit 511 and a cost comparison unit 512.

<Cost Calculation Unit>

The cost calculation unit 511 is controlled by the controller 101 to perform processing relating to cost calculation. A method of the cost calculation is optional. For example, the cost calculation unit 511 calculates the RD cost for encoded data supplied from the encoder 114. The cost calculation unit 511 calculates such costs for encoded data corresponding to all quantization methods of the three-dimensional position. The cost calculation unit 511 calculates a cost of encoded data for each of the quantization methods. The cost calculation unit 511 supplies information relating to the calculated cost to the cost comparison unit 512.

It is to be noted that, for example, the controller 101 causes the cost calculation unit 511 to calculate the cost of encoded data in a case where cost calculation is permitted (not prohibited) in accordance with control information for permitting or prohibiting the cost calculation.

It is to be noted that the cost calculation unit 511 may have any configuration, and may include, for example, a CPU, a ROM, a RAM, and the like, and the CPU may load a program or data stored in the ROM and the like into the RAM and execute the program or the data, thereby performing processing relating to cost calculation.

<Cost Comparison Unit>

The cost comparison unit 512 is controlled by the controller 101 to perform processing relating to cost comparison. A method of the cost comparison is optional. For example, the cost comparison unit 512 compares the encoded data costs of respective quantization methods to select an optimal quantization method. The cost comparison unit 512 supplies, as an encoding result corresponding to the selected optimal quantization method, encoded data corresponding to the quantization method selected as the optimal quantization method to the association unit 117. In addition, the cost comparison unit 512 supplies information indicating a result of the comparison (a quantization method has been selected) to the control information generator 116.

It is to be noted that, for example, the controller 101 causes the cost comparison unit 512 to compare costs for the respective quantization methods in a case where cost comparison is permitted (not prohibited) in accordance with control information for permitting or prohibiting the cost comparison.

It is to be noted that the cost comparison unit 512 may have any configuration, and may include, for example, a CPU, a ROM, a RAM, and the like, and the CPU may load a program and data stored in the ROM and the like into the RAM and execute the program and the data, thereby performing processing for cost comparison.

As described above, the selector 115 selects the quantization method of position information, which makes it possible for the encoding device 100 to perform quantization of position information by a more appropriate method. Accordingly, it is possible for the encoding device 100 to suppress an increase in the information amount of a signal string and to suppress a reduction in encoding efficiency.

<Control Information Generator>

FIG. 23 is a block diagram illustrating a main configuration example of the control information generator 116 illustrated in FIG. 2. As illustrated in FIG. 23, the control information generator 116 includes a position quantization control information generator 611, a coordinate system setting control information generator 612, a bounding box setting control information generator 613, and a voxel setting control information generator 614.

<Position Quantization Control Information Generator>

The position quantization control information generator 611 is controlled by the controller 101 to generate position quantization control information of the selected quantization method on the basis of the information supplied from the position quantizer 112 and a result of selection by the selector 115.

The position quantization control information is control information relating to quantization of position information. Specifically, this position quantization control information may be any information as long as the information relates to quantization of position information. For example, the position quantization control information may include information relating to permission or prohibition of quantization of the three-dimensional position of the encoding target. This information relating permission or prohibition of quantization of the three-dimensional position of the encoding target may be any information. For example, the information may include flag information for permitting quantization of the three-dimensional position of the encoding target, or may include flag information for prohibiting quantization of the three-dimensional position of the encoding target.

In addition, for example, the position quantization control information may include information relating to a range of the encoding target to be permitted or prohibited to be subjected to quantization of the three-dimensional position of the encoding target. This information relating to the range of the encoding target to be permitted or prohibited to be subjected to quantization of the three-dimensional position of the encoding target may be any information. For example, the information may include information indicating, with use of a bounding box, a voxel, and the like, the range of the encoding target to be permitted to be subjected to quantization of the three-dimensional position of the encoding target, or may include information indicating, with use of a bounding box, a voxel, and the like, the range of the encoding target to be prohibited to be subjected to quantization of the three-dimensional position of the encoding target.

In addition, for example, the position quantization control information may include information relating to permission or prohibition of a parameter to be used for quantization of the three-dimensional position of the encoding target. This information relating to permission or prohibition of the parameter to be used for quantization of the three-dimensional position of the encoding target may be any information. For example, the information may include information indicating an executable method of each processing, or may include information indicating a non-executable method of each processing.

Transmitting these information relating to permission and prohibition to the decoding side (a decoder) makes it possible for the decoding side (the decoder) not only to omit unnecessary processing, but also to omit analysis of unnecessary control information, on the basis of the information.

In addition, for example, the position quantization control information may include information relating to execution or skipping of quantization of the three-dimensional position of the encoding target. This information relating to execution or skipping of quantization of the three-dimensional position of the encoding target may be any information. For example, the information may include flag information indicating whether or not quantization of the three-dimensional position of the encoding target has been executed, or may include flag information indicating whether or not quantization of the three-dimensional position of the encoding target has been skipped (omitted).

In addition, for example, the position quantization control information may include information relating to a range of the encoding target to be subjected to execution or skipping of quantization of the three-dimensional position of the encoding target. This information relating to the range of the encoding target to be subjected to execution or skipping of quantization of the three-dimensional position of the encoding target may be any information. For example, the information may include information indicating, with use of a bounding box, a voxel, and the like, the range of the encoding target having been subjected to execution of quantization of the three-dimensional position of the encoding target, or may include information indicating, with use of a bounding box, a voxel, and the like, the range of the encoding target having been subjected to skipping of quantization of the three-dimensional position of the encoding target.

In addition, for example, the position quantization control information may include information relating to a parameter to be used for quantization of the three-dimensional position of the encoding target. This information relating to the parameter to be used for quantization of the three-dimensional position of the encoding target may be any information. For example, the information may include information indicating a parameter used for quantization of the three-dimensional position of the encoding target, or may include information indicating a parameter not used for quantization of the three-dimensional position of the encoding target.

Transmitting the information relating to execution or skipping and the information relating to the parameter to the decoding side (the decoder) makes it possible for the decoding side (the decoder) to execute appropriate processing and skip unnecessary processing on the basis of the information. Accordingly, it is possible for the decoding side (the decoder) to appropriately restore the data of the point cloud.

The position quantization control information generator 611 supplies the generated position quantization control information to the coordinate system setting control information generator 612.

It is to be noted that, for example, the controller 101 causes the position quantization control information generator 611 to generate the position quantization control information in a case where generation of the position quantization control information is permitted (not prohibited) in accordance with control information for permitting or prohibiting generation of the position quantization control information. Doing so makes it possible to suppress generation of unnecessary control information and to suppress an increase in load.

It is to be noted that the position quantization control information generator 611 may have any configuration, and may include, for example, a CPU, a ROM, a RAM, and the like, and the CPU may load a program and data stored in the ROM and the like into the RAM and execute the program and the data, thereby performing processing relating to generation of the position quantization control information.

<Coordinate System Setting Control Information Generator>

The coordinate system setting control information generator 612 is controlled by the controller 101 to generate coordinate system setting control information of the selected quantization method on the basis of the information supplied from the position quantization control information generator 611 and the result of selection by the selector 115.

The coordinate system setting control information is control information relating to setting of a coordinate system. Specifically, this coordinate system setting control information may be any information as long as the information relates to the coordinate system. For example, the coordinate system setting control information may include information relating to permission or prohibition of setting of the coordinate system. This information relating to permission or prohibition of setting of the coordinate system may be any information. For example, the information may include flag information for permitting setting of the coordinate system, or may include flag information for prohibiting setting of the coordinate system.

In addition, for example, the coordinate system setting control information may include information relating to a range of the encoding target to be permitted or prohibited to be subjected to setting of the coordinate system. This information relating to the range of the encoding target to be permitted or prohibited to be subjected to setting of the coordinate system may be any information. For example, the information may include information indicating, with use of a bounding box, a voxel, and the like, the range of the encoding target to be permitted to be subjected to setting of the coordinate system, or may include information indicating, with use of a bounding box, a voxel, and the like, the range of the encoding target to be prohibited to be subjected to setting of the coordinate system.

In addition, for example, the coordinate system setting control information may include information relating to permission or prohibition of a parameter to be used for setting of the coordinate system. This information relating to permission or prohibition of the parameter to be used for setting of the coordinate system may be any information. For example, the information may include information indicating a parameter permitted to be used, or may include information indicating a parameter prohibited to be used.

Transmitting the information relating to permission and prohibition to the decoding side (the decoder) makes it possible for the decoding side (the decoder) not only to omit unnecessary processing, but also to omit analysis of unnecessary control information, on the basis of the information.

In addition, the coordinate system setting control information may include information relating to execution or skipping of setting of the coordinate system. This information relating to execution or skipping of setting of the coordinate system may be any information. For example, the information may include flag information indicating whether or not setting of the coordinate system has been executed, or may include flag information indicating whether or not setting of the coordinate system has been skipped (omitted).

In addition, for example, the coordinate system setting control information may include information relating to a range of the encoding target to be subjected to execution or skipping of setting of the coordinate system. This information relating to the range of the encoding target to be subjected to execution or skipping of setting of the coordinate system may be any information. For example, the information may include information indicating, with use of a bounding box, a voxel, and the like, the range of the encoding target having been subjected to execution of setting of the coordinate system, or may include information indicating, with use of a bounding box, a voxel, and the like, the range of the encoding target having been subjected to skipping of setting of the coordinate system.

In addition, for example, the coordinate system setting control information may include information relating to a parameter to be used for setting of the coordinate system. This information relating to this parameter may be any information. For example, the information may include information indicating a parameter used for setting of the coordinate system, or may include information indicating a parameter not used for setting of the coordinate system.

In addition, for example, this information relating to the parameter may include identification information indicating a type of a coordinate system employed in the selected quantization method. In addition, the identification information may be identification information of a rectangular coordinate system, a cylindrical coordinate system, or a spherical coordinate system.

In addition, the information relating to the parameter may include information indicating a relative attitude of the coordinate system employed in the selected quantization method with respect to a world coordinate system. The information indicating the relative attitude may include a shift amount of the coordinate system employed in the selected quantization method from the world coordinate system. In addition, the information indicating the relative attitude may include an angle between the coordinate system employed in the selected quantization method and the world coordinate system.

Further, in a case where the coordinate system employed in the selected quantization method is a coordinate system other than the rectangular coordinate system, the information relating to the parameter may include information indicating a correspondence relationship between coordinate axes of the coordinate system and the rectangular coordinate system.

Transmitting the information relating to execution and skipping and the information relating to the parameter to the decoding side (the decoder) makes it possible for the decoding side (the decoder) to execute appropriate processing and skip unnecessary processing on the basis of these information. Accordingly, it is possible for the decoding side (the decoder) to appropriately restore the data of the point cloud.

The coordinate system setting control information generator 612 supplies the generated coordinate system setting control information to the bounding box setting control information generator 613.

It is to be noted that, for example, the controller 101 causes the coordinate system setting control information generator 612 to generate the coordinate system setting control information in a case where generation of the coordinate system setting control information is permitted (not prohibited) in accordance with control information for permitting or prohibiting generation of the coordinate system setting control information. Doing so makes it possible to suppress generation of unnecessary control information and to suppress an increase in load.

It is to be noted that the coordinate system setting control information generator 612 may have any configuration, and may include, for example, a CPU, a ROM, a RAM, and the like, and the CPU may load a program and data stored in the ROM and the like into the RAM and execute the program and the data, thereby performing processing relating to generation of the coordinate system control information.

<Bounding Box Setting Control Information Generator>

The bounding box setting control information generator 613 is controlled by the controller 101 to generate bounding box setting control information of the selected quantization method on the basis of the information supplied from the coordinate system setting control information generator 612 and the result of the selection by the selector 115.

The bounding box setting control information is control information relating to setting of a bounding box. This bounding box setting control information may be any information as long as the information relates to the bounding box. For example, the bounding box setting control information may include information relating to permission or prohibition of setting of the bounding box. This information relating to permission or prohibition of setting of the bounding box may be any information. For example, the information may include flag information for permitting setting of the bounding box, or may include flag information for prohibiting setting of the bounding box.

In addition, for example, the bounding box setting control information may include information relating to a range of the encoding target to be permitted or prohibited to be subjected to setting of the bounding box. This information relating to the range of the encoding target to be permitted or prohibited to be subjected to setting of the bounding box may be any information. For example, the information may include information indicating, with use of a voxel and the like, the range of the encoding target to be permitted to be subjected to setting of the bounding box, or may include information indicating, with use of a voxel and the like, the range of the encoding target prohibited to be subjected to setting of the bounding box.

In addition, for example, the bounding box setting control information may include information relating to permission or prohibition of a bounding box setting method. This information relating to permission or prohibition of the bounding box setting method may be any information. For example, the information may include information indicating a bounding box setting method permitted to be used, or may include information indicating a bounding box setting method prohibited to be used.

In addition, for example, the bounding box setting control information may include information relating to permission or prohibition of a parameter to be used for setting of a bounding box. This information relating to permission or prohibition of the parameter to be used for setting of the coordinate system may be any information. For example, the information may include information indicating a parameter permitted to be used, or may include information indicating a parameter prohibited to be used.

Transmitting the information relating to permission and prohibition to the decoding side (the decoder) makes it possible for the decoding side (the decoder) not only to omit unnecessary processing but also to omit analysis of unnecessary control information, on the basis of the information.

In addition, for example, the bounding box setting control information may include information relating to execution or skipping of setting of the bounding box. This information relating execution or skipping of setting of the bounding box may be any information. For example, the information may include flag information indicating whether or not setting of the bounding box has been executed, or may include flag information indicating whether or not setting of the bounding box has been skipped (omitted).

In addition, for example, the bounding box setting control information may include information relating to a range of the encoding target to be subjected to execution or skipping of setting of the bounding box. This information relating to the range of the encoding target to be subjected to execution or skipping of setting of the bounding box may be any information. For example, the information may include information indicating, with use of a voxel and the like, the range of the encoding target having been subjected to execution of setting of the bounding box, or may include information indicating, with use of a voxel and the like, the range of the encoding target having been subjected to skipping of setting of the bounding box.

In addition, for example, the bounding box setting control information may include information relating to a parameter to be used for setting of the bounding box. This information relating to the parameter may be any information. For example, the information may include information indicating a parameter used for setting of the bounding box, or may include information indicating a parameter not used for setting of the bounding box.

In addition, this information relating to the parameter may include identification information indicating a bounding box setting method. In addition, the identification information may be identification information of a method of setting an inscribed bounding box, a method of setting an alignment bounding box, a method of setting an overlap bounding box, a method of setting a region-of-interest bounding box and setting image quality for each bounding box, a method of setting a region-of-interest bounding box and setting decoding order for each bounding box, or a method of setting a plurality of bounding boxes to equalize the number of voxels.

In addition, this information relating to the parameter may include information indicating the number of set bounding boxes. In addition, this information relating to the parameter may include information indicating a coordinate system corresponding to each bounding box. In addition, this information relating to the parameter may include information relating to image quality of each bounding box. Further, the information relating to image quality may include information relating to a depth limit of hierarchies of voxels, or may include information relating to quality of color compression.

In addition, this information relating to the parameter may include information relating to the decoding order for each bounding box.

Transmitting the information relating to execution and skipping and the information relating to the parameter to the decoding side (the decoder) makes it possible for the decoding side (the decoder) to execute appropriate processing and skip unnecessary processing on the basis of these information. Accordingly, it is possible for the decoding side (the decoder) to appropriately restore the data of the point cloud.

The bounding box setting control information generator 613 supplies the generated bounding box setting control information to the voxel setting control information generator 614.

It is to be noted that, for example, the controller 101 causes the bounding box setting control information generator 613 to generate the bounding box setting control information in a case where generation of the bounding box setting control information is permitted (not prohibited) in accordance with control information for permitting or prohibiting generation of the bounding box setting control information. Doing so makes it possible to suppress generation of unnecessary control information and to suppress an increase in load.

It is to be noted that the bounding box setting control information generator 613 may have any configuration, and may include, for example, a CPU, a ROM, a RAM, and the like, and the CPU may load a program and data stored in the ROM and the like into the RAM and execute the program and the data, thereby performing processing relating to generation of bounding box control information.

<Voxel Setting Control Information Generator>

The voxel setting control information generator 614 is controlled by the controller 101 to generate voxel setting control information of the selected quantization method on the basis of the information supplied from the bounding box setting control information generator 613 and the result of the selection by the selector 115.

The voxel setting control information is control information relating to setting of a voxel. This voxel setting control information may be any information as long as the information relates to the voxel. For example, the voxel setting control information may include information relating to permission or prohibition of setting of the voxel. This information relating to permission or prohibition of setting of the voxel may be any information. For example, the information may include flag information for permitting setting of the voxel, or may include flag information for prohibiting setting of the voxel.

In addition, for example, the voxel setting control information may include information relating to a range of the encoding target to be permitted or prohibited to be subjected to setting of the voxel. This information relating to the range of the encoding target to be permitted or prohibited to be subjected to setting of the voxel may be any information. For example, the information may include information indicating, with use of the data of the point cloud and the like, the range of the encoding target to be permitted to be subjected to setting of the voxel, or may include information indicating, with use of the data of the point cloud and the like, the range of the encoding target to be prohibited to be subjected to setting of the voxel.

In addition, for example, the voxel setting control information may include information relating to permission or prohibition of a voxel setting method. This information relating to permission or prohibition of the voxel setting method may be any information. For example, the information may include information indicating a voxel setting method permitted to be used, or may include information indicating a voxel setting method prohibited to be used.

In addition, for example, the voxel setting control information may include information relating to permission or prohibition of a parameter to be used for setting of the voxel. This information relating to permission or prohibition of the parameter to be used for setting of the coordinate system may be any information. For example, the information may include information indicating a parameter permitted to be used, or may include information indicating a parameter prohibited to be used.

Transmitting the information relating to permission and prohibition to the decoding side (the decoder) makes it possible for the decoding side (the decoder) not only to omit unnecessary processing but also to omit analysis of unnecessary control information, on the basis of the information.

In addition, for example, the voxel setting control information may include information relating to execution or skipping of setting of the voxel. This information relating to execution or skipping of setting of the voxel may be any information. For example, the information may include flag information indicating whether or not setting of the voxel has been executed, or may include flag information indicating whether or not setting of the voxel has been skipped (omitted).

In addition, for example, the voxel setting control information may include information relating to a range of the encoding target to be subjected to execution or skipping of setting of the voxel. This information relating to the range of the encoding target to be subjected to execution or skipping of setting of the voxel may be any information. For example, the information may include information indicating, with use of the data of the point cloud and the like, the range of the encoding target having been subjected to execution of setting of the voxel, or may include information indicating, with use of the data of the point cloud and the like, the range of the encoding target having been subjected to skipping of setting of the voxel.

In addition, for example, the voxel setting control information may include information relating to a parameter to be used for setting of the voxel. This information relating to the parameter may be any information. For example, the information may include information indicating a parameter used for setting of the voxel, or may include information indicating a parameter not used for setting of the voxel.

In addition, this information relating to the parameter may include identification information for identifying whether to perform linear quantization or nonlinear quantization. In addition, this information relating to the parameter may include information relating to arrangement of voxels in a case of the nonlinear quantization. In addition, this information relating to the arrangement of the voxels may include index information indicating whether or not a voxel arrangement pattern has been selected from a plurality of candidates of voxel arrangement patterns. In addition, this information relating to arrangement of the voxels may include map information indicating arrangement of the voxels.

In addition, this information relating to the parameter may include information relating to an offset of the position of the voxel. For example, this offset may be a global offset corresponding to all voxels to which the local offset does not correspond. In addition, for example, this offset may be a local offset corresponding only to a voxel to which the offset is assigned and a voxel in a lower hierarchy belonging to the voxel.

Transmitting the information relating to execution and skipping and the information relating to the parameter to the decoding side (the decoder) makes it possible for the decoding side (the decoder) to execute appropriate processing and skip unnecessary processing on the basis of these information. Accordingly, it is possible for the decoding side (the decoder) to appropriately restore the data of the point cloud.

The voxel setting control information generator 614 supplies the generated voxel setting control information to the association unit 117.

It is to be noted that, for example, the controller 101 causes the voxel setting control information generator 614 to generate the voxel setting control information in a case where generation of the voxel setting control information is permitted (not prohibited) in accordance with control information for permitting or prohibiting generation of the voxel setting control information. Doing so makes it possible to suppress generation of unnecessary control information and to suppress an increase in load.

It is to be noted that the voxel setting control information generator 614 may have any configuration, and may include, for example, a CPU, a ROM, a RAM, and the like, and the CPU may load a program and data stored in the ROM and the like into the RAM and execute the program and the data, thereby performing processing relating to generation of the voxel control information.

The control information generator 116 generates control information and supplies the control information to the decoding side (decoder) as described above, which makes it possible for the decoding side (the decoder) to more easily and more appropriately decode (restore) encoded data encoded by application of the present technology. Accordingly, it is possible to suppress a reduction in encoding efficiency.

<Flow of Encoding Processing>

An example of a flow of encoding processing executed by the encoding device 100 having the above-described configuration is described with reference to a flow chart in FIG. 24.

When the encoding processing starts, the preprocessing unit 111 performs preprocessing on inputted data in step S101.

In step S102, the controller 101 obtains region-of-interest setting. The region-of-interest setting is information relating to a region of interest set for data of a point cloud that is an encoding target. For example, the information includes information indicating a position and a range of the set region of interest, and the like.

A source of this region-of-interest setting is optional. For example, the region-of-interest setting may be inputted by a user or the like through an unillustrated input unit or the like. In this case, the controller 101 obtains the inputted region-of-interest setting. Further, for example, the region-of-inter-est setting may be stored in an unillustrated storage unit in advance. In this case, the controller 101 reads and obtains the region-of-interest setting from the storage unit. In addition, for example, the region-of-interest setting may be supplied from another device through an unillustrated communication unit. In this case, the controller 101 controls the communication unit to communicate with another device, and receives and obtains the region-of-interest setting.

In step S103, the controller 101 obtains a speed requirement. The speed requirement is information indicating processing speed and the like necessary for decoding processing (restoring processing). It is necessary to comply with this speed requirement in order to perform the decoding processing without fail. A source of this speed requirement is optional, as with the region-of-interest setting.

The controller 101 controls various processing units, and causes the processing units to execute encoding by appropriately using information such as the region-of-interest setting and the speed requirement.

In step S104, the position quantizer 112 quantizes position information of the encoding target.

In step S105, the signal string generator 113 generates a signal string on the basis of a data structure.

In step S106, the encoder 114 encodes the signal string generated by processing in the step S105.

In step S107, the selector 115 selects a position quantization method.

In step S108, the control information generator 116 generates control information.

In step S109, the association unit 117 associates a bit stream (encoded data) corresponding to the position quantization method selected by processing in the step S107 with the control information generated by processing in the step S108.

In step S110, the association unit 117 outputs the encoded data and the control information that are associated with each other.

When processing in the step S110 ends, the encoding processing ends. For example, in a case where the encoding target is a moving image, this series of processing is performed for each frame.

<Flow of Position Quantization Processing>

An example of a flow of position quantization processing executed in the step S104 of FIG. 24 is described with reference to a flow chart in FIG. 25.

When the position quantization processing starts, the coordinate system setting unit 201 sets a coordinate system in step S121.

In step S122, the bounding box setting unit 202 sets a bounding box with use of the coordinate system set in the step S121.

In step S123, the voxel setting unit 203 sets a voxel in the bounding box set in the step S122.

When processing in the step S123 ends, the position quantization processing ends, and the processing returns to FIG. 24.

<Flow of Coordinate System Setting Processing>

An example of a flow of coordinate system setting processing executed in the step S121 of FIG. 25 is described with reference to a flow chart in FIG. 26.

When the coordinate system setting processing starts, the world coordinate system setting unit 211 sets a world coordinate system as a coordinate system for an object of the encoding target in step S131.

In step S132, the Cartesian coordinate system setting unit 212 sets a Cartesian coordinate system as a coordinate system for the object of the encoding target and sets a shift amount and an angle from the world coordinate system.

In step S133, the cylindrical coordinate system setting unit 213 sets a cylindrical coordinate system as a coordinate system for the object of the encoding target, and sets a shift amount and an angle from the world coordinate system, and an axis correspondence relationship with the Cartesian coordinate system (the world coordinate system).

In step S134, the spherical coordinate system setting unit 214 sets a spherical coordinate system as a coordinate system for the object of the encoding target, and sets a shift amount and an angle from the world coordinate system, and an axis correspondence relationship with the Cartesian coordinate system (the world coordinate system).

When processing in the step S134 ends, the coordinate system setting processing ends, and the processing returns to FIG. 25.

<Flow of Bounding Box Setting Processing>

An example of a flow of bounding box setting processing executed in the step S122 of FIG. 25 is described with reference to a flow chart in FIG. 27.

When the bounding box setting processing starts, in step S141, the inscribed bounding box setting unit 311 sets a bounding box in which the object of the encoding target is inscribed.

In step S142, the alignment bounding box setting unit 312 sets a bounding box in which a distribution of points and a center of a voxel are aligned with each other.

In step S143, the overlap bounding box setting unit 313 sets a plurality of bounding boxes overlapping each other, in which a distribution of points and a center of a voxel are aligned with each other.

In step S144, the region-of-interest bounding box setting unit 314 sets a plurality of bounding boxes in accordance with the region-of-interest setting. For example, the region-of-interest bounding box setting unit 314 sets a plurality of bounding boxes including a bounding box that includes the region of interest on the basis of the region-of-interest setting obtained by the controller 101 in the step S102 of FIG. 24.

In step S145, the equalized bounding box setting unit 315 sets a plurality of bounding boxes in which the number of voxels are equalized.

When processing in the step S145 ends, the bounding box setting processing ends, and the processing returns to FIG. 25.

<Flow of Voxel Setting Processing>

An example of a flow of voxel-setting processing executed in step S123 of FIG. 25 is described with reference to a flow chart in FIG. 28.

When the voxel setting processing starts, the linear voxel setting unit 411 sets a linear voxel in step S151. That is, the linear voxel setting unit 411 sets voxels hierarchized by recursively equally dividing a region.

In step S152, the nonlinear voxel setting unit 412 sets a nonlinear voxel. That is, the nonlinear voxel setting unit 412 sets voxels hierarchized by recursively (equally or unequally) dividing a region.

In step S153, the offset voxel setting unit 413 sets an offset voxel. That is, the offset voxel setting unit 413 divides a region by redefinition, sets a global offset and a local offset as appropriate, and sets a voxel to which the global offset or the local offset corresponds.

When processing in the step S153 ends, the processing returns to FIG. 25.

<Flow of Selection Processing>

Next, an example of a flow of selection processing executed in step S107 of FIG. 24 is described with reference to a flow chart in FIG. 29.

When the selection processing starts, the cost calculation unit 511 of the selector 115 calculates costs of encoded data (a bit stream) obtained by respective position quantization methods in step S161.

In step S162, the cost comparison unit 512 compares costs of the respective position quantization methods calculated by processing in the step S161, and selects an optimal position quantization method on the basis of a result of such comparison.

When processing in the step S162 ends, the processing returns to FIG. 24.

<Flow of Control Information Generation Processing>

An example of a flow of control information generation processing executed in the step S108 of FIG. 24 is described with reference to a flow chart in FIG. 30.

When the control information generation processing starts, in step S171, the position quantization control information generator 611 generates control information relating to position quantization by the position quantization method selected by the processing in the step S107 of FIG. 24.

In step S172, the coordinate system setting control information generator 612 generates control information relating to a coordinate system employed by the position quantization method selected by the processing in the step S107 of FIG. 24.

In step S173, the bounding box setting control information generator 613 generates control information relating to a bounding box employed by the position quantization method selected by the processing in the step S107 of FIG. 24.

In step S174, the voxel setting control information generator 614 generates control information relating to a voxel employed by the position quantization method selected by the processing in the step S107 of FIG. 24.

When processing in the step S174 ends, the processing returns to FIG. 24.

Executing each processing as described above makes it possible for the encoding device 100 to suppress a reduction in encoding efficiency.

3. Second Embodiment

<Decoding Device>

FIG. 31 is a block diagram illustrating a main configuration example of a decoding device that is an embodiment of the information processing apparatus to which the present technology is applied. The decoding device 700 illustrated in FIG. 31 is a decoding device corresponding to the encoding device 100 in FIG. 2, and decodes encoded data of a point cloud generated by the encoding device 100 to restore data of the point cloud, for example. At this time, the decoding device 700 performs this decoding (restoration) by a method to which the present technology is applied, as described below.

As illustrated in FIG. 31, the decoding device 700 includes a control information analyzer 711, a decoder 712, a voxelization processing unit 713, and a point cloud conversion processing unit 714.

The control information analyzer 711 performs processing relating to analysis of control information relating to decoding of encoded data supplied from an encoding side (an encoder). For example, the control information analyzer 711 obtains encoded data encoded by the encoding device 100 and control information associated with the encoded data. The control information analyzer 711 analyzes the control information. The control information analyzer 711 supplies a result of analysis of the control information together with the encoded data to the decoder 712.

It is to be noted that the control information analyzer 711 may have any configuration, and may include, for example, a CPU, a ROM, a RAM, and the like, and the CPU may load a program and data stored in the ROM and the like into the RAM and execute the program and the data, thereby performing processing relating to the analysis of the control information.

The decoder 712 decodes the encoded data by a decoding method corresponding to encoding performed by the encoding device 100 (the encoder 114) on the basis of the result of the analysis of the control information. The decoder 712 supplies, together with the result of the analysis of the control information and the like, a signal string obtained by decoding the encoded data to the voxelization processing unit 713.

It is to be noted that the decoder 712 may have any configuration, and may include, for example, a CPU, a ROM, a RAM, and the like, and the CPU may load a program and data stored in the ROM and the like into the RAM and execute the program and the data, thereby performing processing relating to decoding.

The voxelization processing unit 713 reads the signal string as information in units of voxels on the basis of the result of the analysis of the control information, and supplies the signal string together with the result of the analysis of the control information to the point cloud conversion processing unit 714.

It is to be noted that the voxelization processing unit 713 may have any configuration, and may include, for example, a CPU, a ROM, a RAM, and the like, and the CPU may load a program and data stored in the ROM and the like into the RAM and execute the program and the data, thereby performing processing relating to voxelization.

The point cloud conversion processing unit 714 restores data of the point cloud from the supplied information on the basis of the result of the analysis of the control information. The point cloud conversion processing unit 714 outputs the restored data of the point cloud. The outputted data of the point cloud may be subjected to image processing by, for example, an unillustrated processing unit in a subsequent stage to be displayed on a monitor or the like as image information, may be sent by an unillustrated communication unit and transmitted to another device through a predetermined transmission path, or may be recorded in an unillustrated recording medium.

It is to be noted that the point cloud conversion processing unit 714 may have any configuration, and may include, for example, a CPU, a ROM, a RAM, and the like, and the CPU may load a program and data stored in the ROM and the like into the RAM and execute the program and the data, thereby performing processing relating to restoration.

As described above, the control information is analyzed, and decoding processing (restoration processing) is performed on the basis of the control information, which makes it possible for the decoding device 700 to correctly decode the encoded data generated by the encoding device 100. Accordingly, it is possible to suppress a reduction in encoding efficiency.

<Control Information Analyzer>

FIG. 32 is a block diagram illustrating a main configuration example of the control information analyzer 711 illustrated in FIG. 31. As illustrated in its 32, the control information analyzer 711 has a position quantization control information analyzer 721, a coordinate system setting control information analyzer 722, a bounding box setting control information analyzer 723, and a voxel setting control information analyzer 724.

<Position Quantization Control Information Analyzer>

The position quantization control information analyzer 721 performs processing relating to analysis of position quantization control information included in the supplied control information. The position quantization control information may include any information. For example, the position quantization control information may include various kinds of information described in the first embodiment. The position quantization control information analyzer 721 analyzes each information included in the position quantization control information. The position quantization control information analyzer 721 supplies a result of the analysis of the position quantization control information together with other information (the encoded data and the control information) to the coordinate system setting control information analyzer 722.

It is to be noted that the position quantization control information analyzer 721 may have any configuration, and may include, for example, a CPU, a ROM, a RAM, and the like, and the CPU may load a program and data stored in the ROM and the like into the RAM and execute the program and the data, thereby performing processing relating to the analysis of the position quantization control information.

<Coordinate System Setting Control Information Analyzer>

The coordinate system setting control information analyzer 722 performs processing relating to analysis of coordinate system setting control information included in the supplied control information. The coordinate system setting control information may include any information. For example, the coordinate system setting control information may include various kinds of information described in the first embodiment. The coordinate system setting control information analyzer 722 analyzes each information included in the coordinate system setting control information. The coordinate system setting control information analyzer 722 supplies a result of the analysis of the coordinate system setting control information together with other information (results of analysis of the encoded data, the control information, and other information) to the bounding box setting control information analyzer 723.

The coordinate system setting control information analyzer 722 may have any configuration, and may include, for example, a CPU, a ROM, a RAM, and the like, and the CPU may load a program and data stored in the ROM and the like into the RAM and execute the program and the data, thereby performing processing relating to the analysis of the coordinate system setting control information.

<Bounding Box Setting Control Information Analyzer>

The bounding box setting control information analyzer 723 performs processing relating to analysis of bounding box setting control information included in the supplied control information. The bounding box setting control information may include any information. For example, the bounding box setting control information may include various kinds of information described in the first embodiment. The bounding box setting control information analyzer 723 analyzes each information included in the bounding box setting control information. The bounding box setting control information analyzer 723 supplies a result of the analysis of the bounding box setting control information together with other information (results of analysis of the encoded data, the control information, and other information) to the voxel setting control information analyzer 724.

The bounding box setting control information analyzer 723 may have any configuration, and may include, for example, a CPU, a ROM, a RAM, and the like, and the CPU may load a program and data stored in the ROM and the like into the RAM and execute the programs and the data, thereby performing the process relating to the analysis of the bounding box setting control data.

<Voxel Setting Control Information Analyzer>

The voxel setting control information analyzer 724 performs processing relating to analysis of voxel setting control information included in the supplied control information. The voxel setting control information may include any information. For example, the voxel setting control information may include various kinds of information described in the first embodiment. The voxel setting control information analyzer 724 analyzes each information included in the voxel setting control information. The voxel setting control information analyzer 724 supplies a result of the analysis of the voxel setting control information together with other information (results of analysis of the encoded data, the control information, and other information) to the decoder 712.

The voxel setting control information analyzer 724 may have any configuration, and may include, for example, a CPU, a ROM, a RAM, and the like, and the CPU may load a program and data stored in the ROM and the like into the RAM and execute the program and the data, thereby performing processing relating to the analysis of the voxel setting control information.

As described above, respective processing units from the position quantization control information analyzer 721 to the voxel setting control information analyzer 724 analyze various kinds of control information, which makes it possible for the decoding device 700 to correctly decode (restore) the encoded data generated by the encoding device 100 on the basis of the control information (the results of the analysis of the control information). Accordingly, it is possible to suppress a reduction in encoding efficiency.

<Flow of Decoding>

An example of a flow of decoding processing executed by the decoding device 700 having the above-described configuration is described with reference to a flow chart in FIG. 33.

When the decoding processing starts, the control information analyzer 711 analyzes control information (associated with encoded data) supplied from the encoder in step S201.

In step S202, the decoder 712 decodes the encoded data (a bit stream) supplied from the encoding side on the basis of a result of analysis of the control information obtained by processing in the step S201.

In step S203, the voxelization processing unit 713 voxelizes a signal string obtained by processing in the step S202 on the basis of the result of the analysist of the control information obtained by the processing in the step S201.

In step S204, the point cloud conversion processing unit 714 restores data of a point cloud on the basis of the result of the analysis of the control information obtained by the processing in the step S201.

In step S205, the point cloud conversion processing unit 714 outputs the data of the point cloud restored by processing in the step S204.

When processing in the step S205 ends, the decoding processing ends. For example, in a case where the encoding target is a moving image, this series of processing is performed for each frame.

<Flow of Control Information Analysis Processing>

An example of a flow of control information analysis processing executed in the step S201 of FIG. 33 is described with reference to a flow chart in FIG. 34.

When the control information analysis processing starts, the position quantization control information analyzer 721 of the control information analyzer 711 analyzes control information relating to position quantization included in the control information in step S211.

In step S212, the coordinate system setting control information analyzer 722 analyzes control information relating to setting of a coordinate system included in the control information.

In step S213, the bounding box setting control information analyzer 723 analyzes control information relating to setting of a bounding box included in the control information.

In step S214, the voxel setting control information analyzer 724 analyzes control information relating to setting of a voxel included in the control information.

When the processing in the step S214 ends, the control information analysis processing ends, and the processing returns to FIG. 33.

<Flow of Restoration Processing>

An example of a flow of restoration processing executed in the step S204 of FIG. 33 is described with reference to a flow chart in FIG. 35.

When the restoration processing starts, the point cloud conversion processing unit 714 places a voxel in each bounding box in a coordinate system for an object in step S221.

In step S222, the point cloud conversion processing unit 714 converts data of the voxel into data of a point cloud.

In step S223, the point cloud conversion processing unit 714 converts a coordinate system of the data of the point cloud from the coordinate system for the object into a world coordinate system.

When processing in the step S223 ends, the restoration processing ends, and the processing returns to FIG. 33.

Executing each processing as described above makes it possible for the decoding device 700 to suppress a reduction in encoding efficiency.

4. Others

<Software>

It is possible to execute the series of processing described above by hardware or software. In addition, it is also possible to execute some processing by hardware and the other processing by software. In a case where the series of processing is executed by software, a program included in the software is installed in a computer. The computer herein includes a computer that is incorporated in dedicated hardware, or a general-purpose personal computer that is able to execute various functions by having various programs installed therein, and the like.

FIG. 36 is a block diagram illustrating a configuration example of the hardware of a computer that executes the series of processing described above with a program.

In a computer 900 illustrated in FIG. 36, a CPU (Central Processing Unit) 901, a ROM (Read Only Memory) 902, and a RAM (Random Access Memory) 903 are coupled to each other by a bus 904.

An input/output interface 910 is further coupled to the bus 904. An input unit 911, an output unit 912, a storage unit 913, a communication unit 914, and a drive 915 are coupled to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable medium 921 such as a magnetic disk, an optical disk, a magneto-optical disk, or a semiconductor memory.

In the computer configured as described above, the CPU 901 loads a program stored, for example, in the storage unit 913 onto the RAM 903 via the input/output interface 910 and the bus 904, and executes the program, thereby performing the series of processing described above. The RAM 903 also stores data and the like that are necessary for the CPU 901 to execute various kinds of processing as appropriate.

For example, it is possible to record and apply a program to be executed by the computer (the CPU 901) in the removable medium 921 as a package medium or the like. In this case, mounting the removable medium 921 onto the drive 915 makes it possible to install the program in the storage unit 913 via the input/output interface 910. In addition, it is possible to provide this program via a wired or wireless transmission medium such as a local area network, the Internet, or digital satellite broadcasting. In this case, it is possible to receive the program in the communication unit 914 and install the program in storage unit 913. Alternatively, this program may be installed in advance in the ROM 902 or the storage unit 913.

<Supplement>

Embodiments of the present technology are not limited to the embodiments described above, and may be modified in variety of ways in a scope without departing from the gist of the present technology.

For example, it is possible to implement the present technology as any configuration of an apparatus or a system, for example, a processor serving as a system LSI (Large Scale Integration) or the like, a module using a plurality of processing units or the like, a unit using a plurality of modules or the like, a set or the like in which other functions are further added to a unit (that is, some of components of an apparatus).

It is to be noted that, the "system" herein means a group of a plurality of components (such as apparatuses and modules (parts)) regardless of whether or not all of the components are in the same housing. Accordingly, a plurality of apparatuses that are accommodated in separate housings and coupled to each other via a network, and a single apparatus including a plurality of modules accommodated in one housing are both regarded as the system.

In addition, each of the processing units described above may be realized by any configuration long as the processing unit has a function described as a function of the processing unit. For example, each of the processing units may include any circuit, any LSI, any system LSI, any processor, any module, any unit, any set, any device, any apparatus, any system, or the like. In addition, the processing unit may include a combination of a plurality of them. For example, components of the same kind such as a plurality of circuits and a plurality of processing units may be combined, or components of different kinds such as a circuit and an LSI may be combined.

In addition, for example, a configuration described as a single apparatus (or a processing unit) may be divided and configured as a plurality of apparatuses (or processing units). On the contrary, configurations described above as a plurality of apparatuses (or processing units) may be integrated and configured as a single apparatus (or processing unit). In addition, it is needless to say that a configuration other than those described above may be added to the configuration of each apparatus (or each processing unit). Further, as long as the configuration and an operation of the entire system are substantially the same, a portion of the configuration of a certain apparatus (or processing unit) may be included in the configuration of another apparatus (or another processing unit).

In addition, for example, it is possible for the present technology to adopt a configuration of cloud computing in which one function is distributed to a plurality of apparatuses via a network and processed in cooperation.

Further, for example, it is possible to execute the program described above in any apparatus. In this case, it is sufficient if the apparatus have a necessary function (a functional block or the like) and is able to obtain necessary information.

In addition, for example, it is possible to execute the respective steps described in the flow charts described above with one apparatus, and it is also possible to distribute the respective steps to a plurality of apparatuses for execution. Further, in a case where a plurality of processing is included in one step, it is possible to execute the plurality of processing included in the one step with one apparatus, and it is also possible to distribute the plurality of processing to a plurality of apparatuses for execution. In other words, it is possible to execute the plurality of processing included in one step as processing in a plurality of steps. On the contrary, processing described as a plurality of steps may be collectively executed as one step.

Further, in a program executed by a computer, processing of steps describing the program may be executed chronologically in the order described herein or may be executed in parallel or individually at necessary timings such as when the processing is invoked. That is, as long as no contradiction arises, the processing of the steps may be executed in an order different from the above-described order. Further, the processing of the steps describing this program may be executed in parallel with processing of another program, or may be executed in combination with processing of another program.

Each of a plurality of present technologies described herein may be implemented as a single technology independently as long as no contradiction arises. Needless to say, any number of the present technologies may be implemented in combination. For example, a portion or the entirety of the present technology described in any of the embodiments may be implemented in combination with a portion or the entirety of the present technology described in another embodiment. In addition, a portion or the entirety of any of the technologies described above may be implemented in combination with another technology not described above.

It is to be noted that the present technology may also be configured as below.

(1) An information processing apparatus including a generator that generates information relating to quantization of a three-dimensional position of an encoding target.

(11) The information processing apparatus according to (1), in which the information relating to the quantization includes information relating to a coordinate system to be subjected to the quantization.

(12) The information processing apparatus according to (11), in which the information relating to the coordinate system includes information relating to permission or prohibition of setting of the coordinate system.

(13) The information processing apparatus according to (11) or (12), in which the information relating to the coordinate system includes information relating to a range of the encoding target to be permitted or prohibited to be subjected to the setting of the coordinate system.

(14) The information processing apparatus according to any one of (11) to (13), in which the information relating to the coordinate system includes information relating to permission or prohibition of a parameter to be used for setting of the coordinate system.

(15) The information processing apparatus according to any one of (11) to (14), in which the information relating to the coordinate system includes information relating to execution or skipping of setting of the coordinate system.

(16) The information processing apparatus according to any one of (11) to (15), in which the information relating to the coordinate system includes information relating to a range of the encoding target to be subjected to execution or skipping of setting of the coordinate system.

(17) The information processing apparatus according to any one of (11) to (16), in which the information relating to the coordinate system includes information relating to a parameter to be used for setting of the coordinate system.

(18) The information processing apparatus according to (17), in which the information relating to the parameter includes identification information indicating a type of the coordinate system.

(19) The information processing apparatus according to (18), in which the identification information includes identification information of a rectangular coordinate system, a cylindrical coordinate system, or a spherical coordinate system.

(20) The information processing apparatus according to any one of (17) to (19), in which the information relating to the parameter further includes information indicating a relative attitude of the coordinate system with respect to a world coordinate system.

(21) The information processing apparatus according to (20), in which the information indicating the relative attitude includes a shift amount of the coordinate system from the world coordinate system.

(22) The information processing apparatus according to (20) or (21), in which the information indicating the relative attitude includes an angle between the coordinate system and the world coordinate system.

(23) The information processing apparatus according to any one of (11) to (22), in which in a case where the coordinate system is a coordinate system other than rectangular coordinate system, the information relating to the parameter includes information indicating a correspondence relationship between coordinate axes of the coordinate system and the rectangular coordinate system.

(31) The information processing apparatus according to any one of (1) to (23), in which the information relating to the quantization includes information relating to a bounding box for normalization of position information of the encoding target.

(32) The information processing apparatus according to (31), in which the information relating to the bounding box includes information relating to permission or prohibition of setting of the bounding box.

(33) The information processing apparatus according to (31) or (32), in which the information relating to the bounding box includes information relating to a range of the encoding target to be permitted or prohibited to be subjected to setting of the bounding box.

(34) The information processing apparatus according to any one of (31) to (33), in which the information relating to the bounding box includes information relating to permission or prohibition of a method of setting the bounding box.

(35) The information processing apparatus according to any one of (31) to (34), in which the information relating to the bounding box includes information relating to permission or prohibition of a parameter to be used for setting of the bounding box.

(36) The information processing apparatus according to any one of (31) to (35), in which the information relating to the bounding box includes information relating to execution or skipping of setting of the bounding box.

(37) The information processing apparatus according to any one of (31) to (36), in which the information relating to the bounding box includes information relating to a range of the encoding target to be subjected to execution or skipping of setting of the bounding box.

(38) The information processing apparatus according to any one of (31) to (37), in which the information relating to the bounding box includes information relating to a parameter to be used for setting of the bounding box.

(39) The information processing apparatus according to (38), in which the information relating to the parameter includes identification information indicating a method of setting the bounding box.

(40) The information processing apparatus according to (39), in which the identification information includes identification information indicating a method of setting a bounding box to cause an object of the encoding target to be inscribed in the bounding box, a method of setting a bounding box to align a distribution of points of the encoding target with a center of a voxel, a method of setting a plurality of bounding boxes overlapping each other in accordance with the distribution of the points of the encoding target, a method of setting a plurality of bounding boxes in accordance with a region of interest of the encoding target and setting image quality for each of the bounding boxes, a method of setting a plurality of bounding boxes in accordance with the region of interest of the encoding target and setting decoding order for each of the bounding boxes, or a method of setting a plurality of bounding boxes to equalize the number of voxels.

(41) The information processing apparatus according to any one of (38) to (40), in which the information relating to the parameter includes information indicating the number of bounding boxes to be set.

(42) The information processing apparatus according to any one of (38) to (41), in which the information relating to the parameter includes information indicating a coordinate system corresponding to each bounding box.

(43) The information processing apparatus according to any one of (38) to (42), in which the information relating to the parameter includes information relating to image quality of each bounding box.

(44) The information processing apparatus according to (43), in which the information relating to the image quality includes information relating to a depth limit of hierarchies of voxels.

(45) The information processing apparatus according to (43) or (44), in which the information relating to the image quality includes information relating to quality of color compression.

(46) The information processing apparatus according to any one of (38) to (45), in which the information relating to the parameter includes information relating to decoding order for each bounding box.

(51) The information processing apparatus according to any one of (1) to (46), in which the information relating to the quantization includes information relating to a voxel for quantization of position information of the encoding target.

(52) The information processing apparatus according to (51), in which the information relating to the voxel includes information relating to permission or prohibition of setting of the voxel.

(53) The information processing apparatus according to (51) or (52), in which the information relating to the voxel includes information relating to a range of the encoding target to be permitted or prohibited to be subjected to setting of the voxel.

(54) The information processing apparatus according to (53), in which the information relating to the voxel includes information relating to permission or prohibition of a method of setting the voxel.

(55) The information processing apparatus according to (53) or (54), in which the information relating to the voxel includes information relating to permission or prohibition of a parameter to be used for setting of the voxel.

(56) The information processing apparatus according to any one of (53) to (55), in which the information relating to the voxel includes information relating to execution or skipping of setting of the voxel.

(57) The information processing apparatus according to any one of (53) to (56), in which the information relating to the voxel includes information relating to a range of the encoding target to be permitted or prohibited to be subjected to setting of the voxel.

(58) The information processing apparatus according to any one of (53) to (57), in which the information relating to the voxel includes information relating to a parameter to be used for setting of the voxel.

(59) The information processing apparatus according to (58), in which the information relating to the parameter includes identification information identifying whether to perform linear quantization or nonlinear quantization.

(60) The information processing apparatus according to (58) or (59), in which the information relating to the parameter includes information relating to arrangement of voxels in a case of nonlinear quantization.

(61) The information processing apparatus according to (60), in which the information relating to the arrangement of the voxels includes index information indicating whether or not a voxel arrangement pattern has been selected from a plurality of candidates of voxel arrangement patterns.

(62) The information processing apparatus according to (60) or (61), in which the information relating to the arrangement of the voxels includes map information indicating arrangement of voxels.

(63) The information processing apparatus according to any one of (58) to (62), in which the information relating to the parameter includes information relating to an offset of a position of a voxel.

(64) The information processing apparatus according to (63), in which the offset includes a global offset corresponding to all voxels to which a local offset does not correspond.

(65) The information processing apparatus according to (63) or (64), in which the offset includes a local offset corresponding only to a voxel to which the offset is assigned and a voxel in a lower hierarchy belonging to the voxel.

(71) An information processing method including generating information relating to quantization of a three-dimensional position of an encoding target.

(81) An information processing apparatus including a position quantizer that quantizes a three-dimensional position of an encoding target.

(91) The information processing apparatus according to (81), in which the position quantizer includes a coordinate system setting unit that sets a coordinate system to be subjected to the quantization.

(92) The information processing apparatus according to (91), in which the coordinate system setting unit sets the coordinate system in accordance with a shape and an attitude of an object of the encoding target.

(93) The information processing apparatus according to (91) or (92), in which the coordinate system setting unit sets a predetermined rectangular coordinate system as the coordinate system.

(94) The information processing apparatus according to any one of (91) to (93), in which the coordinate system setting unit sets a predetermined cylindrical coordinate system as the coordinate system.

(95) The information processing apparatus according to any one of (91) to (94), in which the coordinate system setting unit sets a predetermined spherical coordinate system as the coordinate system.

(101) The information processing apparatus according to any one of (81) to (95), in which the position quantizer includes a bounding box setting unit that sets a bounding box for normalization of position information of the encoding target.

(102) The information processing apparatus according to (101), in which the bounding box setting unit sets the bounding box to cause an object of the encoding target to be inscribed in the bounding box.

(103) The information processing apparatus according to (101) or (102), in which the bounding box setting unit sets the bounding box to align a distribution of points of the encoding target with a center of a voxel.

(104) The information processing apparatus according to any one of (101) to (103), in which the bounding box setting unit sets a plurality of bounding boxes overlapping each other in accordance with a distribution of points of the encoding target.

(105) The information processing apparatus according to any one of (101) to (104), in which the bounding box setting unit sets a plurality of bounding boxes in accordance with region-of-interest setting for the encoding target.

(106) The information processing apparatus according to (105), in which the bounding box setting unit further sets image quality for each of the set bounding boxes.

(107) The information processing apparatus according to (105) and (106), in which the bounding box setting unit further sets decoding order for each of the set bounding boxes.

(108) The information processing apparatus according to any one of (101) to (107), in which the bounding box setting unit sets a plurality of bounding boxes to equalize the number of voxels.

(111) The information processing apparatus according to any one of (81) to (108), in which the position quantizer includes a voxel setting unit that sets a voxel for quantization of position information of the encoding target in a bounding box for normalization of the position information of the encoding target.

(112) The information processing apparatus according to (111), in which the voxel setting unit sets the voxel to linearly quantize the position information of the encoding target.

(113) The information processing apparatus according to (111) or (112), in which the voxel setting unit sets the voxel to nonlinearly quantize the position information of the encoding target.

(114) The information processing apparatus according to (113), in which the voxel setting unit sets voxels in a hierarchy of the voxel to form smaller voxels toward an inside of the bounding box and form larger voxels toward an outside of the bounding box.

(115) The information processing apparatus according to (113) or (114), in which the voxel setting unit sets voxels in a hierarchy of the voxel to form a small voxel in a region of interest and a large voxel in a region other than the region of interest.

(116) The information processing apparatus according to any one of (111) to (115), in which the voxel setting unit further sets an offset of a position of the set voxel.

(117) The information processing apparatus according to (116), in which the voxel setting unit sets, as the offset, a global offset corresponding to all voxels to which a local offset does not correspond.

(118) The information processing apparatus according to (116) or (117), in which the voxel setting unit sets, as the offset, a local offset corresponding only to a voxel to which the offset is assigned and a voxel in a lower hierarchy belonging to the voxel.

(121) The information processing apparatus according to any one of (81) to (118), further including a selector that selects a quantization method of the three-dimensional position of the encoding target by the position quantizer.

(122) The information processing apparatus according to (121), in which the selector selects the quantization method on the basis of RD cost.

(123) The information processing apparatus according to any one of (81) to (122), further including an encoder that encodes the encoding target of which the three-dimensional position is quantized by the position quantizer.

(124) The information processing apparatus according to (123), further including:

a generator that generates information relating to quantization of the three-dimensional position of the encoding target by the position quantizer; and an association unit that associates the information relating to the quantization generated by the generator with encoded data obtained by encoding the encoding target by the encoder.

(125) The information processing apparatus according to any one of (81) to (124), further including a preprocessing unit that performs predetermined processing on the encoding target, in which the position quantizer is configured to quantize the three-dimensional position of the encoding target having been subjected to the predetermined processing by the preprocessing unit.

(131) The information processing apparatus according to any one of (81) to (125), in which the encoding target includes a point cloud.

(141) An information processing method including quantizing a three-dimensional position of an encoding target.

(201) An information processing apparatus including a restoring unit that restores three-dimensional information of an encoding target from a signal string on the basis of information relating to quantization of a three-dimensional position of the encoding target.

(202) The information processing apparatus according to (201), in which the restoring unit places a voxel corresponding to the signal string in a three-dimensional coordinate system on the basis of the information relating to the quantization, converts the voxel into a point cloud, and converts the coordinate system into a world coordinate system.

(203) The information processing apparatus according to (202), in which the restoring unit converts the signal string into a voxel on the basis of the information relating to the quantization, and places the converted voxel in the coordinate system.

(204) The information processing apparatus according to (203), further including a decoder that decodes encoded data in which the encoding target is encoded, in which the restoring unit converts the signal string obtained by decoding the encoded data by the decoder into a voxel on the basis of the information relating to the quantization, and places the converted voxel in the coordinate system.

(205) The information processing apparatus according to (204), further including an analyzer that analyzes the information relating to the quantization, in which the restoring unit restores the three-dimensional information of the encoding target from the signal string on the basis of a result of analysis of the information relating to the quantization by the analyzer, the signal string being obtained by decoding the encoded data by the decoder.

(211) An information processing method including restoring three-dimensional information of an encoding target from a signal string on the basis of information relating to quantization of a three-dimensional position of the encoding target.

REFERENCE SIGNS LIST

100: encoding device
101: controller
111: preprocessing unit
112: position quantizer
113: signal string generator
114: encoder
115: selector
116: control information generator
117: associating unit
201: coordinate system setting unit
202: bounding box setting unit
203: voxel setting unit
211: world coordinate system setting unit
212 Cartesian coordinate system setting unit
213: cylindrical coordinate system setting unit
214: spherical coordinate system setting unit
311: inscribed bounding box setting unit
312: alignment bounding box setting unit
313: overlap bounding box setting unit
314: region-of-interest bounding box setting unit
315: equalized bounding box setting unit
411: linear voxel setting unit
412: nonlinear voxel setting unit
413: offset voxel setting unit
511: cost calculation unit
512: cost comparison unit
611: position quantization control information generator
612: coordinate system setting control information generator
613: bounding box setting control information generator 614: voxel setting control information generator
700: decoding device
711: control information analyzer
712: decoder
713: voxelization processing unit
714: point cloud conversion processing unit
721: position quantization control information analyzer
722: coordinate system setting control information analyzer
723: bounding box setting control information analyzer
724: voxel setting control information analyzer
900: computer

The invention claimed is:

1. An encoding apparatus comprising circuitry configured to:
quantize a three-dimensional position of an encoding target on a basis of a plurality of quantization methods each including setting at least one bounding box for normalization of position information of the encoding target;
generate encoded data of the encoding target of which three-dimensional position has been quantized;
select, on a basis of RD cost, at least one quantization method from the plurality of quantization methods;
generate control information relating to the selected quantization method; and
associate the control information with the encoded data.

2. The encoding apparatus according to claim 1, wherein the control information includes information relating to a coordinate system for the encoding target, and
the circuitry is further configured to set, in the selected quantization method, the bounding box to the encoding target on the basis of the coordinate system based on the control information.

3. The encoding apparatus according to claim 2, wherein the control information includes identification information indicating a type of the coordinate system, a shift amount of the coordinate system from a world coordinate system, and an angle between the coordinate system and the world coordinate system.

4. The encoding apparatus according to claim 1, wherein the control information includes identification information indicating a method of the setting the bounding box.

5. The encoding apparatus according to claim 1, wherein the control information includes information relating to a setting of voxels to the bounding box for the quantization of the position information of the encoding target.

6. The encoding apparatus according to claim 5, wherein the setting of the voxels identifies whether to perform linear quantization or nonlinear quantization with respect to the bounding box.

7. The encoding apparatus according to claim 1, wherein the encoding target includes data of a plurality of points, and
the control information includes information relating to an offset between a position of each point and a position of a voxel for the quantization of the position information of the encoding target.

8. The encoding apparatus according to claim 1, wherein the encoding target includes data of a plurality of points,
the at least one bounding box includes a first bounding box and a second bounding box,
the first bounding box and the second bounding box are overlapped with each other and each consist of a plurality of voxels, and
the circuitry is further configured to set, in accordance with a distribution of the plurality of points, one of the first bounding box and the second bounding to each point to decrease an offset between each point and a center of a corresponding one of voxels.

9. The encoding apparatus according to claim 1, wherein the encoding target is an object representing a human,
a first region of the encoding target includes at least one of a face portion or a hair portion of the human,
a second region of the encoding target includes a portion not including the face portion nor the hair portion,
the at least one bounding box includes a first bounding box and a second bounding box, and
the circuitry is further configured to set the first bounding box and the second bounding box to the first region and the second region respectively such that the first bounding box has a higher quality of compression than that of the second bounding box.

10. The encoding apparatus according to claim 9, wherein each of the first bounding box and the second bounding box consists of a plurality of voxels, and
each quality of compression of the first bounding box and the second bounding box is associated with a level-of-detail in a hierarchy of the plurality of voxels.

11. The encoding apparatus according to claim 1, wherein the encoding target is an object representing a human,
the bounding box consists of voxels,
a first region of the encoding target includes at least one of a face portion or a hair portion of the human,
a second region of the encoding target includes a portion not including the face portion nor the hair portion,
the at least one bounding box includes a first bounding box and a second bounding box, and
the circuitry is further configured to set the first bounding box and the second bounding box to the first region and the second region respectively such that the first bounding box has a higher priority of decoding order than that of the second bounding box.

12. The encoding apparatus according to claim 1, wherein the bounding box consists of voxels having a hierarchy represented as level-of-detail, and
the circuitry is further configured to set a smaller voxel at an inside of the bounding box than that at an outside of the bounding box.

13. The encoding apparatus according to claim 1, wherein the encoding target comprises at least one of point cloud data or mesh data.

14. An encoding method comprising:
quantizing a three-dimensional position of an encoding target on a basis of a plurality of quantization methods each including setting at least one bounding box for normalization of position information of the encoding target;
generating encoded data of the encoding target of which three-dimensional position has been quantized;
selecting, on a basis of RD cost, at least one quantization method from the plurality of quantization methods;
generating control information relating to the selected quantization method; and
associating the control information with the encoded data.

15. A non-transitory computer-readable medium having embodied thereon a program, which when executed by a computer causes the computer to execute an encoding method, the method comprising:
quantizing a three-dimensional position of an encoding target on a basis of a plurality of quantization methods each including setting at least one bounding box for normalization of position information of the encoding target;

generating encoded data of the encoding target of which three-dimensional position has been quantized;

selecting, on a basis of RD cost, at least one quantization method from the plurality of quantization methods;

generating control information relating to the selected quantization method; and associating the control information with the encoded data.

* * * * *